(12) United States Patent
Chen et al.

(10) Patent No.: US 9,074,907 B2
(45) Date of Patent: Jul. 7, 2015

(54) NAVIGATION METHOD AND SYSTEM FOR SELECTING AND VISITING SCENIC PLACES ON SELECTED SCENIC BYWAY

(75) Inventors: Kenny Chen, Torrance, CA (US);
Andrew De Silva, Torrance, CA (US);
Raymond Linn, Torrance, CA (US);
Peachawat Peachavanish, Torrance, CA (US); Jianning Zhuang, Torrance, CA (US); Mike Iao, Torrance, CA (US);
Hirofumi Onishi, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1594 days.

(21) Appl. No.: 11/827,459

(22) Filed: Jul. 12, 2007

(65) Prior Publication Data

US 2009/0018766 A1   Jan. 15, 2009

(51) Int. Cl.
*G01C 21/34* (2006.01)
*G06F 17/30* (2006.01)
*G01C 21/36* (2006.01)

(52) U.S. Cl.
CPC ........ *G01C 21/3611* (2013.01); *G06F 17/3087* (2013.01)

(58) Field of Classification Search
CPC ............ G01C 21/343; G01C 21/3461; G01C 21/3484; G01C 21/362; G01C 21/3635; G01C 21/367; G01C 21/3682; G06F 17/30241; G06Q 10/025

USPC .......... 701/202, 431, 435, 437, 438, 439, 442
See application file for complete search history.

(56) References Cited

U.S. PATENT DOCUMENTS

| 2003/0229446 A1* | 12/2003 | Boscamp et al. | 701/213 |
| 2004/0215390 A1* | 10/2004 | Nomura | 701/209 |
| 2004/0243307 A1* | 12/2004 | Geelen | 701/213 |
| 2006/0095202 A1* | 5/2006 | Atarashi et al. | 701/208 |

FOREIGN PATENT DOCUMENTS

JP   2000-321087   11/2000

* cited by examiner

*Primary Examiner* — John Q Nguyen
*Assistant Examiner* — Kyung Kim
(74) *Attorney, Agent, or Firm* — Muramatsu & Associates

(57) ABSTRACT

A navigation method and apparatus is designed to efficiently retrieve the information on the scenic byways and to visit such scenic byways through calculated routes. The navigation method and system performs a scenic byway mode in which operations and screen displays are specially designed for efficiently retrieving and selecting a desired scenic byway and scenic places to visit. The navigation method and system allows the user to efficiently search the information and select the scenic byway and scenic places to visit. The navigation method and system stores the information on the scenic byways in the map database and facilitates retrieval thereof in response to the request by the user. Alternatively, the information on the scenic byways and scenic places can be retrieved from the remote data server through wireless communication.

30 Claims, 51 Drawing Sheets

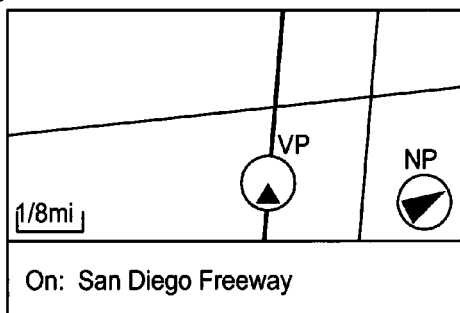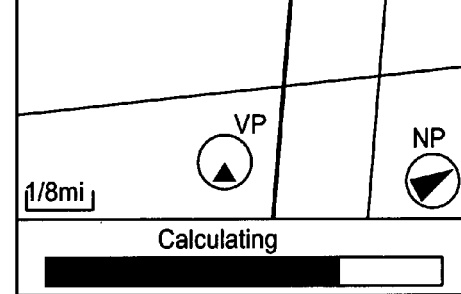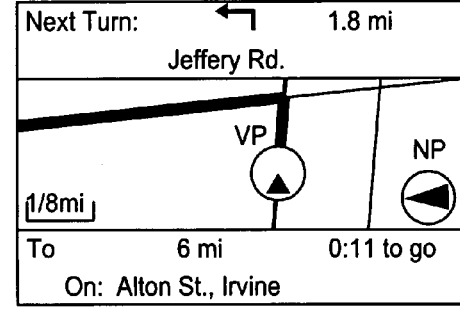

(Arrive at Destination)

(Arrive at Destination)

(Arrive at Destination)

(Delete Destination)

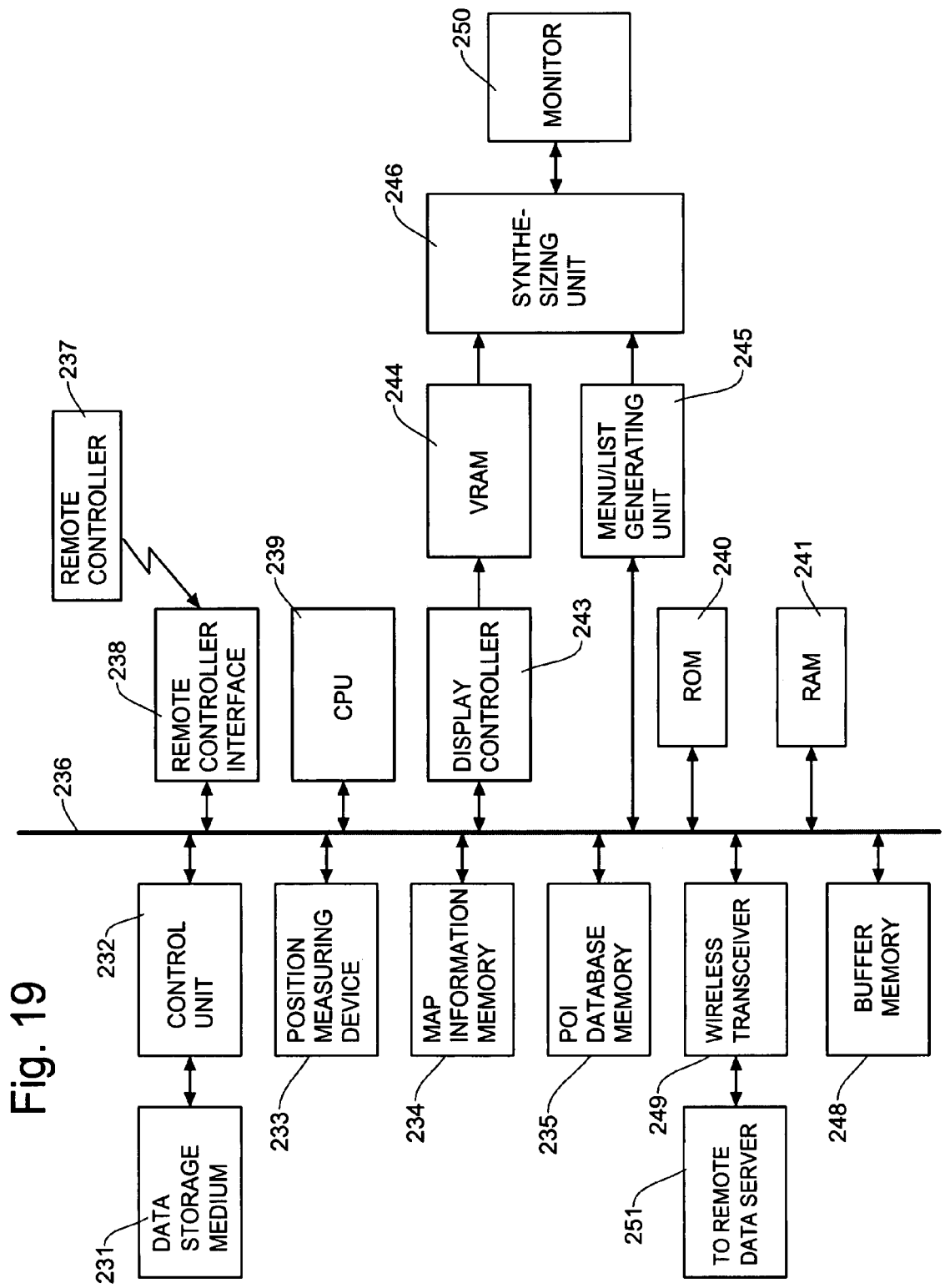

NAVIGATION METHOD AND SYSTEM FOR SELECTING AND VISITING SCENIC PLACES ON SELECTED SCENIC BYWAY

FIELD OF THE INVENTION

This invention relates generally to a route guidance method and apparatus for a navigation system, and more particularly, to a method and apparatus for displaying information regarding a scenic byway and scenic places on the scenic byway on a screen of a navigation system to allow a user to easily select and visit one or more scenic places on the selected scenic byway through a route guidance operation of the navigation system.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. A "Find Destination by" screen shown in FIG. 1B for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1B, the navigation system displays selection methods of point of interest (POI) either by "Place Name" or "Place Type" in FIG. 1C. The "Place Name" is to specify a name of the intended POI, and the "Place Type" is to specify a category of the intended POI. If the "Place Type" is selected in FIG. 1C, the navigation system lists the categories of POIs as shown in FIG. 1D.

FIG. 1E shows a situation when the user has selected a "Restaurant" category in the example of FIG. 1D. In this example, the screen includes a list of names of the restaurants typically sorted by distance from the current position. Because "Pizza Hut" is the nearest location from the current position, it is listed on the top. The user selects a particular restaurant among the restaurant lists for route guidance in FIG. 1F.

In FIG. 1G, the navigation system displays a progress scale during the calculation of the route to the destination. After determining the guidance route, the navigation system starts the route guidance operation as shown in FIG. 1H. Typically, the navigation system shows the intersection that is highlighted to show the next turn and a direction of the turn. The search method in a conventional navigation system works in this manner when there is one fixed destination.

However, the conventional navigation system cannot sufficiently fulfill the needs of a user who wants to search multiple points of interest and obtain the most efficient route to accomplish the purpose of the trip. Although the above procedure works to guide a user to a particular destination, there is a demand that the route guidance function of the navigation system be extended for a new level of achievement in the driving. For example, the conventional navigation system is not suitably designed to obtain information on places of interest associated with a particular route, park, etc.

In many areas of the country, there are roads selected by the government or public organization based on scenic, recreational, natural, historic, cultural and archaeological qualities (hereafter referred to as "scenic byways"). A typical example of scenic byway is a road running through a national park, a coastline, etc., where a visitor can enjoy many beautiful sceneries, natural monuments, etc. along the road. Such an example of scenic byway is illustrated in the schematic map view of FIG. 2 that has a scenic byway name "San Luis Obispo North Coast Byway" (part of "Coast Highway 1" in California).

As shown, there are many attractive places to visit on the scenic byway shown in FIG. 2. For example, on the schematic map image of FIG. 2, it is assumed that "San Simeon", "Cambria", "Harmony", etc., are places of interest (byway points or scenic places) along the scenic byway that provide scenic attractions. Such places of interest may not necessarily be located on the scenic byway, but are close enough to the scenic byway such that a driver or a hiker can easily reach such places. For instance, "Ragged point vista", "Point Estero", etc., are not directly located on the scenic byway (Coast Highway 1) but are located close to the scenic byway.

Although a limited number of byway points are shown on the map in FIG. 2, many other byway points may exist. For example, "Estero Properties", "Hearst Castle", "Mission de San Luis Obispo", "Monterey Bay National Marine Sanctuary", "Morro Bay National Estuary", etc. on the map image are also places of interest associated with the scenic byway of FIG. 2. Although there are many scenic byways in the country, in the conventional navigation system, it is not easy to find a scenic byway, let alone to obtain information on scenic places along and proximate to the scenic byway or to efficiently visit such scenic places.

Thus, it is desired that scenic byways can be searched in an efficient and organized manner through a navigation system. Moreover, there is a need of new navigation system that is capable of easily and quickly finding information regarding scenic byways and scenic places and creating an efficient route to visit such scenic places.

SUMMARY OF THE INVENTION

It is, therefore, an object of the present invention to provide a navigation method and system which is capable of efficiently searching information regarding scenic byways and scenic places and selecting the scenic byway and scenic places to visit.

It is another object of the present invention to provide a navigation method and system which is capable of storing information on the scenic byways in the map database and retrieving the information on the scenic byways in response to the request by the user.

It is a further object of the present invention to provide a navigation method and system which is capable of performing a scenic byway mode in which operations and screen displays are specially designed for efficiently retrieving and selecting a desired scenic byway and scenic places to visit.

One aspect of the present invention is a navigation method for selecting and visiting scenic byway and scenic places. The method includes the steps of preparing data concerning scenic byways throughout a country in a map database of a navigation system or a map database of a remote data server, displaying a menu screen which includes a scenic byway menu, selecting the scenic byway menu thereby setting an operation of the navigation system to a scenic byway mode, checking the map database to retrieve the data concerning scenic byways within a predetermined distance range from a current position or other specified position, displaying a scenic byway list which lists scenic byways within the predetermined distance range, selecting a scenic byway from the scenic byway list, displaying a scenic place list which lists scenic places on the selected scenic byway, selecting one or more scenic places from the scenic place list, and calculating a route to the selected scenic places and guiding a user to the selected scenic places through the calculated route.

The navigation method further includes a step of retrieving information on a scenic byway selected from the scenic byway list and reproducing the retrieved information. In the navigation method, the step of reproducing the retrieved information is conducted by displaying the retrieved information on a screen of the navigation system as well as reproducing the retrieved information by speech sounds.

Further, in the navigation method, the step of displaying the scenic byway list is conducted by providing an information key to each entry in the scenic byway list to obtain information regarding the scenic byway. In the navigation method, the step of displaying the retrieved information on the screen of the navigation system is conducted by displaying a "More" key on the screen so that the user is able to request further information on the selected scenic byway. In the navigation method, the step of displaying the retrieved information on the screen of the navigation system is conducted by displaying a "Read" key on the screen so that the user is able to request for reproducing the retrieved information by speech sounds.

In the navigation method, the step of displaying the scenic place list is conducted by providing a map image key to each entry in the scenic place list and displaying a map image of the scenic place when the map image key is activated. Further, the step of displaying the scenic place list is conducted by providing a check box to each entry in the scenic place list to select one or more scenic places. The navigation method further includes a step of disabling further selection of the scenic place when a number of scenic places already selected has reached to a predetermined maximum number.

In the navigation method, the step of displaying the map image of the scenic place is conducted by allowing the user to use a scroll key and a cursor on the map image thereby scrolling the map image and changing the size of the map image. In the navigation method, the step of allowing the user to use the scroll key on the map image includes a step of displaying a key on the screen so that the user is able to request further search for scenic byways within a predetermined distance range from a location specified by the cursor on the map image.

The navigation method further includes a step of displaying a scenic place list which lists the selected scenic places where each entry in the scenic place list is provided with a reference number or a last destination mark for indicating an order of visiting there. The navigation method further includes a step of displaying a map image of the selected scenic byway on a screen of the navigation system where each of the selected scenic places on the map image is accompanied by the reference number or the last destination mark that corresponds to that in the scenic place list.

In the navigation method, the step of calculating the route to the selected scenic places is conducted by using a combination of a conventional routing method for determining a quickest route to the scenic place and a scenic byway routing method for determine a route to stay on the scenic byway as long as possible or reasonably long enough. The conventional routing method is mainly used for determining a route between a starting point which is not on the selected scenic byway and any of the selected scenic place, and wherein said scenic byway routing method is mainly used for determining a route between one selected scenic place and another selected scenic place.

The navigation method, after turning on the navigation system, further includes a step of checking whether there exists the unfinished selected scenic place at which the user has not yet arrived, and a step of directly starting the scenic byway mode when there exists the unfinished selected scenic place.

Another aspect of the present invention is a navigation system which is designed to efficiently retrieve the information on the scenic byways and to visit such scenic byways through calculated routes by implementing the various steps of the navigation method described above. The navigation system of the present invention provides a scenic byway mode which is typically selected through a main menu of the navigation system to allows a user to easily and quickly search a desired scenic byway and selects scenic places on the scenic byway.

According to the present invention, the navigation method and system is designed to efficiently retrieve the information on the scenic byways and to visit such scenic byways through calculated routes. The navigation method and system allows the user to efficiently search the information regarding scenic byways and scenic places and to select the scenic byway and scenic places to visit. The navigation method and system stores the information on the scenic byways in the map database and facilitates retrieval of the information on the scenic byways in response to the request by the user. Alternatively, the navigation method and system searches and retrieves the information on the scenic byways and scenic places from the remote data server through wireless communication. The navigation method and system is designed to perform the scenic byway mode in which operations and screen displays are specially designed for efficiently retrieving and selecting a desired scenic byway and scenic places to visit.

BRIEF DESCRIPTION OF THE DRAWINGS

FIGS. 1A-1H are schematic diagrams showing an example of operational process and screen display involved in the conventional navigation system for selecting a destination, calculating a route to the destination, and performing a route guidance operation to the destination.

FIG. 3A is a main menu screen that prompts the user to select one of the menus for the next action, FIG. 3B shows a situation where the user selects a "Scenic Byway" menu, FIG. 3C is a screen showing a list of scenic byways in the order of distance, and FIG. 3D shows a list of scenic byways in the order of alphabet.

FIG. 4A shows a screen listing scenic byways, FIGS. 4B and 4C show screens listing scenic places on the selected scenic byway, FIG. 4D shows a screen listing the scenic places where a check mark is used to select the scenic place, FIG. 4E shows a screen where the user has activated the information key, FIG. 4F shows a screen which displays the detailed information on the selected scenic byway, FIG. 4G shows a screen that returns to the list of scenic places, FIG. 4H shows a screen which includes the scenic place list which includes a map image key, FIG. 4I shows a situation where the user has activated the map image key, FIG. 4J shows a screen which displays the map image of the selected scenic place, FIG. 4K shows a situation where the user puts an additional check mark to select scenic places, FIG. 4L shows a situation where the number of scenic places exceeds the maximum number, and FIG. 4M shows a situation where the map image key is provided to each scenic byway.

FIG. 5A shows a confirmation screen to confirm the scenic place as a destination, FIG. 5N shows a situation where the destination mark is provided to only the last scenic place to visit.

FIG. 6A is a screen that shows the detailed information in the text form, FIGS. 6O and 6P are screen examples that follow FIG. 6N.

FIG. 7A shows a situation where the user has activated the main menu screen again after the user has selected the scenic byway mode, FIG. 7B is a screen example for retrieving the data associated with the scenic byway previously selected by the user, FIG. 7C is a screen example which includes the detailed information concerning the selected scenic byway, FIG. 7D shows a situation where the user presses the "Scenic Place List" key, FIG. 7E is a screen which lists the remaining scenic places, FIG. 7F shows a situation where the user presses the "OK" key, FIG. 7G is a screen showing that the user has arrived at the final destination, FIG. 7H shows a situation where a "Scenic Place List" menu is highlighted, FIG. 7I is a screen showing that the user has arrived at the final destination, FIG. 7J is a screen show the scenic place list, FIG. 7K is a screen showing that the user has arrived at the final destination, FIG. 7L shows a situation where the user presses the "OK" key after deleting all of the remaining selected scenic places, and FIG. 7M is a screen example when the route guidance operation is finished.

FIG. 8A shows a situation where the user has selected both the "Scenic Byway" key and the "Route" key, FIGS. 8V and 8W show situations where the scenic places are located in an area that sufficient map data for the route guidance operation is unavailable.

FIG. 9A is an opening screen of the navigation system when it is turned, FIG. 9N shows the last unfinished scenic place.

FIGS. 10A-10B show examples of process for obtaining the map image of the scenic byway through the confirmation screen. FIGS. 10C-10D show examples of process for obtaining the map image of scenic byway through the screen showing the other map image. FIGS. 10E-10F show examples of process for obtaining the map image of scenic byway through the selection screen based on "Route" function of the navigation system shown in FIGS. 8A and 8B.

FIG. 11A shows one name of the scenic byway pointed by the cursor in the text box, and FIG. 11B shows two names of scenic byway in the text box when the two scenic byways intersect at the location pointed by the cursor.

FIG. 12A shows a situation where the user has selected the "View Routes" key on the confirmation screen, FIG. 12B is a screen which shows a map image of the calculated route created by the "Quickest Route" method, FIG. 12C shows a situation where the "Change Method" key is pressed, FIG. 12D is a screen which shows a routing method list, FIG. 12E shows a confirmation screen after conducting the route calculation by the selected routing method, and FIG. 12F is a screen which shows a map image of the calculated route created by the "Stay on Scenic Route" method.

FIG. 19 is a block diagram showing an example of configuration of a vehicle navigation system implementing the scenic byway method of the present invention.

DETAILED DESCRIPTION OF THE PREFERRED EMBODIMENT

Figure 2:
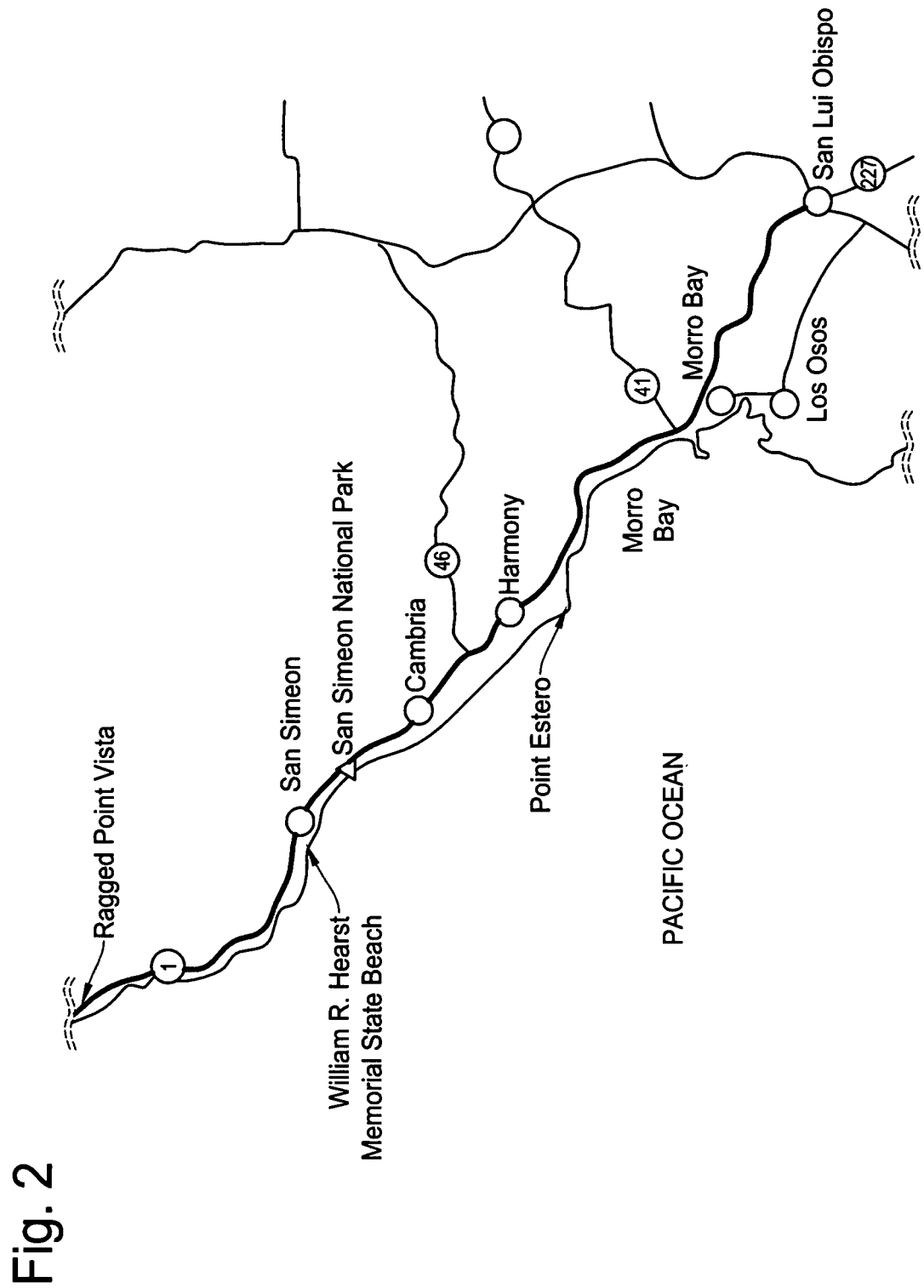
FIG. 2 is a schematic view showing a map image that includes an example of scenic byway having a plurality of scenic places that are attractive places to visit for implementing the scenic byway mode of the navigation method and system of the present invention.

The navigation method and system for retrieving information and selecting a scenic byway and scenic places (byway points) on the selected scenic byway for efficient route guidance operations in the present invention is explained in detail with reference to the accompanying drawings. In the description of the present invention, such a scenic place on the scenic byway is also referred to as a "byway point" or a "point of interest". Further, the term "scenic byway" should not be limited to pre-registered scenic byways but should be broadly interpreted to any route that has a plurality of geographic, historical, cultural, etc. points and routes that are attractive to users.

It should be noted that the description will be made where the navigation method and system is applied mainly to a vehicle navigation system, but the navigation method and system incorporating the scenic byway mode under the present invention can be implemented to other devices having a navigation function such as hand-held devices, personal computers, cellular phone, etc. The navigation system of the present invention is designed to more easily and efficiently retrieve the information on the scenic byway and to select the scenic places to visit.

Namely, in the present invention, the navigation method and system provides a scenic byway mode which is typically selected through a main menu of the navigation system to allows a user to easily and quickly search a desired scenic byway and selects scenic places on the scenic byway. The map database of the navigation system stores the information concerning the scenic byways so that the desired information on the scenic byways can be retrieved through the process of the scenic byway mode. The information concerning the scenic byways can also be retrieved by the navigation system from a remote server directly through wireless communication or indirectly through wired communication.

The navigation system of the present invention displays the information on the specified scenic byways and scenic places so that the user can select desired scenic places based on such information. The navigation system calculates an efficient route to visit the selected scenic byway and guides the user to two or more selected scenic places of the selected scenic byway in an efficient order through an efficient route. Unlike the conventional routing method which usually calculates a route that is quickest or shortest to the destination, the routing method under the scenic byway mode of the present invention calculates a route that is balanced between the efficiency and the enjoyment of the sceneries, monuments, etc.

As noted above, a scenic byway includes archaeological, cultural, historic, natural, recreational, etc. points of interest. In the United States of America and Canada, there are about 200 scenic byways registered by a public organization such as U.S. Department of Transportation. In general, scenic byways are designated or selected roads that provide beautiful vista. Throughout the description of the present invention, the term "scenic byway" is used, however, as noted above, the term should be interpreted broadly and is inclusive of the routes described above that are characterized by having a plurality of geographic points and routes that are attractive to users.

The navigation method and system of the present invention enables to display specially designed screens for the scenic byway mode. Through the specially designed user friendly screens, the user can search desired scenic byways and obtain the information on the desired scenic byways and visit the byway points through the route guidance operation of the navigation system. The navigation system provides such screens in a manner that the user can easily understand the information at a glance on the monitor screen and easily specify the desired scenic places to visit.

Figure 3A:
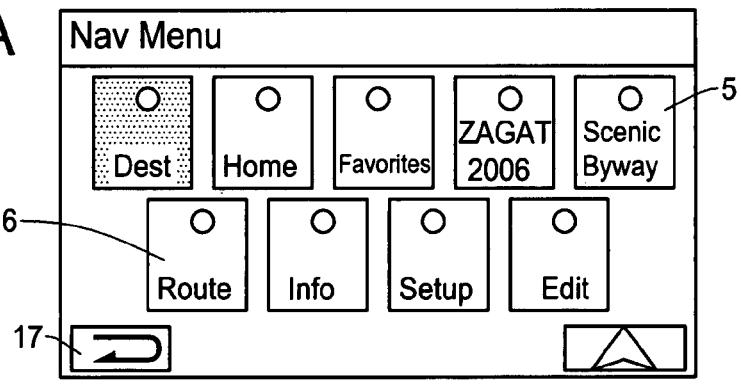
FIGS. 3A-3D are schematic diagrams showing examples of screen display and procedure of the navigation method and system of the present invention for selecting a scenic byway, where

FIG. 3A is a schematic diagram showing an example of main menu screen of the navigation system to prompt the user to select an operation mode. This screen is typically an initial screen that appears when the navigation system is turned on. The screen of FIG. 3A has a plurality of menu items or keys such as "Dest" to select an address or place name of a destination, "Home" to select a home address for coming back to the user's home, "Setup" to set-up parameters and functions in the navigation system, "Scenic Byway" to set the scenic byway mode of the present invention, etc.

A back (return) key 17 on the navigation screen is used to return to the previous screen, i.e., to cancel the most recent selection. In the example of FIG. 3A, when the main menu screen is displayed, the "Dest" key is highlighted as an initial (default) setting for selecting a destination. Such initial settings can be changed by the user through a system set-up process by selecting the "Setup" menu noted above on the main menu screen.

Figure 3B:
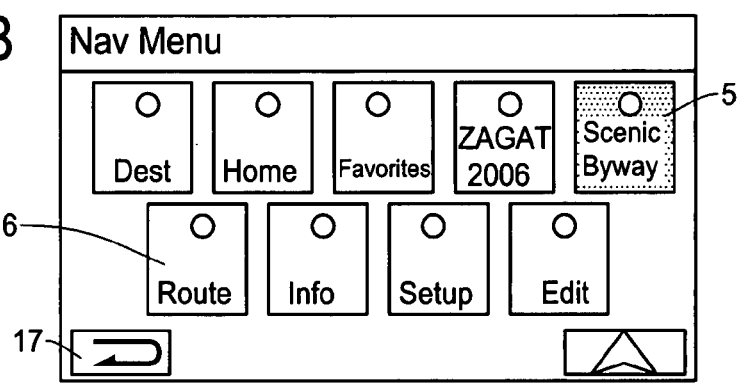
Figure 3C:
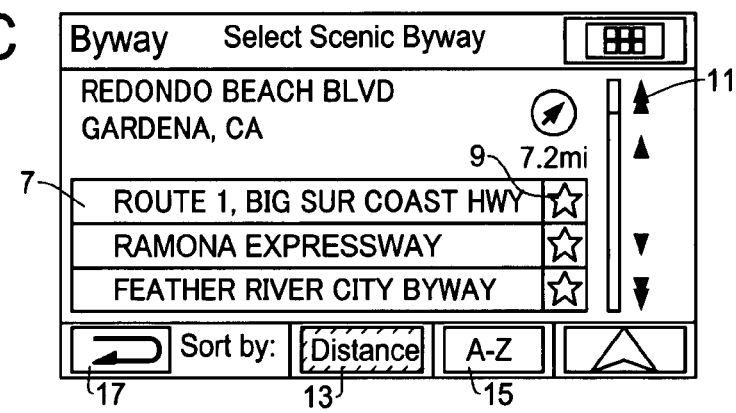

FIG. 3B show the main menu screen which is the same as that of FIG. 3A except that the user selects the "Scenic Byway" key 5 to start the scenic byway mode. Then, the navigation system displays the screens associated with the scenic byway mode. For example, a screen of FIG. 3C will be displayed as soon as the "Scenic Byway" key 5 is actuated by the user. FIG. 3C shows a scenic byway selection screen which includes a list of scenic byways retrieved from the map database so that the user is able select a desired scenic byway from the list.

In the example of FIG. 3C, the scenic byway list 7 show three entries, namely, "Route 1, Big Sur Coast HWY", "Feather River City Byway", and "Ramona Express Way". In this example, the scenic byways are listed in the order of distance from a current position of a user or from a specified location. As noted above, each of the listed scenic byways has a plurality of byway points (scenic places) having scenic, recreational, natural, historic, cultural, and archaeological qualities. In the screen of FIG. 3C, at the right side of each scenic byway entry, an information key 9 is provided which is used to obtain general and detailed information regarding the scenic byway as will be explained in detail later.

Figure 3D:
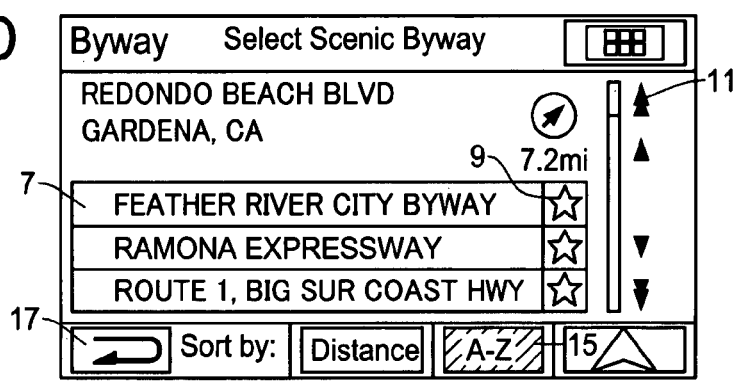

Although only three entries are listed, additional entries can be seen by scrolling the scenic byway list 7 by operating a scroll keys 11. As noted above, at present, there are about 200 scenic byways registered by the government such as U.S. Department of Transportation in Canada and the United States of America. Such scenic byways are sorted in the order of distance by activating the distance key 13 by the user or by a default setting. The scenic byways can also be sorted in the order of alphabet as shown in FIG. 3D by activating an alphabet key 15.

Figure 4A:
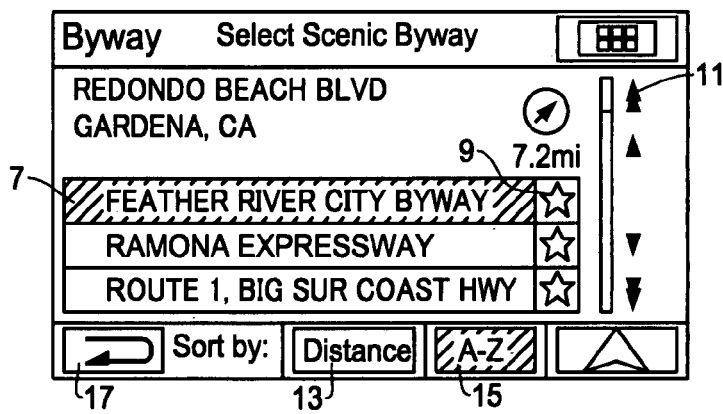
FIGS. 4A-4M are schematic diagrams showing examples of screen of the navigation system implementing the present invention where

FIGS. 4A-4M are schematic diagrams showing examples of screen and operational procedure of the navigation method and system for selecting a scenic byway, scenic places (byway points), etc. through the scenic byway mode in the present invention. FIG. 4A shows a navigation screen listing the scenic byways retrieved from the map database to prompt the user to select a desired scenic byway. In this example, the user has selected a scenic byway "FEATHER RIVER CITY BYWAY" in the scenic byway list 7 as indicated by the highlight (hatches) on the screen.

Figure 4B:
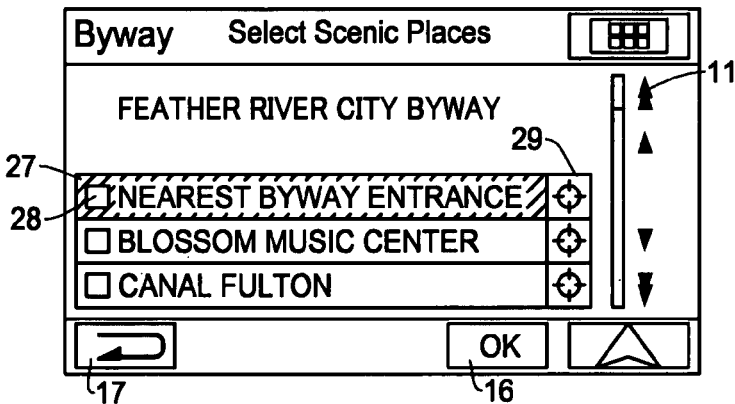

When the user selects one of the entries from the scenic byway list 7 in FIG. 4A, the navigation system will display a scenic places (byway points) list 27 for the selected scenic byway as shown in FIG. 4B. As noted above, scenic places are places of scenic, historic, recreational, natural, cultural, etc. qualities that are located on or proximate to the selected scenic byway. In this example, the scenic place list 27 shows three scenic places "NEAREST BYWAY ENTRANCE", "BLOSSOM MUSIC CENTER" and "CANAL FULTON" associated with the selected scenic byway "FEATHER RIVER CITY BYWAY".

By operating the scroll key 11, the user is able to scroll the scenic place list 27 to see more entries of scenic places in the list for the selected scenic byway "FEATHER RIVER CITY BYWAY". In this example, at the left of each entry in the scenic place list 27, a check box 28 is provided so that the user is able to select a particular byway point in the list. By selecting one or more scenic places, the user is able to enjoy a route guidance operation by the navigation method and system of the present invention to the selected scenic places.

Figure 4C:
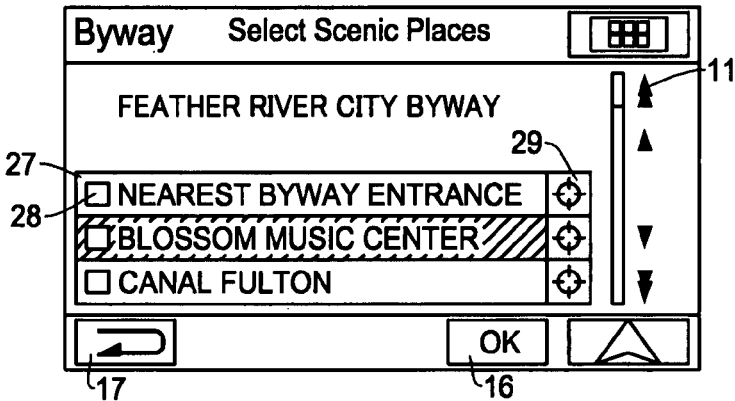

In the example of FIG. 4B, the entry at the top of the list; "NEAREST BYWAY ENTRANCE" is highlighted by default, i.e., as an initial setting. The user can change the selection by changing the highlight to other entries, such as a byway point "BLOSSOM MUSIC CENTER" as shown in FIG. 4C. In FIGS. 4B and 4C, a map image key 29 is also provided at the right of each entry in the scenic place list 27 to see the map image of the selected scenic place, which will be described in detail later.

Figure 4D:
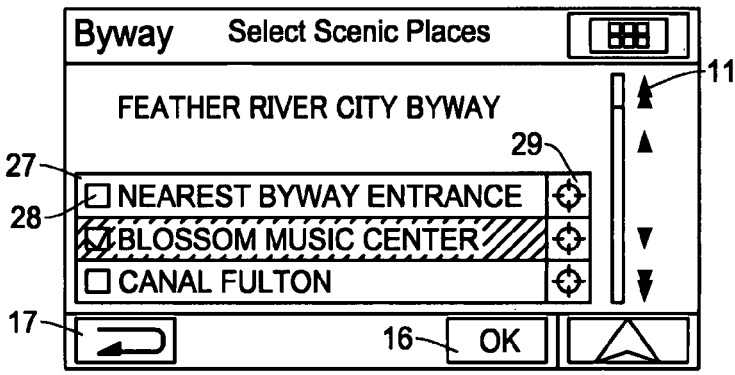

FIG. 4D shows a navigation screen similar to those of FIGS. 4B and 4C, except that the check box 28 of the scenic place "BLOSSOM MUSIC CENTER" is provided with a check mark by the user. The check box 28 is used to select a scenic place on the selected scenic byway to visit through the route guidance operation of the navigation system. With use of the check boxes 28, the user may check the desired number, for example, three entries from the scenic place list 27 to select those scenic places to visit.

The navigation system will calculate the route to reach each of the selected scenic places (byway points) in an efficient order as will be described below. Namely, in calculating the route, the navigation system attempts to find an efficient route that takes the selected scenic byway while making stops at selected scenic places with a short time and distance but also with an enjoyable route of scenic beauty, etc. in taking the current location of the user into consideration. As will be described later, the navigation system also provides detailed information on the scenic byways and scenic places through texts and/or video image on the screen or speech sounds.

Figure 4E:
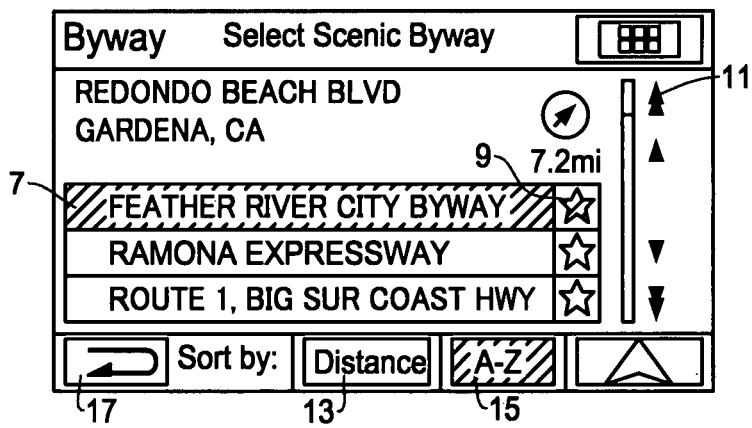
Figure 4F:
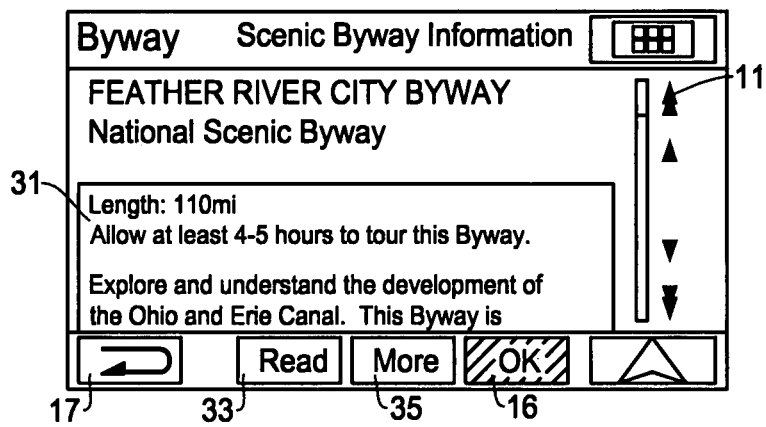

FIGS. 4E and 4F show examples of screen of the navigation system that will be appeared during the process for obtaining detailed information on a particular scenic byway. The screen of FIG. 4E is the same as that of FIG. 4A except that the user has activated the information key 9 to retrieve the general and detailed information on the particular scenic byway "FEATHER RIVER CITY BYWAY" in the scenic byway list 7. Then, as shown in FIG. 4F, the navigation system displays the general information on the specified scenic byway "FEATHER RIVER CITY BYWAY".

In the example FIG. 4F, the screen includes a byway information window 31 which provides the information in either a text form and/or a video image for the selected scenic byway. The user is able to scroll the byway information window 31 to see more information by operating the scroll keys 11. When the user presses a "Read" key 33, the navigation system will read aloud the information through a text-to-speech conversion technology, which helps the user to concentrate on looking ahead for the driving. When the user presses a "More" key 35, the navigation system will list additional and detailed information on the selected scenic byway and scenic places when such information is available as will be explained later with reference to FIGS. 6A-6P.

Figure 4G:
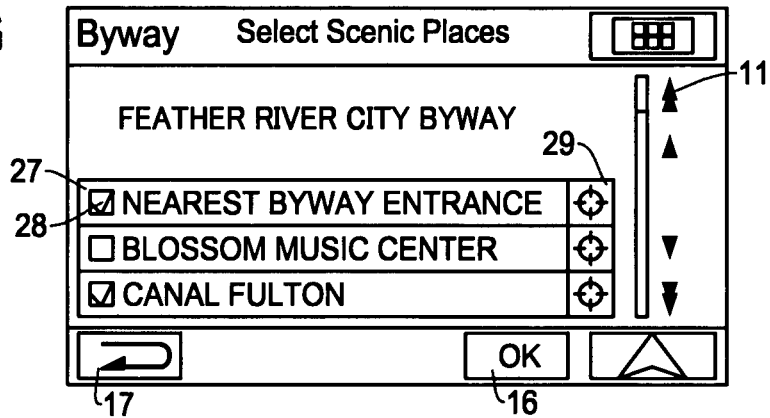

Based on the detailed information obtained in the manner of FIG. 4F, the user will be sufficiently informed to determine whether he/she wants to visit a particular scenic byway. Then, by pressing the "OK" key 16 in FIG. 4F, the navigation system displays the scenic place (byway point) list 27 again as shown in FIG. 4G. Thus, the user is able to select the scenic places associated with the selected scenic byway "FEATHER RIVER CITY BYWAY" by placing the check marks in the check boxes 28.

Figure 4H:
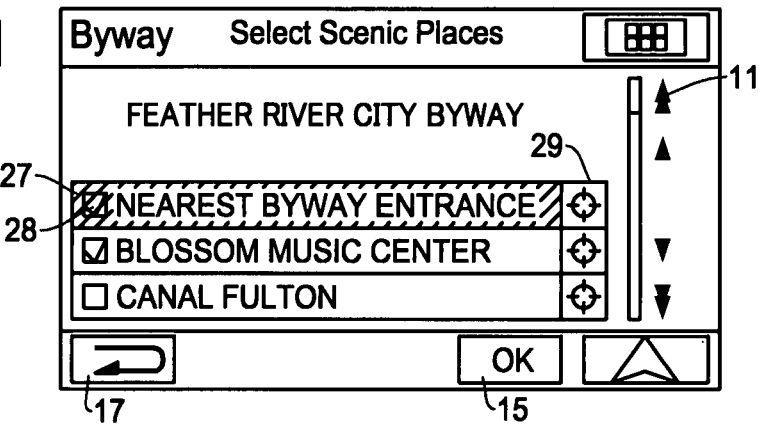
Figure 4I:
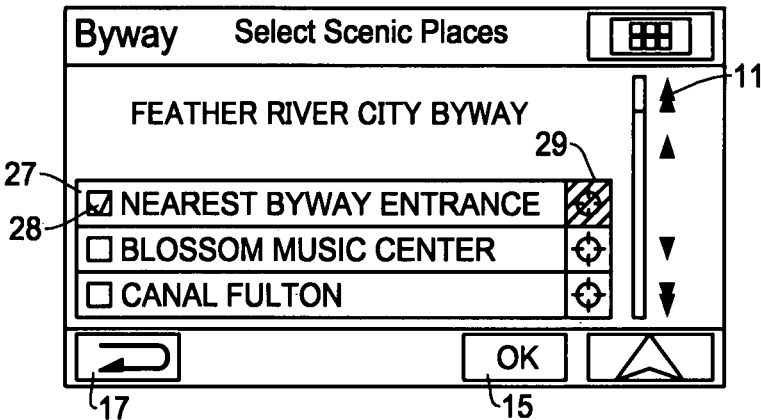
Figure 4J:
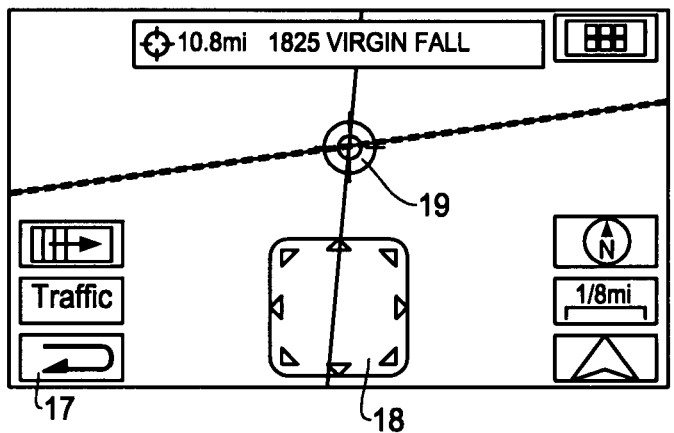
Figure 4K:
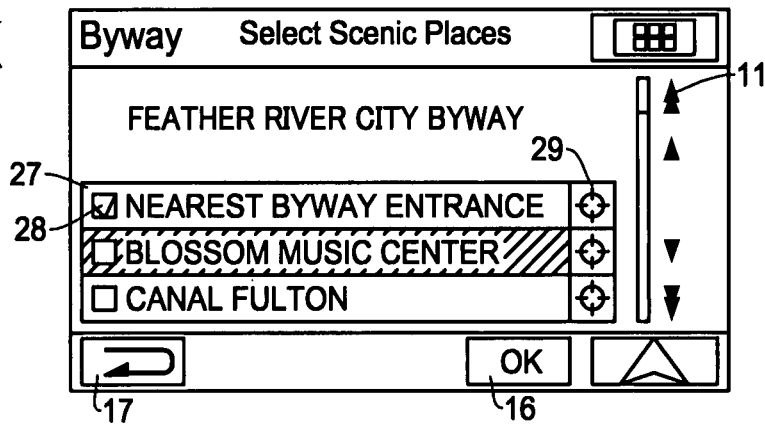
Figure 4L:
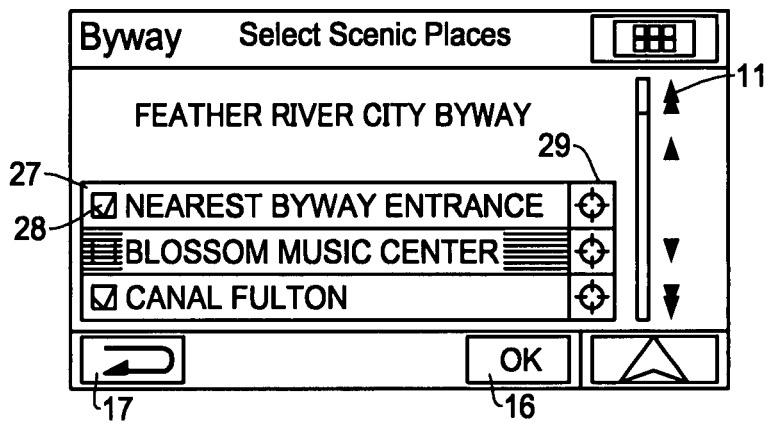
Figure 4M:
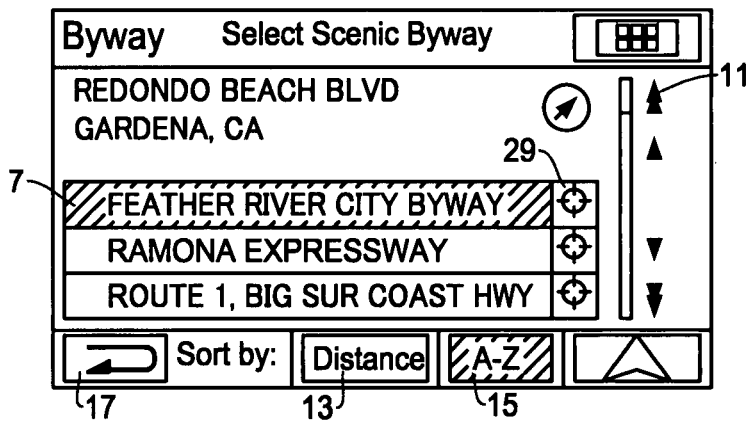

FIGS. 4H-4J and 4M show examples of screen of the navigation system that will be appeared during the process for obtaining a map image of a particular byway point. FIG. 4H shows a screen which includes the scenic place list 27 which lists the scenic places (byway points) associated with the selected scenic byway. The map image key 29 provided to each of the entry in the scenic place list 27 is used to display a map image of the selected scenic place. In the example of FIG. 4M, the map image key 29 is provided to each of the entry in the scenic byway list 7 (rather than scenic place list 27) to show a map image of the selected scenic byway.

FIG. 4I shows a situation where the user has activated the map image key 29 with respect to a particular entry "NEAREST BYWAY ENTRANCE" in the scenic place list 27. Then, the navigation system will display the map image of the selected scenic place, in this example, "NEAREST BYWAY ENTRANCE", as shown in FIG. 4J. Thus, in the example of FIG. 4J, the navigation system illustrates a map image of the nearest byway entrance "1825 Virgin Fall" of the scenic byway "FEATHER RIVER CITY BYWAY". The user may zoom-in or zoom-out the map image and may also scroll the map image by operating a direction (zoom) key 18. A cursor 19 may be used to specify a location on the map image to zoom-in or zoom-out the map image at the specified location.

FIGS. 4K and 4L show examples of operation of the present invention involved in selecting two or more byway points (scenic places). As explained with reference to FIG. 4D, the user is able to select scenic places from the scenic place list 27 by placing the check marks in the check boxes 28. FIG. 4K shows such a situation where the user places one or more check marks in the check boxes 28 to select favorite scenic places.

As shown in the display example of FIG. 4K, it is possible to select a plurality of scenic places because a scenic byway typically has two or more scenic places. However, due to performance slow-down that can be caused by calculation of a large number of scenic places to visit, the navigation system may preferably have a numeric limit of the scenic places that can be selected at the same time. For example, the maximum number of the scenic places that can be selected may be limited to a practical number such as six.

Thus, in the example of FIG. 4L, scenic places "CANAL FULTON" and "NEAREST BYWAY ENTRANCE" are checked, and suppose four other scenic places points (not shown) are already checked, a check box 28 for the remaining scenic place "BLOSSOM MUSIC CENTER" is disabled. In FIG. 4L, to show that the number of selection is reached to the maximum number, for the scenic place "BLOSSOM MUSIC CENTER", the corresponding check box 28 is shaded and disabled in the scenic place list 27. In other words, if the maximum number of the scenic place has been reached, the check boxes for unchecked entries remain shaded and disabled. As noted above, FIG. 4M shows a situation where the map image key is provided to each entry in the scenic byway list 7 rather than the scenic place list 27.

Figure 5A:
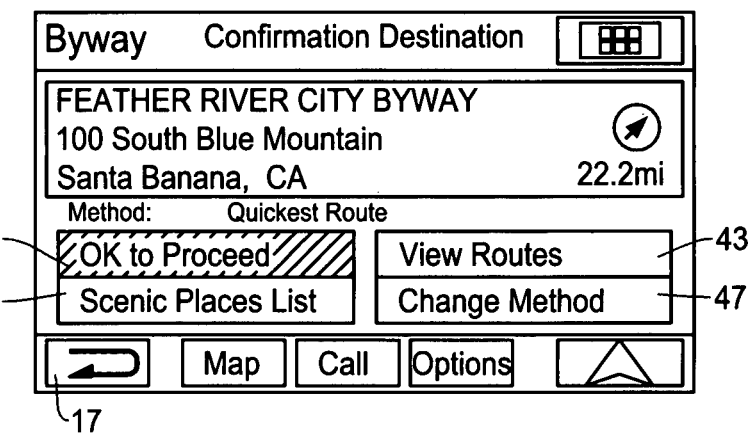
FIGS. 5A-5N are schematic diagrams showing examples of screen and operational procedure of the navigation method and system that generally follow after the procedure of FIGS. 4A-4L through the scenic byway mode of the present invention.
Figure 5B:
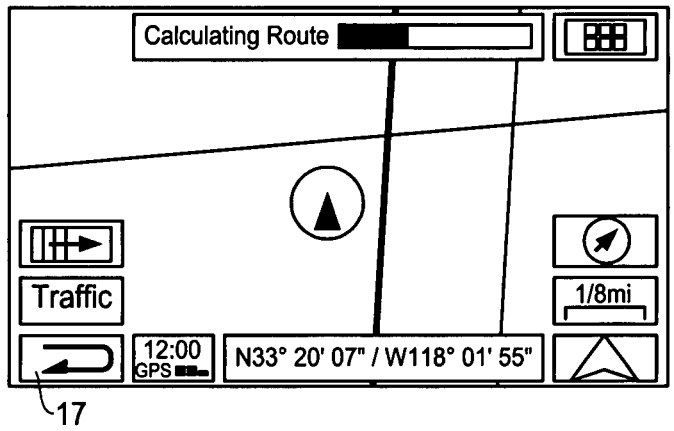
FIG. 5B shows a screen including a route calculation progress indicator.
Figure 5C:
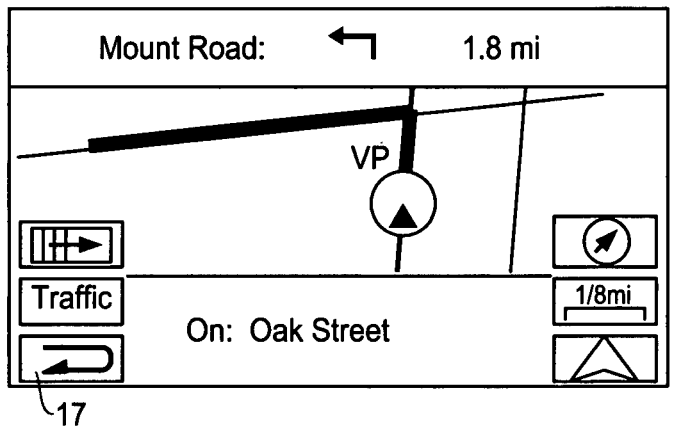
FIG. 5C shows a screen where the navigation system is conducting the route guidance operation.
Figure 5D:
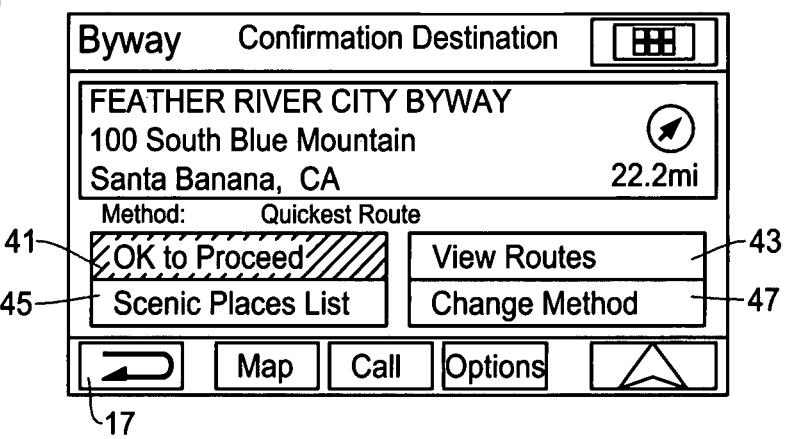
FIGS. 5D-5I show examples of screen of the navigation system which will be displayed when there are possible guidance restrictions.
Figure 5E:
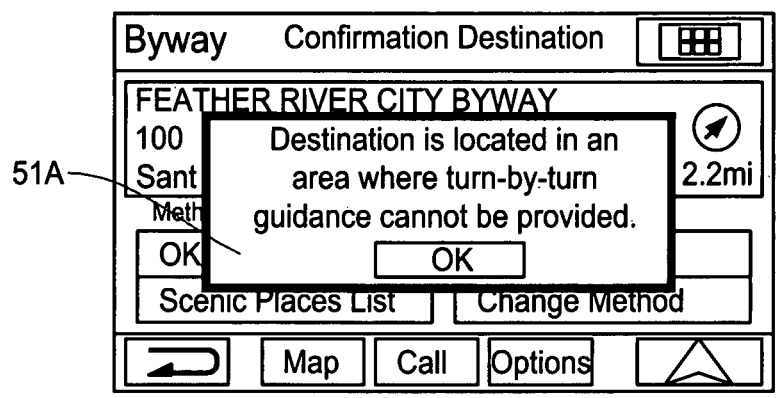
Figure 5F:
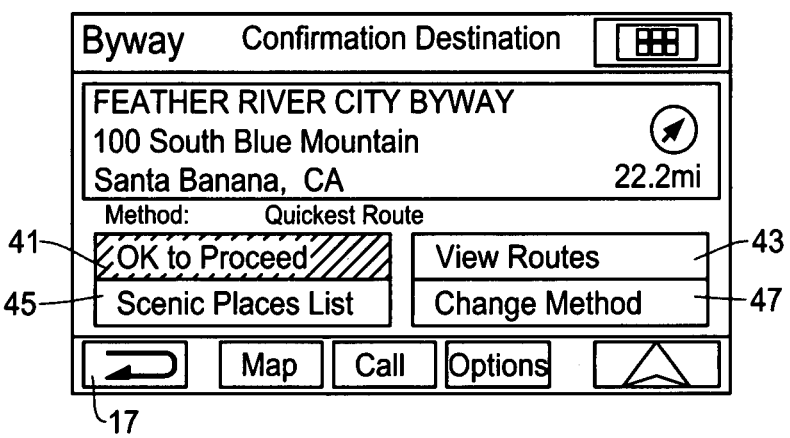
Figure 5G:
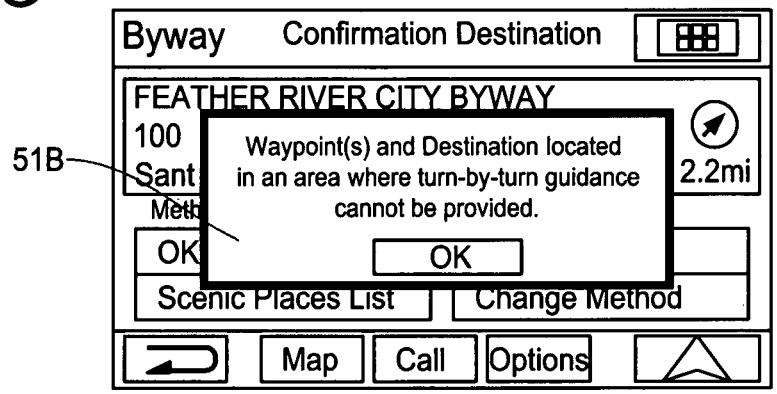
Figure 5H:
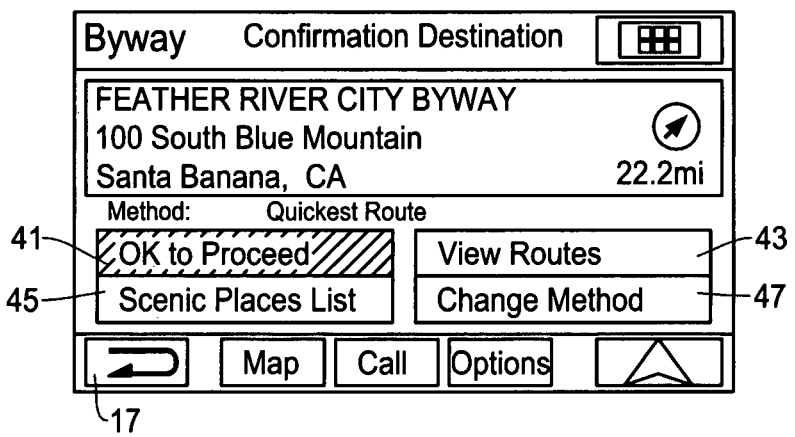
Figure 5I:
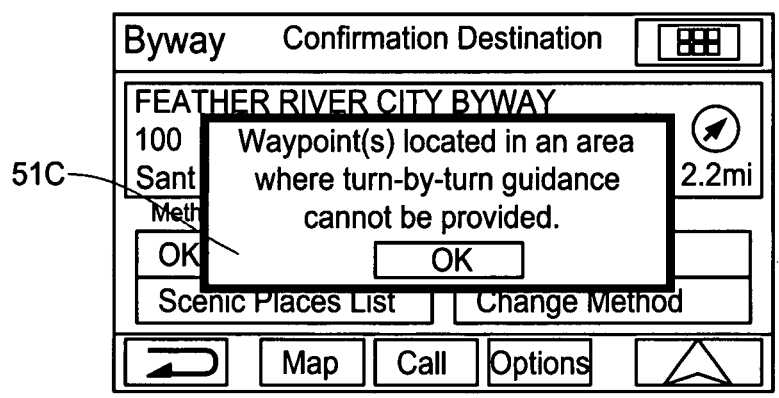
Figure 5J:
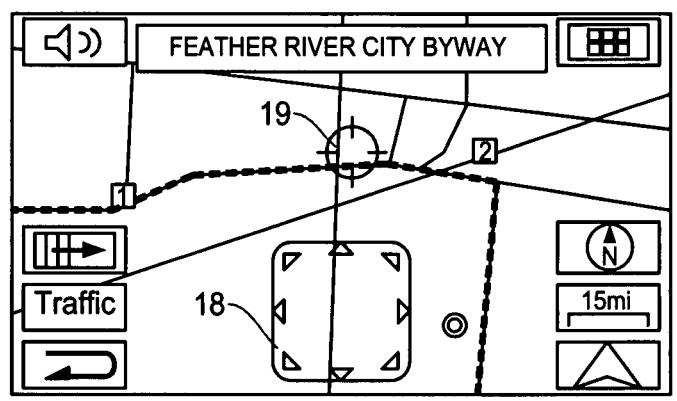
FIGS. 5J and 5K show examples of screen that will be displayed when the user pressed the map key on the confirmation screen.
Figure 5K:
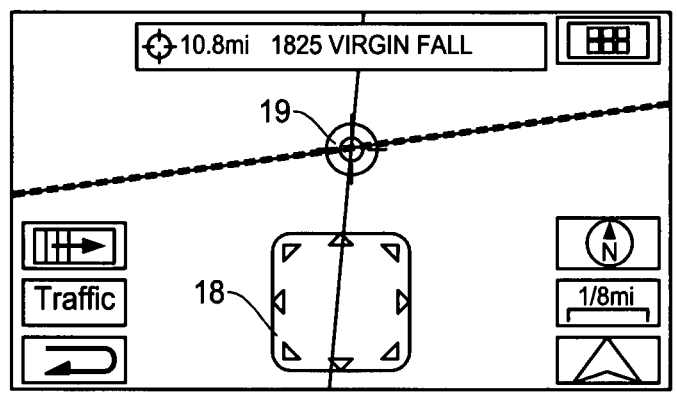
Figure 5L:
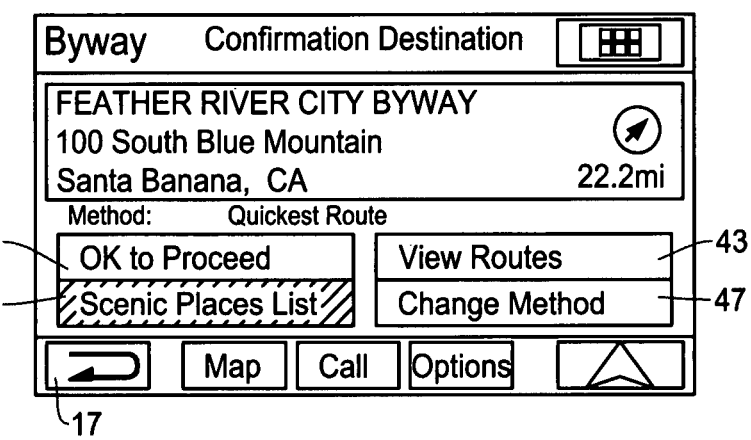
FIG. 5L shows the confirmation screen where the user presses the "Scenic Place List" key.
Figure 5M:
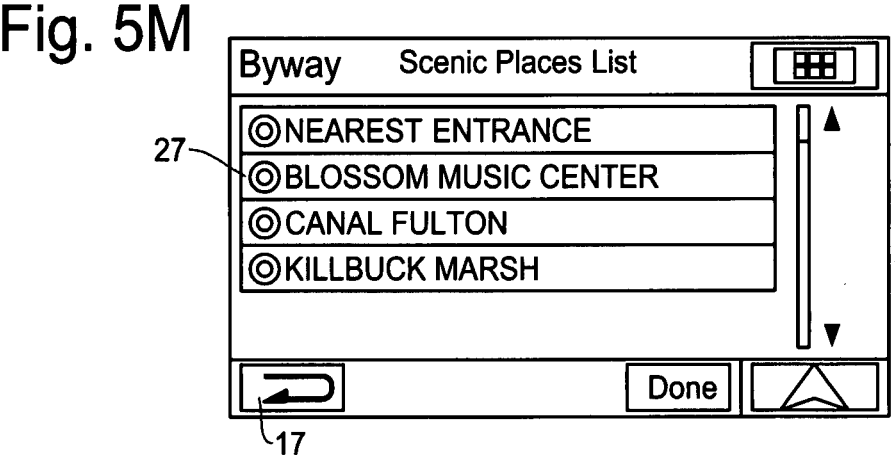
FIG. 5M shows a situation where the navigation system displays the scenic place list.
Figure 5N:
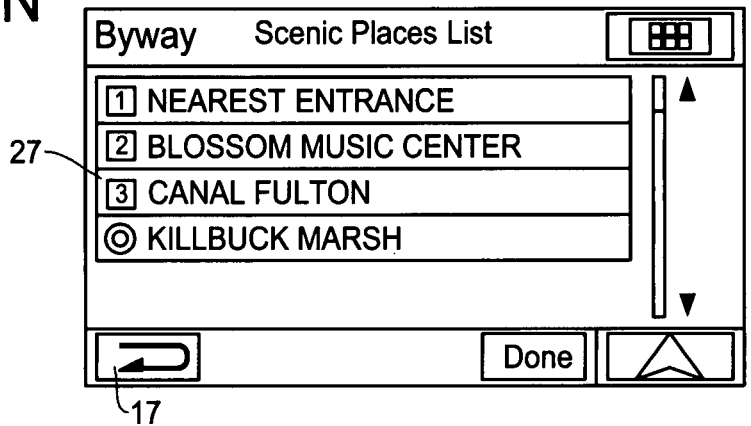

FIGS. 5A-5N are schematic diagrams showing examples of screen and operational procedure of the navigation method and system that generally follow after the procedure of FIGS. 4A-4L through the scenic byway mode of the present invention. When the user adds the marks in the check boxes 28 to select the scenic places to visit as shown in FIG. 4G and presses the OK button 16, the navigation system will display a screen shown in FIG. 5A. This screen is to confirm the scenic place selected in the previous procedure as a destination so that the navigation system will calculate an optimum route to the destination.

In the example of FIG. 5A, the screen includes several options which are "OK to Proceed" key 41, "View Routes" key 43, "Scenic Place List" key 45, and "Change Method" key 47. When the user activates the "OK to Proceed" key 41, the navigation system will calculate a route that guides to the selected scenic places (byway points). FIG. 5B shows a display that depicts the map image and the route calculation progress indicator that is shown while the route to the destination is calculated. After the route calculation, the navigation system starts the route guidance to the selected scenic places in the manner shown in FIG. 5C in which the navigation system shows the calculated route and the intersection that are highlighted to show the next turn and a direction of the turn (turn-by-turn guidance).

FIGS. 5D-5I show examples of screen of the navigation system which will be displayed when there is a possible guidance restriction. Those screens will appear when the user has pressed the "OK to Proceed" key 41 after selecting the scenic byway and/or scenic places for the route guidance operation, however, the route guidance is unavailable or limited. FIGS. 5D-5I are directed to such a situation, since the scenic places have natural, scenic, historical, and cultural qualities, there may not be appropriate roads for driving a vehicle to a particular scenic place.

FIGS. 5D and 5E show an example of pop-up screen with a message indicating that there is a limit to the route guidance operation. When the user presses the "OK to Proceed" key 41 on the confirmation screen of FIG. 5D, the navigation system displays a screen of FIG. 5E. In this example, the warning sign 51A popped-up on the navigation screen indicates that the destination, i.e., the selected scenic place, is located in an area where turn-by-turn guidance cannot be provided.

Similarly, FIGS. 5F and 5G show another example of pop-up screen with a message indicating that there is a limit to the route guidance operation. When the user presses the "OK to Proceed" key 41 on the confirmation screen of FIG. 5F, the navigation system displays a screen of FIG. 5G. In this example, the warning sign 51B popped-up on the navigation screen indicates that the waypoint and destination, i.e, the intermediate scenic places and the final scenic place are located in an area where turn-by-turn guidance cannot be provided.

Similarly, FIGS. 5H and 5I show a further example of pop-up screen with a message indicating that there is a limit to the route guidance operation. When the user presses the "OK to Proceed" key 41 on the confirmation screen of FIG. 5H, the navigation system displays a screen of FIG. 5I. In this example, the warning sign 51C popped-up on the screen indicates that the waypoint, i.e., the selected scenic place, is located in an area where turn-by-turn guidance cannot be provided.

As noted above, these situations involving the warning signs 51A-51C occur when there is not an appropriate road for a vehicle to reach the scenic place. Further examples of message in the pop-up screen may include such warnings as "Destination is located on a pedestrian walkway" (i.e., vehicle is not allowed), "You will be guided to your nearest road" (i.e., not to the selected scenic place but close to there), or "Destination is located on an avoided road. Do you still want to proceed?", etc.

FIG. 5J shows an example of screen that will be displayed when the user has pressed the map key on the confirmation screen of FIG. 5A. The navigation system shows the map image encompassing the selected scenic byway that includes the selected scenic places. The selected scenic places are represented by, for example, the reference numbers that indicates the order of visit and are located on the map image as shown in FIG. 5J.

The user may zoom-in or zoom-out the map image by pointing a location by a cursor 19, and may scroll the map image as well by operating a direction key 18. The screen of FIG. 5K shows the display example where the user has scrolled the map image to show an area apart from that of FIG. 5J. The map image of FIG. 5K is also zoomed-up from the map image of FIG. 5J to show the enlarged map at the location pointed by the cursor 19.

FIG. 5L shows the confirmation screen similar to that of FIG. 5A except that the user presses the "Scenic Place List" key 45. In response, the navigation system will display the scenic place list 27 which lists the selected scenic places as shown in FIG. 5M. In this example, all of the scenic places in the list 27 have the same destination mark (double circle). In the example of FIG. 5N, the destination mark is provided to only the last scenic place to visit while the numeric characters are provided to the other scenic places to show the order of scenic places to visit on the selected scenic byway. The final destination may not necessary be the final scenic place but can be a user's home, hotel, etc.

Figure 6A:
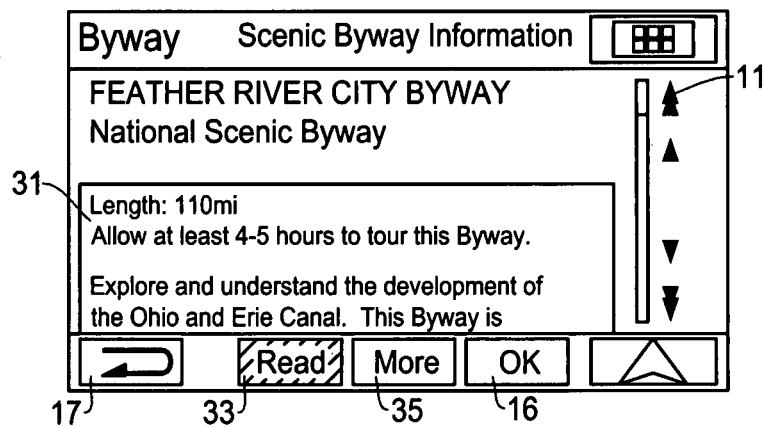
FIGS. 6A-6P are schematic diagrams showing examples of screen and operational procedure of the navigation method and system that generally involved in obtaining detailed information on the scenic byway and scenic places through the scenic byway mode of the present invention.
Figure 6B:
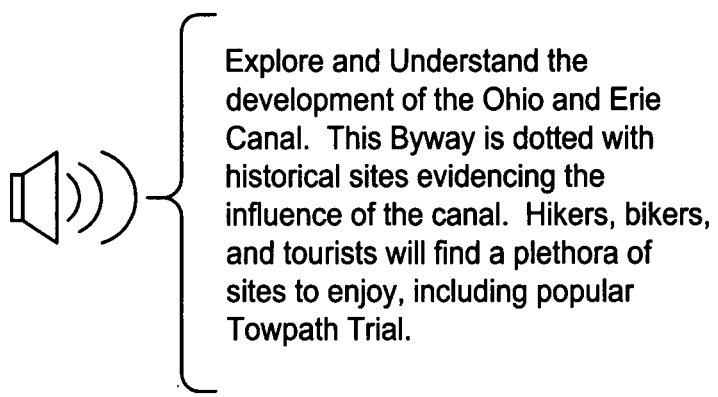
FIG. 6B shows a situation where the navigation system reproduces the information by audible sounds.
Figure 6C:
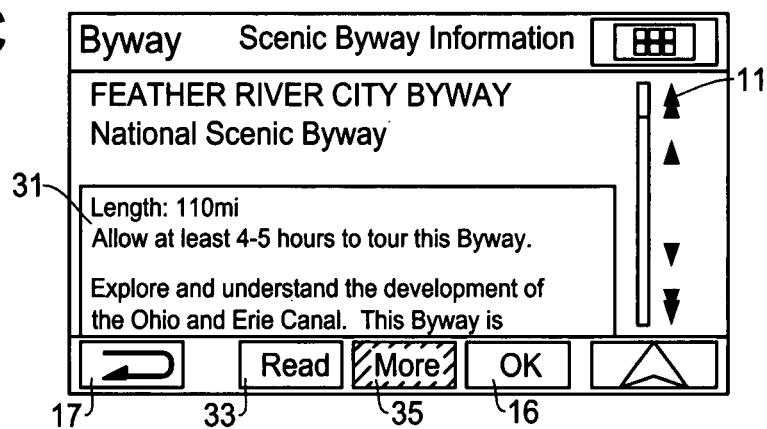
FIG. 6C shows a situation where the user presses the "More" key for obtaining additional information.
Figure 6D:
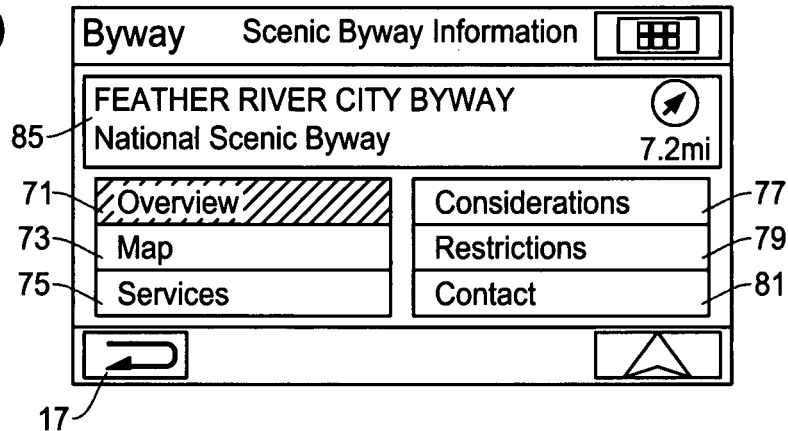
FIG. 6D is a screen example in which an "Overview" key is selected for retrieving the additional information.
Figure 6E:
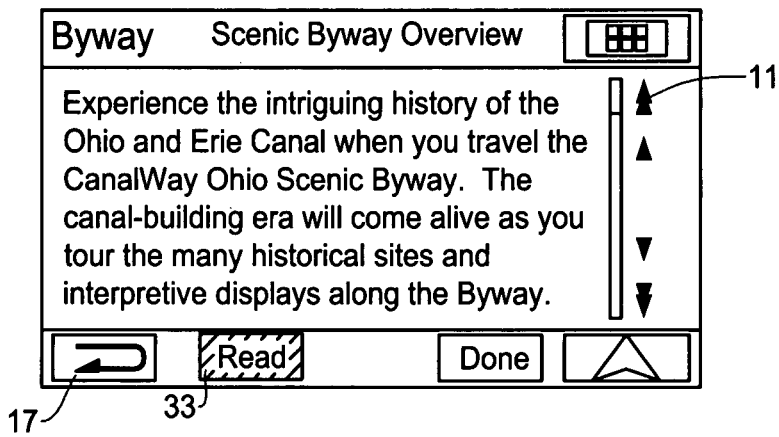
FIG. 6E is a screen example that follows FIG. 6D.
Figure 6F:
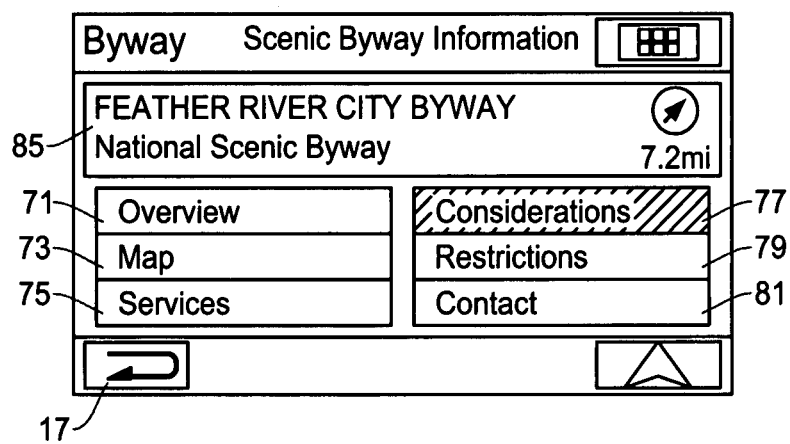
FIG. 6F is a screen example in which a "Consideration" key is selected.
Figure 6G:
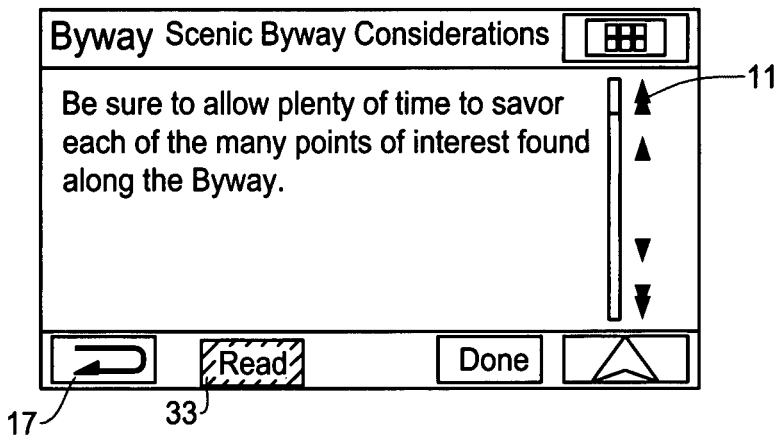
FIG. 6G is a screen that follows FIG. 6F.
Figure 6H:
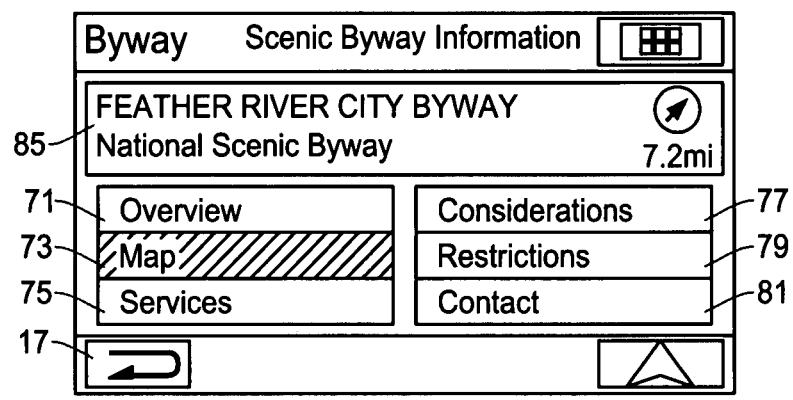
FIG. 6H is a screen example in which a "Map" key is selected.
Figure 6I:
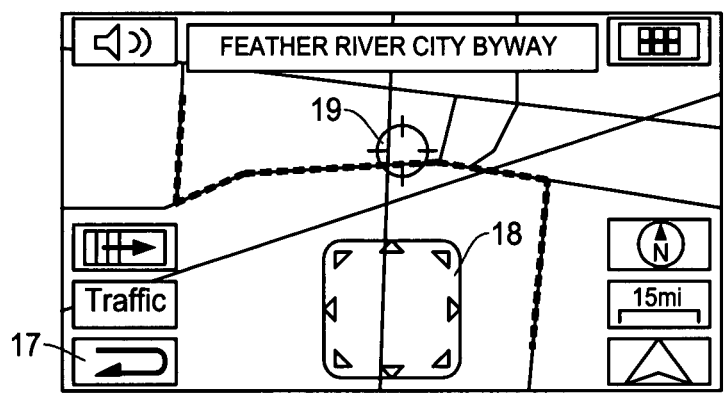
FIG. 6I is a screen example that follows FIG. 6H.
Figure 6J:
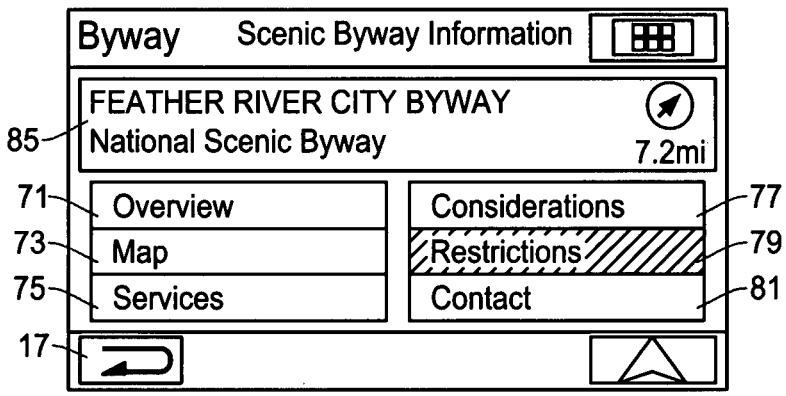
FIG. 6J is a screen example in which a "Restriction" key is selected.
Figure 6K:
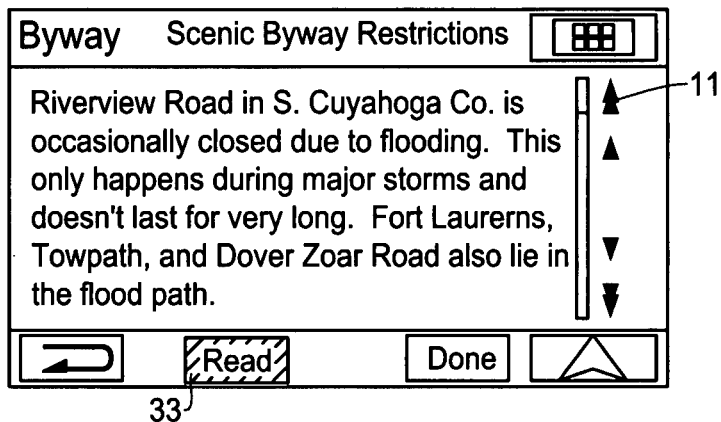
FIG. 6K is a screen that follows FIG. 6J.
Figure 6L:
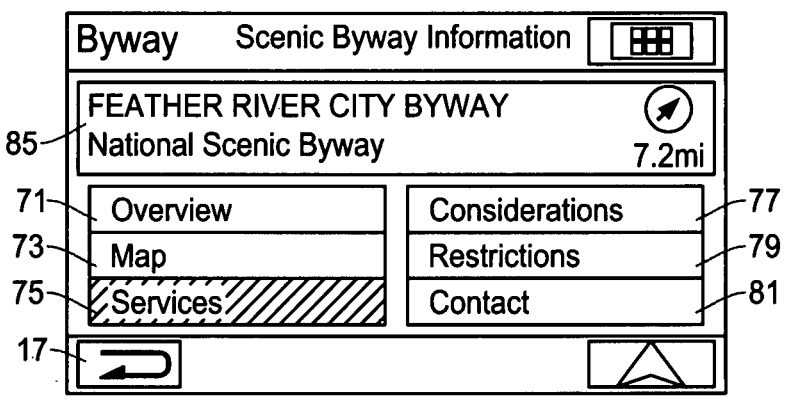
FIG. 6L is a screen example in which a "Services" key is selected.
Figure 6M:
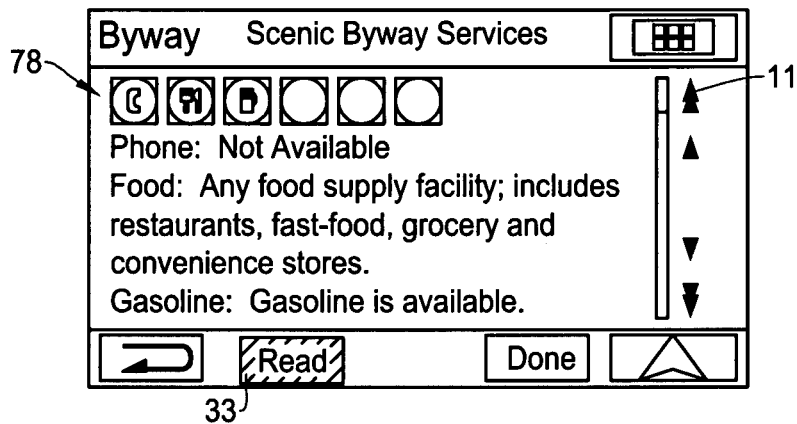
FIG. 6M is a screen that follows FIG. 6L.
Figure 6N:
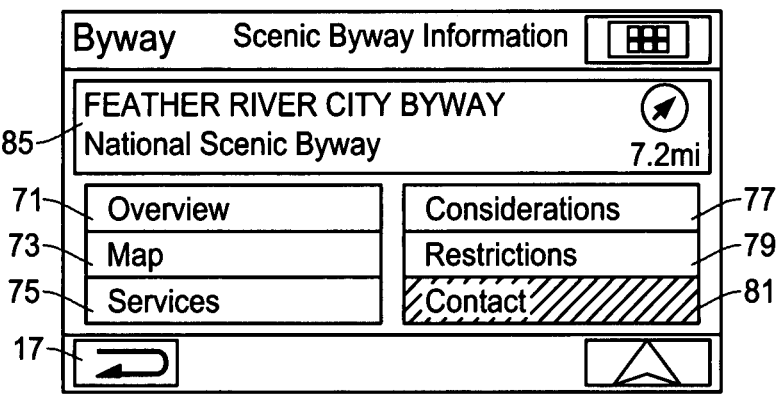
FIG. 6N is a screen example in which a "Contact" key is selected.
Figure 6O:
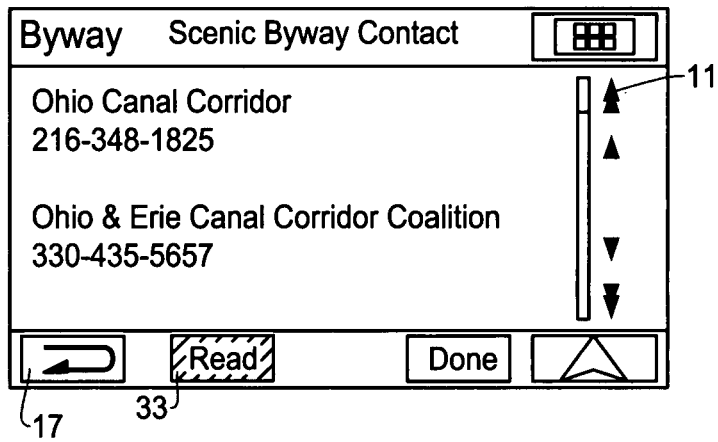
Figure 6P:
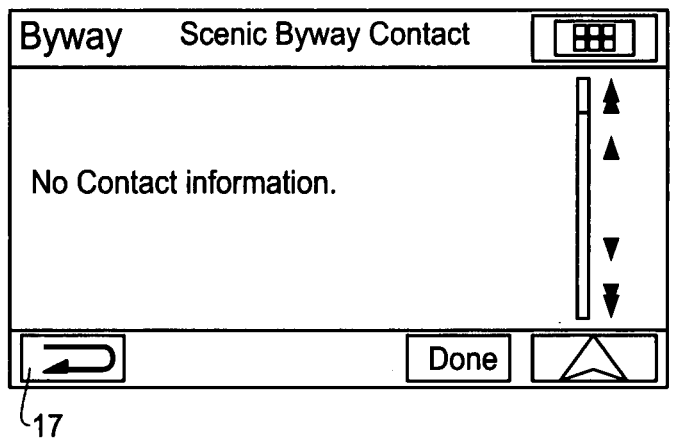

FIGS. 6A-6P are schematic diagrams showing examples of screen and operational procedure of the navigation method and system that generally involve in obtaining detailed information on the scenic byway and scenic places through the scenic byway mode of the present invention. The screen of FIG. 6A is similar to that of FIG. 4F that shows the detailed information on the selected scenic byway and several options (selection keys). In the example of FIG. 6A, the user presses the "Read" key 33 for requesting the navigation system to read aloud the information regarding the selected scenic byway. Then, the navigation system will generate audible sounds reproducing the information on the selected scenic byway as shown in FIG. 6B, which promotes the safe driving since the user does not have to read the text on the screen.

The screen of FIG. 6C is similar to that of FIG. 4F and FIG. 6A that show the detailed information on the selected scenic byway and several options. In the example of FIG. 6C, the user presses the "More" key 35 for obtaining additional information regarding the selected scenic byway. Then, the navigation system will display a screen of FIG. 6D which lists further options (menu keys or selection keys), for retrieving the additional information on the selected scenic byway.

In this example of FIG. 6D, the screen includes an "Overview" key 71, a "Map" key 73, a "Service" key 75, a "Consideration" key 77, a "Restriction" key 79, and a "Contact" key 81. The "Overview" key 71 is used to retrieve overview information of the selected scenic byway, the "Map" key 73 is used to retrieve a map image of the selected scenic byway, and the "Service" key 75 is used to retrieve the information regarding the services available in the selected scenic byway.

Further in FIG. 6D, the "Consideration" key 77 is used to retrieve the information that must be thought about when the user is planning to visit the selected scenic byway, the "Restriction" key 79 is used to retrieve the information regarding restrictions involved in the selected scenic byway, and the "Contact" key 81 is used to retrieve the information concerning the contact of the selected scenic byway, such as telephone number. On the screen of FIG. 6D, the name of the selected scenic byway "FEATHER RIVER CITY BYWAY" is shown in the window 85.

When the user presses the "Overview" key 71 through the screen of FIG. 6D, the navigation system will display a screen such as shown in FIG. 6E which provides information regarding the overview of the selected scenic byway. The overview information may include basic features and highlights of the selected scenic byway so that the user is able to acquire a basic image and knowledge for visiting the selected scenic byway. The user is able to scroll the screen to view more information by pressing the scroll keys 11 in up-and-down. Although the overview on the selected scenic byway is displayed in the text form in FIG. 6E, the voice speech may also be produced by pressing the "Read" key 33 or automatically when the system is so set-up.

The screen of FIG. 6F is similar to that of FIG. 6D except that it shows the situation where the user presses the "Consideration" key 77. Then, the navigation system will display a screen such as shown in FIG. 6G which provides information regarding the considerations such as warnings and recommendations associated with the selected scenic byway. The considerations information may also include traffic information (dangerous spot, etc) and view area information that is easy to miss while driving, and other useful advice. The user is able to scroll the screen to view more information by pressing the scroll keys 11 in up-and-down. Although the consideration regarding the selected scenic byway is displayed in the text form in FIG. 6G, the audible sounds reproducing the same information may also be generated automatically or by pressing the "Read" key 33.

The screen of FIG. 6H is similar to that of FIG. 6D except that it shows the situation where the user presses the "Map" key 73. Then, the navigation system will display a screen such as shown in FIG. 6I which produces a map image of the selected scenic byway. The map image preferably includes the whole route and scenic places of the selected scenic byway. On the map image, the user is able to zoom-in or zoom-out the map image or scroll the map image by operating the direction key 18. The user is able to specify a location on the map image by the cursor 19 to zoom-in or zoom-out the map image, to check POIs (points of interest), etc., at the specified location.

The screen of FIG. 6J is similar to that of FIG. 6D except that it shows the situation where the user presses the "Restriction" key 79. Then, the navigation system will display a screen such as shown in FIG. 6K which provides information regarding the restrictions that the user may be encountered in the selected scenic byway. The restriction information may include regulation that prohibits certain activities by the user at certain locations in the scenic byway, times or seasons, etc.

The restriction information may be the data that have been accumulated in the map database of the navigation system or the data that is dynamically retrieved by connecting the navigation system to a network such as internet or satellite radio. The user is able to scroll the screen to view more information by pressing the scroll keys 11 in up-and-down. Although the restriction information regarding the selected scenic byway is displayed in the text form in FIG. 6K, the audible sounds reproducing the same information may also be generated automatically or by pressing the "Read" key 33.

The screen of FIG. 6L is similar to that of FIG. 6D except that it shows the situation where the user presses the "Service" key 75. Then, the navigation system will display a screen such as shown in FIG. 6M which provides information regarding the services available in the selected scenic byway. The services information may include phone numbers of available services, food facilities, gas stations, rest rooms and rest areas, parking, hotels, etc. in the selected scenic byway and nearby.

As shown in FIG. 6M, icons 78 may be displayed to represent the available services for the user to easily grasp the available services at a glance. The user is able to scroll the screen to view more information by pressing the scroll keys 11 in up-and-down. Although the service information regarding the selected scenic byway is displayed in the text form in FIG. 6M, the audible sounds reproducing the same information may also be generated automatically or by pressing the "Read" key 33.

The screen of FIG. 6N is similar to that of FIG. 6D except that it shows the situation where the user presses the "Contact" key 81. Then, the navigation system will display a screen such as shown in FIG. 6O which provides information regarding the contacts available regarding the selected scenic byway. The contact information may include names of information centers or guide offices, their phone numbers, and other information, such as e-mail addresses or web addresses as well.

The user is able to scroll the screen to view more information by pressing the scroll keys 11 in up-and-down. Although the contact information regarding the selected scenic byway is displayed in the text form in FIG. 6O, the audible sounds reproducing the same information may also be generated automatically or by pressing the "Read" key 33. In the case where no contact information is available for the selected scenic byway, the navigation system will so notify by displaying a screen such as shown in FIG. 6P.

Figure 7A:
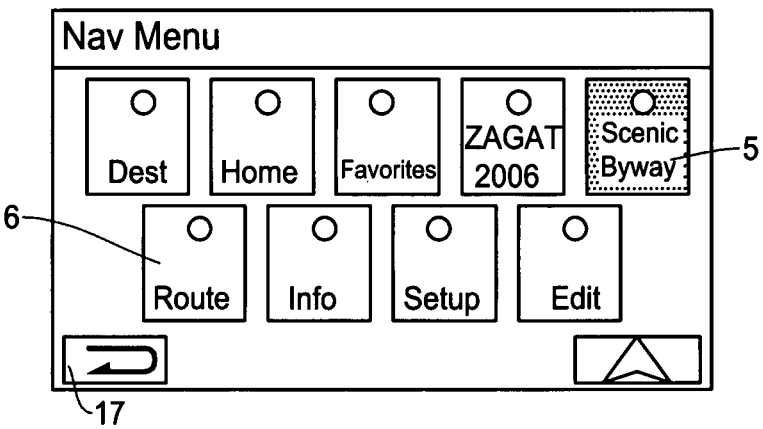
FIGS. 7A-7M show procedures and screen examples involved in the navigation method and system under the present invention with respect to the situation where the user has already selected the scenic byway mode.

Next, with reference to FIGS. 7A-7M, the procedures and screen examples involved in the navigation method and system under the present invention will be described with respect to the situation where the user has already selected the scenic byway mode. FIG. 7A is an example of screen showing the main menu of the navigation system that prompts the user to select the next action. In other words, FIG. 7A shows the situation in which the user has activated the main menu screen again after the user has selected the scenic byway mode and specified a certain scenic byway or a menu or key associated with the scenic byway mode.

Figure 7B:
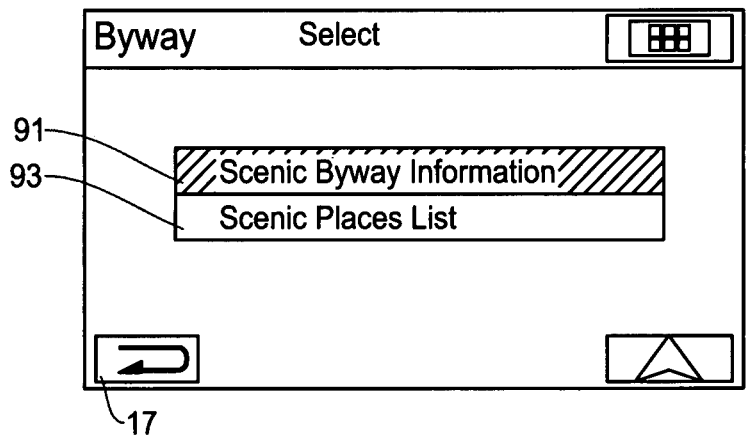

Since the user has already selected the scenic byway mode, the "Scenic Byway" key 5 in the main menu is highlighted by default. When the user presses an enter key or otherwise execute the navigation system in this situation, the navigation system will display a screen such as shown in FIG. 7B to quickly retrieve the data associated with the scenic byway that the user has selected in advance. In this example of FIG. 7B, the navigation screen includes a "Scenic Byway Information" key 91 and a "Scenic Place List" key 93 to prompt the user to select one of the keys.

Figure 7C:
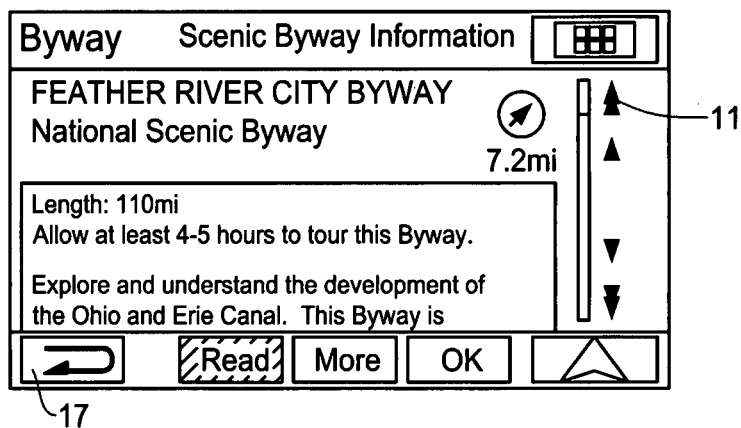

In FIG. 7B, when the user presses the "Scenic Byway Information" key 91, the navigation system displays a screen shown in FIG. 7C which includes the detailed information concerning the selected scenic byway. This screen is similar to the screen shown in FIGS. 4F and 6C noted above, and the "More" key 35 and the "Read" key 33 function in a similar manner as described above. The user is able to scroll the screen to view more information by pressing the scroll keys 11 in up-and-down.

Figure 7D:
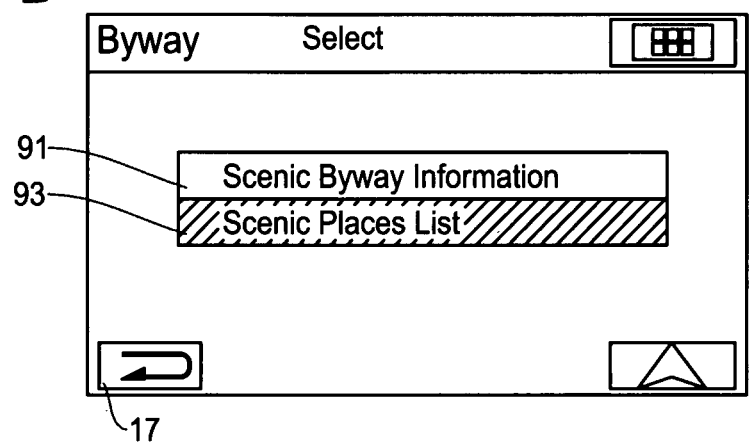

The screen of FIG. 7D is similar to that of FIG. 7B except that it shows the situation where the user presses the "Scenic Place List" key 93. Then, the navigation system will display a screen shown in FIG. 7E which lists the remaining scenic places that the user has not reached during the previous trip. In this example, as the user has reached the two selected scenic places from the original list (FIG. 5N), the navigation system will delete the two scenic places that the user has visited. Thus, the list of FIG. 7E starts with the scenic place of place number 3 as the first two scenic places have been reached, thereby dynamically updating the current situation. The double circle in the list indicates the destination, for example, the last scenic place of the selected scenic byway.

Figure 7E:
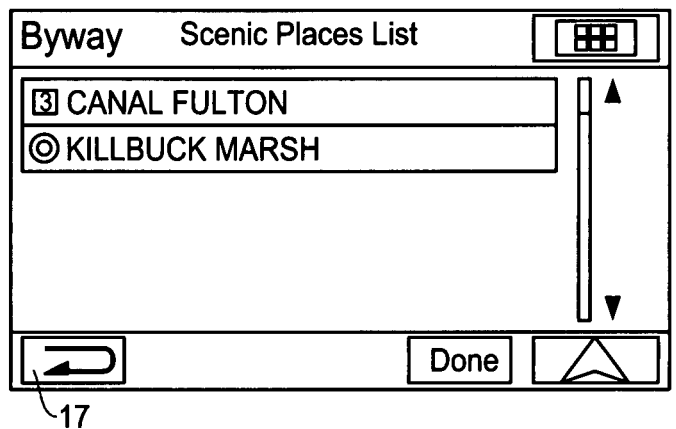
Figure 7F:
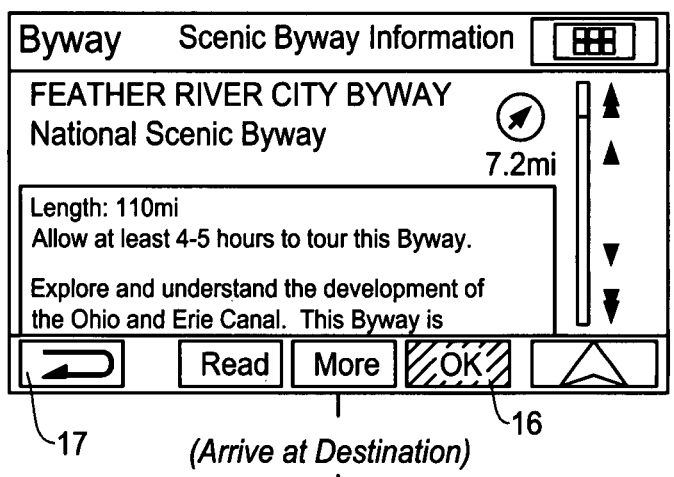
Figure 7G:
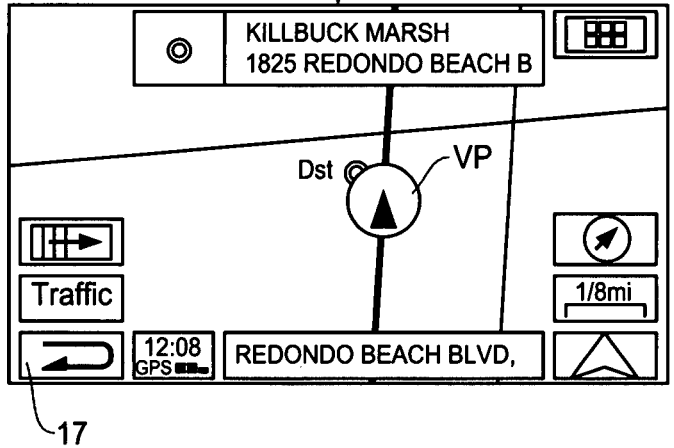

FIGS. 7F-7M show the situations where the navigation system displays the scenic byway screen but the navigation system is no longer in the scenic byway mode because either the user has reached all of the selected scenic places or the user has deleted all of the remaining scenic places. The screen of FIG. 7F is similar to that of FIG. 7B except that it shows the situation where the user presses the "OK" key 16. Then, the navigation system will display a screen shown in FIG. 7G which notifies that the user has arrived at the final destination (last selected scenic place). In this example, the mark VP showing the current vehicle position and the destination mark (double circle) are illustrated close to one another to indicate that the user has reached the destination.

Figure 7H:
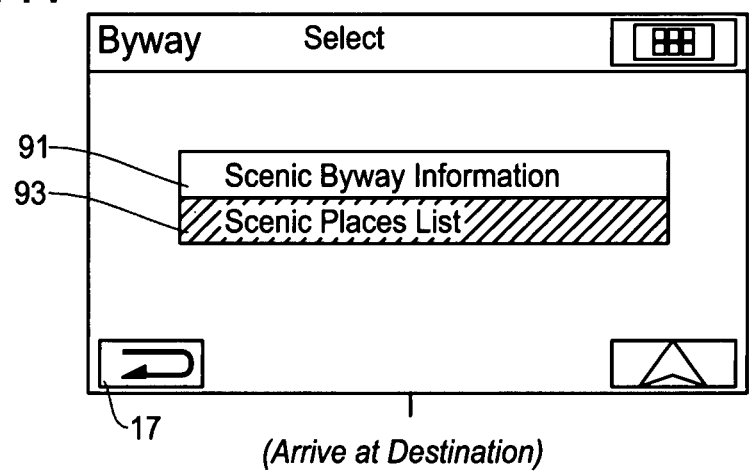
Figure 7I:
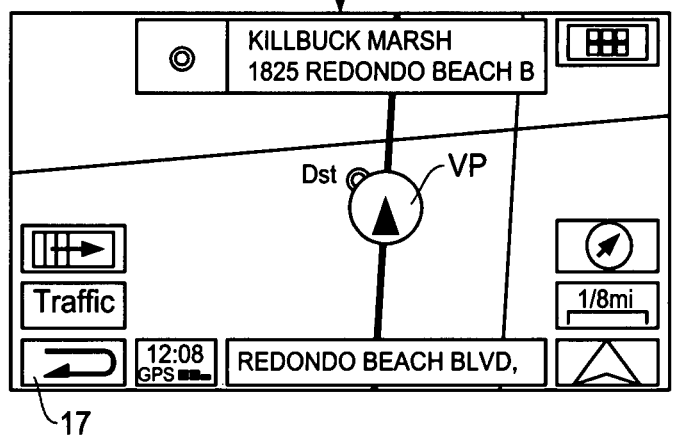

The screen of FIG. 7H is similar to that of FIG. 7D because the "Scenic Place List" key 93 is highlighted, however, it is assumed that in reality, the user has already reached the final destination. Then, the navigation system will display a screen shown in FIG. 7I which notifies that the user has arrived at the final destination such as the last scenic place. In this example, the mark VP showing the current vehicle position and the destination mark (double circle) are illustrated close to one another to indicate that the user has reached the destination.

Figure 7J:
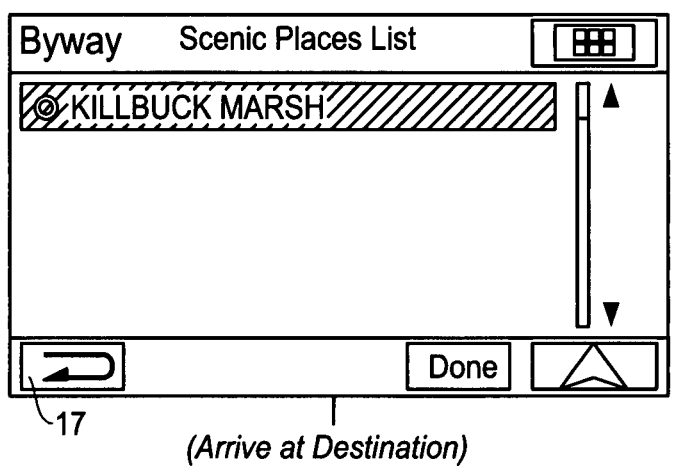
Figure 7K:
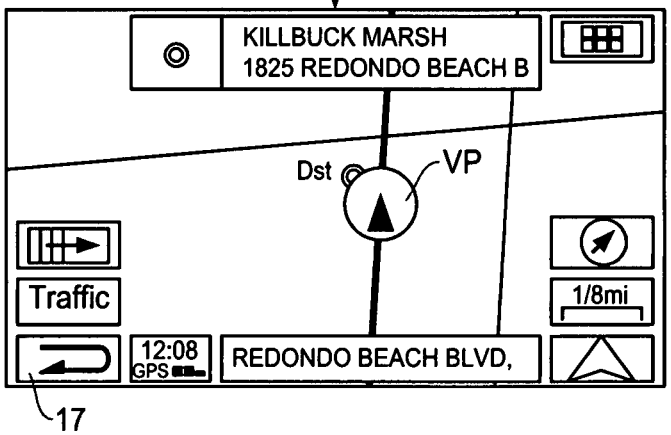

The screen of FIG. 7J is similar to that of FIG. 7E showing the scenic place list except that it shows only the last scenic place. However, it is assumed that in reality, the user has already reach the last scenic place. Then, if this scenic place is selected, the navigation system will display a screen shown in FIG. 7K which notifies that the user has arrived at the final destination such as the last scenic place. In this example, the mark VP showing current vehicle position and the destination mark (double circle) are illustrated close to one another to indicate that the user has reached the destination.

Figure 7L:
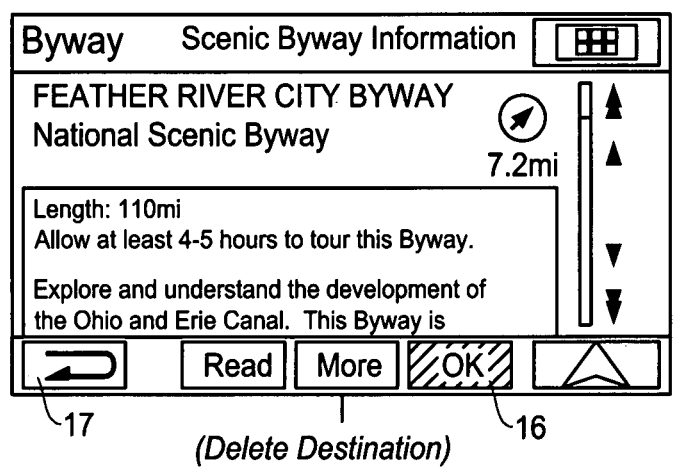
Figure 7M:
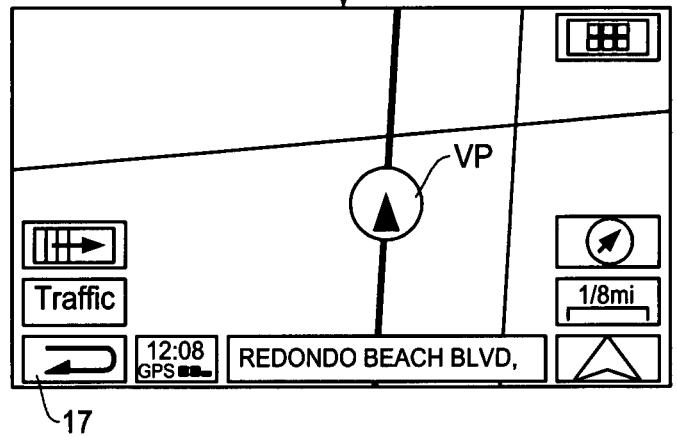

The screen of FIG. 7L is similar to that of FIG. 7C except that it shows the situation where the user presses the "OK" key 16 although the user has already deleted all of the remaining selected scenic places and the final destination. Then, the navigation system will display a screen shown in FIG. 7M which is in a locator map mode. In this example, since there is no longer a waypoint or a destination for the route guidance operation, the navigation system moves to the locator map mode to show the map image on which the mark VP showing current vehicle position is illustrated.

Figure 8A:
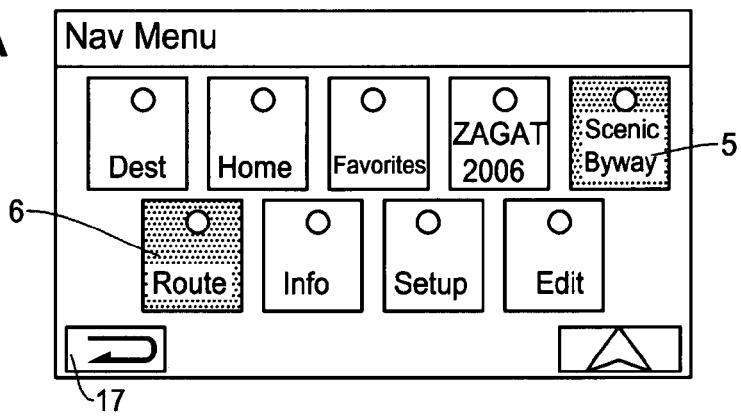
FIGS. 8A-8W show procedures and screen examples involved in the scenic byway mode in the navigation method and system of the present invention where the user has selected the "Route" key in the scenic byway mode.
Figure 8B:
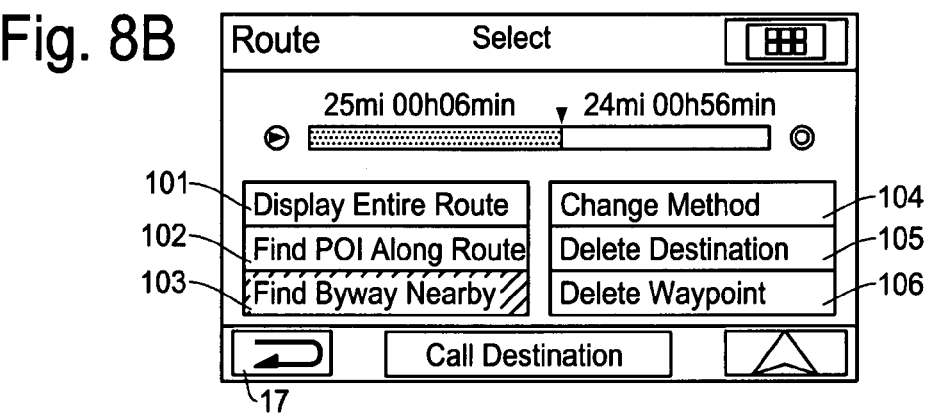
FIG. 8B shows a screen which provides a set of functions keys associated with the "Route" key.
Figure 8C:
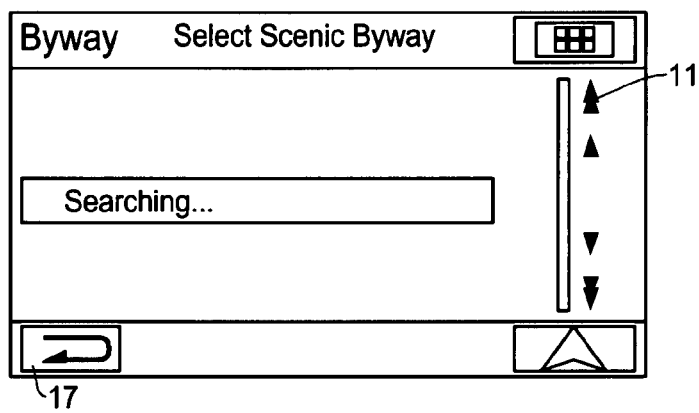
FIG. 8C is a screen showing that the search operation is in progress.
Figure 8D:
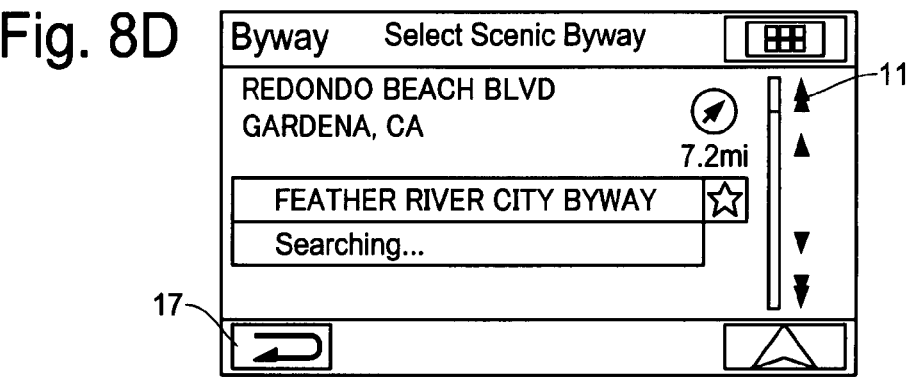
FIG. 8D shows a screen which lists the scenic byway as soon as at least one scenic byway is detected.
Figure 8E:
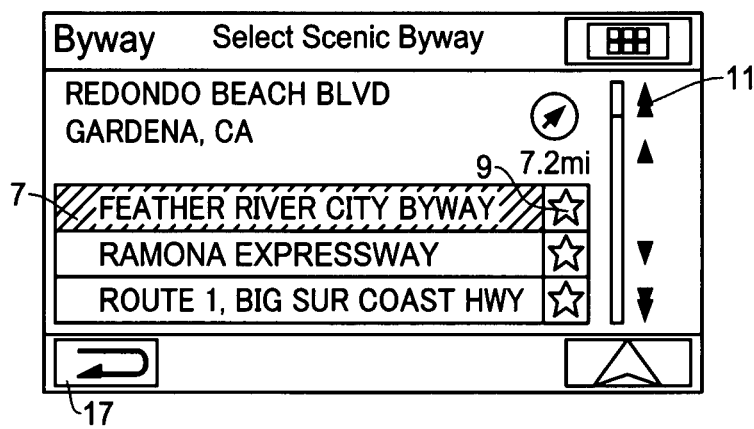
FIG. 8E is a screen showing a lists of nearby scenic byways.
Figure 8F:
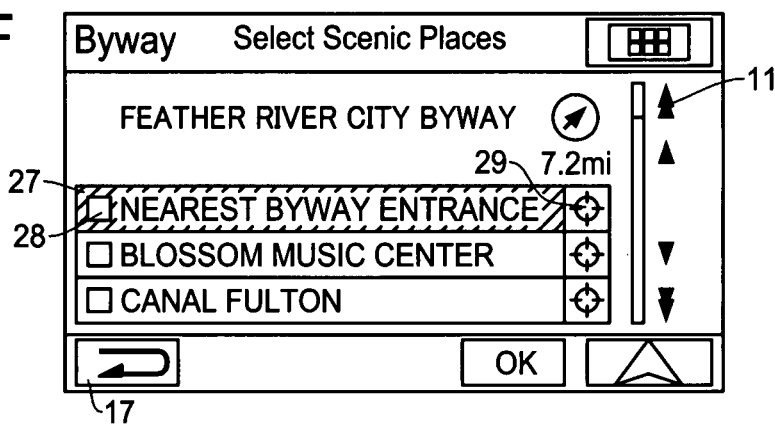
FIG. 8F is a screen which shows a scenic place list.
Figure 8G:
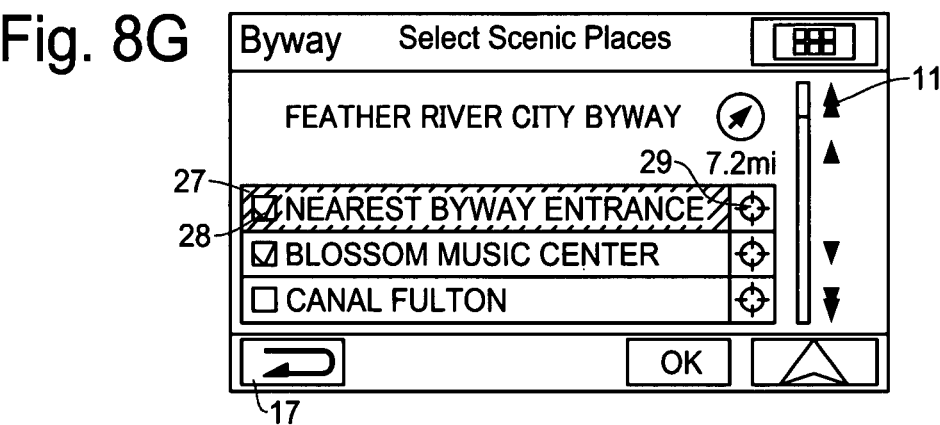
FIG. 8G shows a situation where two scenic places are provided with check marks.
Figure 8H:
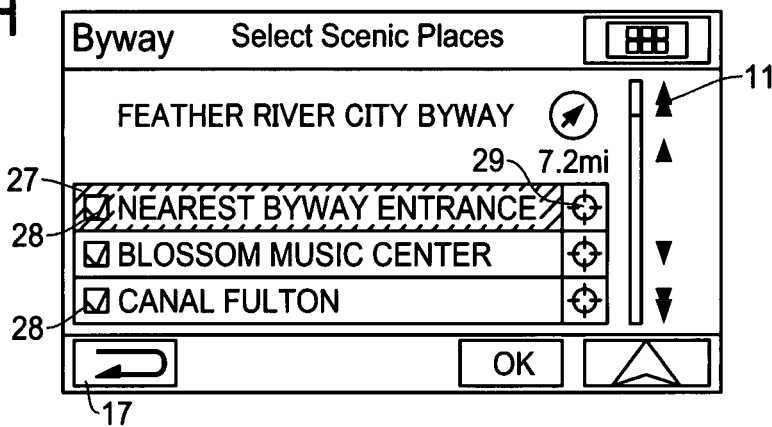
FIG. 8H shows a situation where all the scenic places have been selected.
Figure 8I:
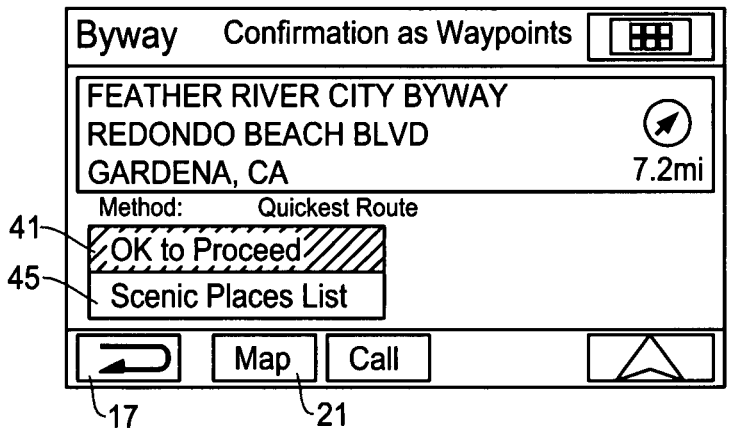
FIG. 8I shows a confirmation screen.
Figure 8J:
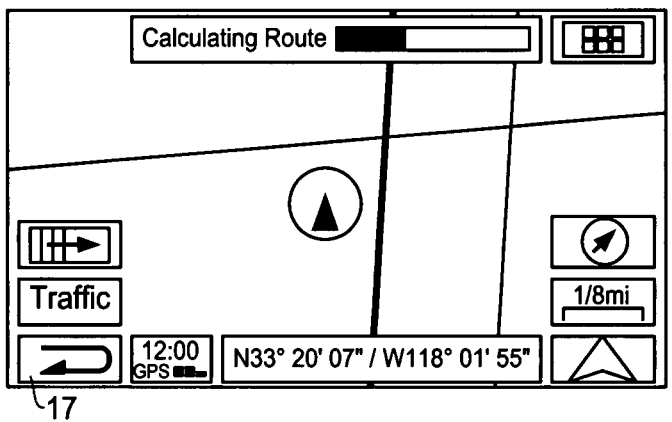
FIG. 8J shows a screen when the route calculation is in progress.
Figure 8K:
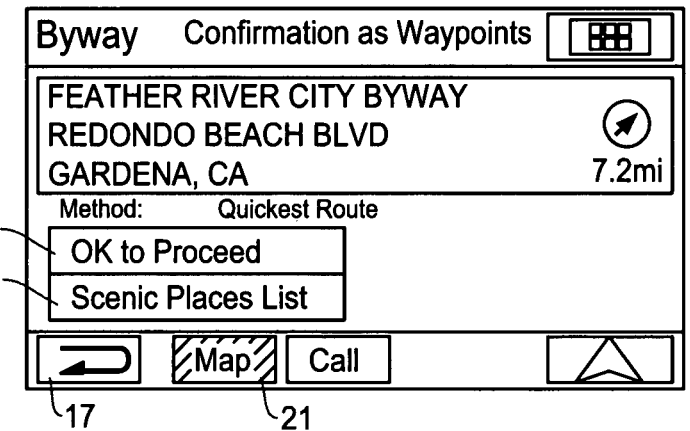
FIG. 8K shows a situation where the "Map" key is pressed.
Figure 8L:
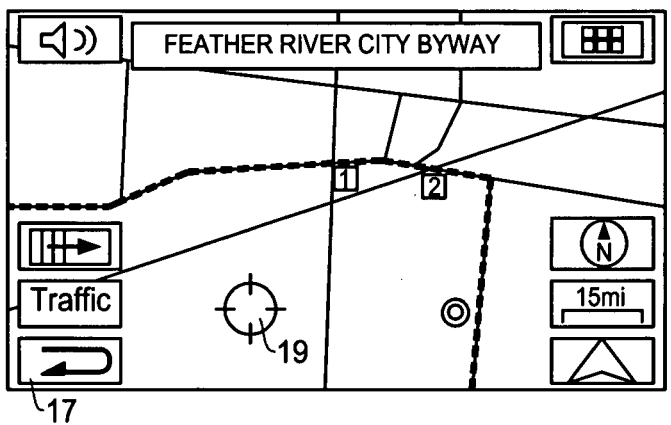
FIG. 8L is a screen showing the map image of the scenic places.
Figure 8M:
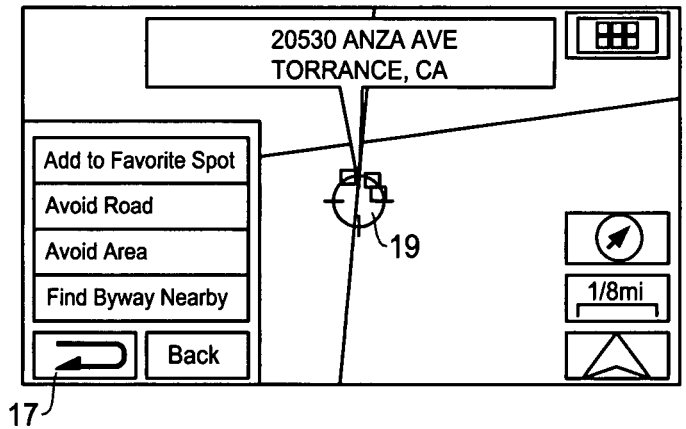
FIG. 8M is a screen including various options associated with the map image.
Figure 8N:
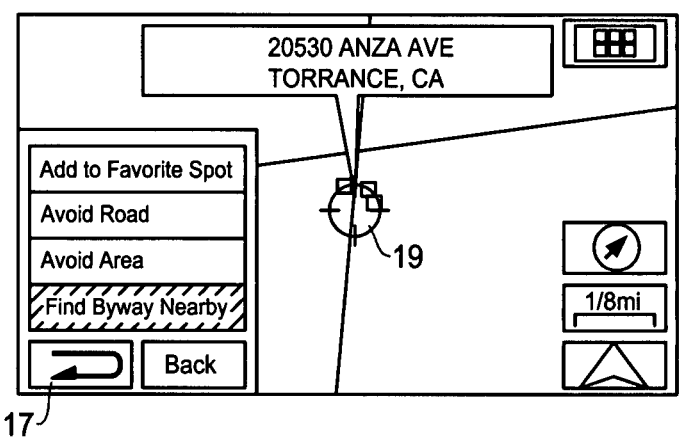
FIG. 8N shows a situation where the "Find Byway Nearby" is selected.
Figure 8O:
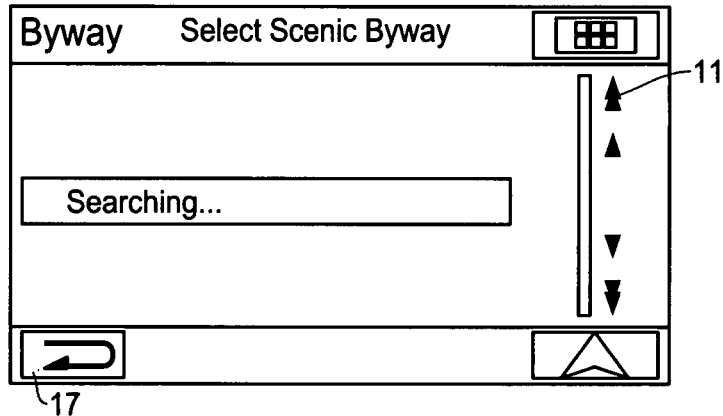
FIGS. 8O and 8P are screen examples when searching the nearby scenic byways.
Figure 8P:
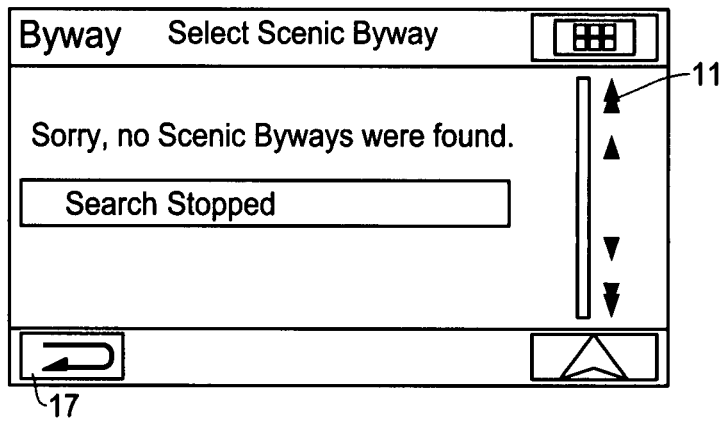
Figure 8Q:
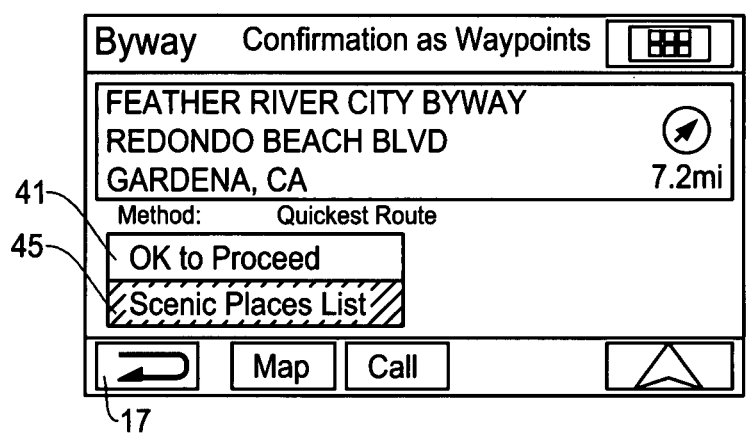
FIG. 8Q shows a situation where the "Scenic Place List" key is pressed.
Figure 8R:
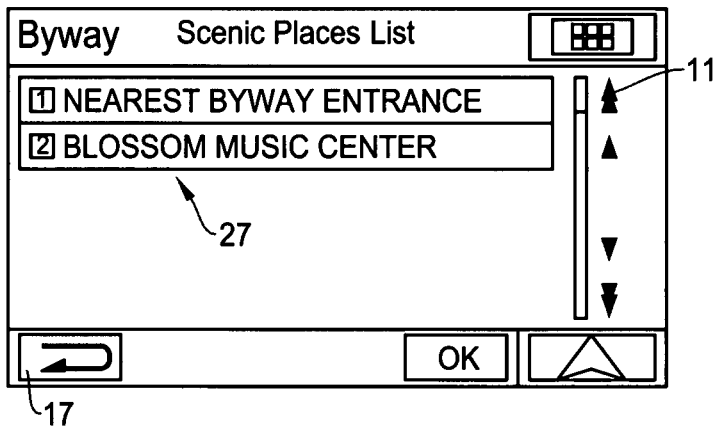
FIG. 8R shows the scenic place list.
Figure 8S:
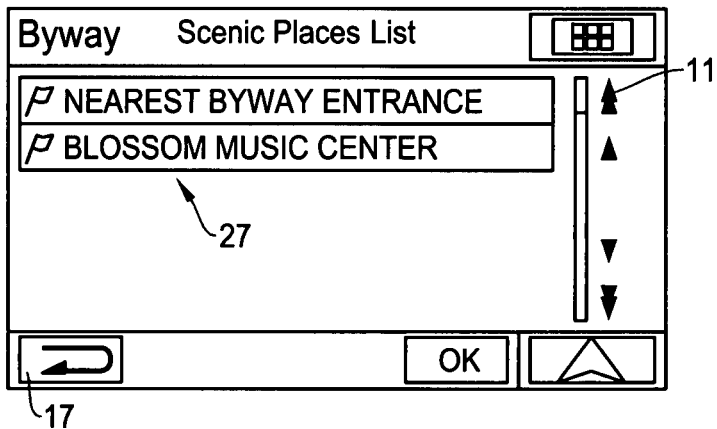
FIGS. 8S and 8T are screen example in which flag marks are used for scenic places.
Figure 8T:
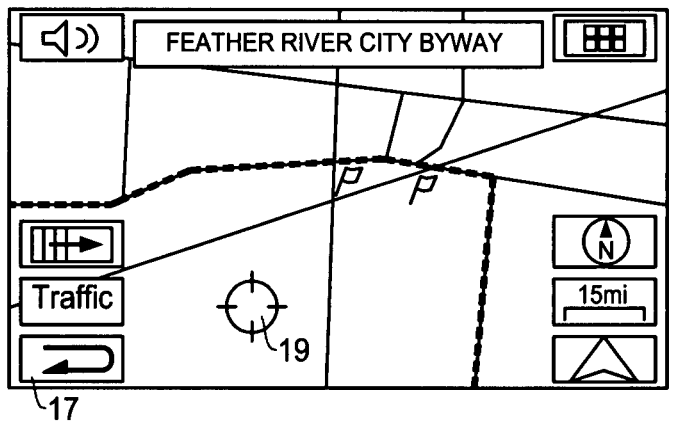
Figure 8U:
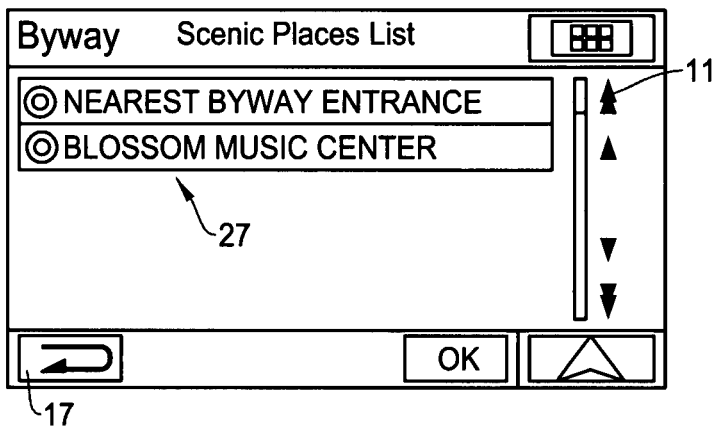
FIG. 8U is a screen in which destination marks are used for all the scenic places.
Figure 8V:
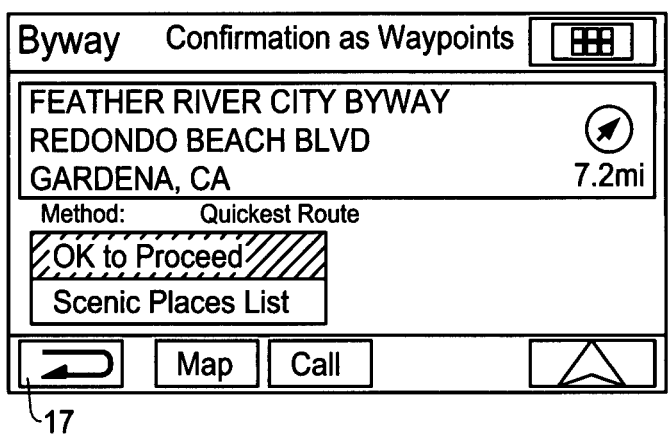
Figure 8W:
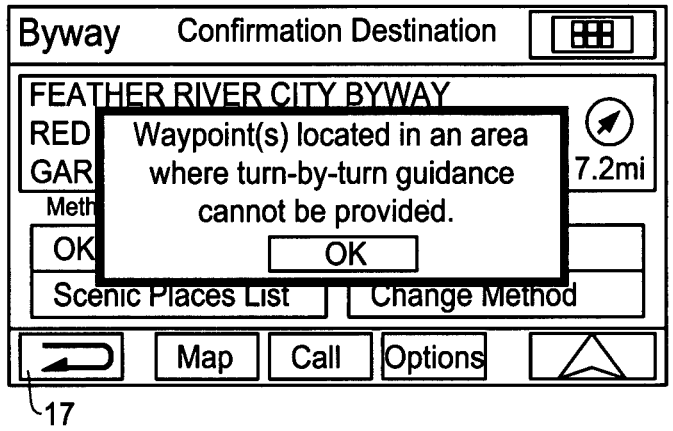

FIGS. 8A-8W show procedures and screen examples involved in the scenic byway mode in the navigation method and system of the present invention where the user has selected the route key in the main menu in the scenic byway mode. Namely, the process typically starts at the main menu screen of the navigation system shown in FIG. 8A in which the user has selected both the "Scenic Byway" key 5 and the "Route" key 6. Alternatively, the process starts when the user has selected the "Route" key 6 when the navigation system is previously selected to the scenic byway mode. Then, the navigation system will display a screen such as shown in FIG. 8B which provides a set of functions or menu keys associated with the "Route" key 6.

At the upper part of the screen, there is shown a progress scale showing a degree of travel on the selected scenic byway toward the final destination indicated by the double circle. The shaded portion at the left side of the scale indicates that the user has already finished or passed the route on the selected scenic byway while the plain portion at the right side indicates remaining route to the final destination. In this example, the screen of FIG. 8B shows various function keys related to the "Route" key 6 in the main menu which include a "Display Entire Route" key 101, a "Change Method" key 104, a "Find POI Along Route" key 102, a "Delete Destination" key 105, a "Find Byway Nearby" key 103, and a "Delete Waypoint" key 106.

The "Display Entire Route" key 101 is used to display a map image of an entire route from the start point to the final destination via waypoints. The "Change Method" key 104 is used to change the routing method for calculating routes to the waypoints and destination (ex. shortest route, quickest route, stay on scenic route, route without using toll road, etc.). The "Find POI Along Route" key 102 is used to search and display POI (points of interest) information along the calculated route to the destination. The "Delete Destination" key 105 is used to cancel the final destination. The "Find Byway Nearby" key 103 is used to find a scenic byway close to the current position or a specified position. The "Delete Waypoint" key 106 is used to cancel the waypoints (intermediate destinations on the calculated route) before the final destination.

In the menu keys of FIG. 8B, the "Find Byway Nearby" key 103 is directly related to the scenic byway mode of the present invention for selecting and visiting the scenic byway. When the user presses the "Find Byway Nearby" key 103 on the screen of FIG. 8B, the navigation system will search scenic byways close to the current position of the user or to any position specified by the user. The screen of FIG. 8C may be shown during the search to inform the user that the search operation is in progress.

The search may be performed to find a scenic byway that is within a predetermined distance range such as 50 miles from the present vehicle position to a midpoint (or any other predefined point) of the scenic byway. Such a search distance range may be modified freely by the user for obtaining desired result. As the search progresses, the navigation system will list the detected scenic byway as soon as at least one scenic byway is detected as shown in FIG. 8D.

The screen of FIG. 8E shows a scenic byway list 7 which lists nearby scenic byways that have been found as a result of the search in the previous process (FIGS. 8C and 8D). As noted above, typically, each of the scenic byways has a plurality of byway points (scenic places) having scenic, recreational, natural, historic, cultural and archaeological qualities. In the screen of FIG. 8E, at the right side of each scenic byway entry, an information key 9 is shown which is used to obtain detailed information regarding the corresponding scenic byway.

When the user selects one of the scenic byways in the scenic byway list 7 of FIG. 8E, the navigation system will display a screen such as shown in FIG. 8F which shows a scenic place list 27. Thus, the navigation system prompts the user to select desired scenic places (byway points) on the selected scenic byway. As noted above, scenic places are places having qualities of scenic, historic, cultural, etc. that are located on the selected scenic byway or proximate to the selected scenic byway.

In this example, at the left of each entry of the scenic place list 27, a check box 28 is provided so that the user is able to select a particular scenic place in the list by inserting a check mark in the check box 28. In the scenic place list 27, a map image key 29 is also provided at the right of each entry to see the map image of the selected scenic place. The user is able to scroll the screen showing the scenic place list 27 to see more scenic places by pressing the scroll keys 11 in up-and-down.

FIG. 8G shows a screen similar to that of FIG. 8F except that the check boxes 28 of the two scenic places are provided with check marks. The check box 28 is used to select a scenic place for a selected scenic byway to visit through the route guidance operation of the navigation system. With use of the check boxes 28, the user may place check marks for the desired entries in the scenic place list 27 to select those scenic places to visit.

FIG. 8H shows a screen similar to that of FIG. 8G except that the all the scenic places desired to visit have been selected by check marking the corresponding check boxes 28 in the scenic place list 27. By pressing an enter key or otherwise executing the process at the situation of FIG. 8H, the navigation system displays a screen for confirmation of destinations as shown in FIG. 8I. This screen is to confirm the scenic places selected in the previous procedure as waypoints and the last destination. In the example of FIG. 8I, the screen includes an "OK to Proceed" key 41 and a "Scenic Place List" key 45.

When the user activates the "OK to Proceed" key 41, the navigation system will calculate a route that incorporate the selected scenic places. FIG. 8J shows a screen of the navigation system that depicts the map image and the route calculation progress indicator that is shown while the route is being calculated. In calculating the route, the navigation system attempts to find an efficient route that can quickly guide the user to the selected scenic byway while making stops at the selected scenic places. As has been described in the foregoing, the navigation system also provides detailed information on the scenic byways and scenic places through texts and/or image on the screen and/or audio sounds. After the route calculation, the navigation system starts the route guidance to the selected scenic places through the calculated routes.

FIG. 8K shows a screen similar to that of FIG. 8I for confirming the destination and waypoints desired to visit through the route guidance except that the user has pressed the "Map" key 21 to see the map image covering the selected scenic byway and scenic places. Then, the navigation system displays a screen showing the map image of the selected scenic byway as shown in FIG. 8L on which the selected scenic places are indicated by reference numerals 1 and 2 and the double circle (final scenic place). If it is desired to go back to the confirmation screen of FIG. 8K for confirming the destinations or checking the scenic place list, the user presses the return key 17 on FIG. 8L to go back to the previous screen of FIG. 8K.

In the situation of FIG. 8L or in other situations where the map image is displayed, suppose the user points a particular location on the map image by the cursor 19 and clicks the cursor 19, the navigation system will display a screen of FIG. 8M. In the example of FIG. 8M, the screen includes various options or menus associated with the specified location on the map image. Such menus include "Add to Favorite Spot", "Avoid Road", "Avoid Area", and "Find Byway Nearby". A balloon like message box shows an address of the location pointed by the cursor 19.

In the example of FIG. 8M, the "Add to Favorite Spot" menu is used to add the place pointed by the cursor to a list of favorite spots created by the user. The "Avoid Road" and "Avoid Area" menus are used to avoid the road or area specified by the cursor so that such a road or an area will not be included in the calculated route for the route guidance operation to the destination such as selected scenic byway and scenic places. The "Find Byway Nearby" menu is to find a scenic byway close to the location specified by the cursor 19.

FIG. 8N shows a screen similar to that of FIG. 8M having the various options associated with the specified location on the map image except that the user has pressed the "Find Byway Nearby" menu. Then, the navigation system proceeds to search the scenic byways close to the location specified by the cursor 19 while a screen as shown in FIG. 8O will be displayed during the search to inform the user that the search is in progress. The search may be performed to find scenic byways that are within a predetermined distance range such as 50 miles from the location specified by the cursor 19 shown in FIG. 8N to the midpoint or other predefined point of a nearby scenic byway.

Such a search distance range may be modified by a user for obtaining desired result through a system set-up procedure, etc. As the search progresses, the navigation system will list the detected scenic byways such as shown in FIG. 8D as noted above. If the navigation system is unable to find any scenic byway, it will indicate that no scenic byways are found within the predefined distance as shown by a screen message of FIG. 8P.

FIG. 8Q shows a screen similar to that of FIG. 8I for confirming the destination (ex. final scenic place) and waypoints (ex. intermediate scenic places) desired to visit through the route guidance except that the user has pressed the "Scenic Place List" key 45. This situation may arise when the user want to see again the selected scenic places on the selected scenic byway. In such a case, the same effect can be achieved by pressing the return key 17 one or more times to go back to the previous screens if the previous screens include the scenic place list.

Then, the navigation system displays a screen showing a scenic place list 27 which lists the selected scenic places on the selected scenic byway as shown in FIG. 8R. In the example of FIG. 8R, the selected scenic places are provided with reference numerals so that each scenic place can be distinguished on the map image of the scenic byway such as shown in FIG. 8L. Unlike the examples of FIG. 5N or FIG. 7E, the double circle showing the final scenic place (final destination) is not used in the example of FIG. 8R. As shown in the map image of FIG. 8L, the selected scenic places on the selected scenic byway are denoted by the reference numerals which correspond to that in the scenic place list 27.

However, it is also possible to use other marks such as flags to show the selected scenic places on the selected scenic byway in the list 27 as shown in FIG. 8S. In such a case, when the "Map" key 21 is executed on the screen of, for example, FIG. 8K, the map image showing the selected scenic byway includes the flags as shown in FIG. 8T to indicate the locations of the selected scenic places. In this situation, if the user points the cursor 19 on the flag, the name of the scenic place will be displayed by the balloon like message area in a manner similar to that shown in FIG. 8M.

FIG. 8U shows a screen similar to that of FIG. 8S for displaying the scenic place list 27 except that it shows another example in which all of the selected scenic places are denoted by double circles in the scenic place list 27. In other words, the examples of FIGS. 8S and 8U do not show distinctions between the intermediate scenic places and the final scenic place. Further, the examples of FIGS. 8S and 8U do not show the specific order of visiting the scenic places although the order (up to down) of listing the scenic places may indicate the order of visiting there.

FIG. 8V is a screen similar to that of FIG. 8I to confirm the scenic places selected in the previous procedure as the destination (ex. final scenic place) and the waypoints (ex. intermediate scenic places). However, in the situation of FIGS. 8V and 8W, it is assumed that the selected intermediated scenic places (waypoints) on the scenic byway are located in an area that there is not sufficient map data for the route guidance operation. Thus, when the "OK to Proceed" key is executed in FIG. 8V, the navigation system displays a warning screen such as shown in FIG. 8W to notify the user that the route guidance operation (turn-by-turn guidance) is not available for the selected scenic places.

Figure 9A:
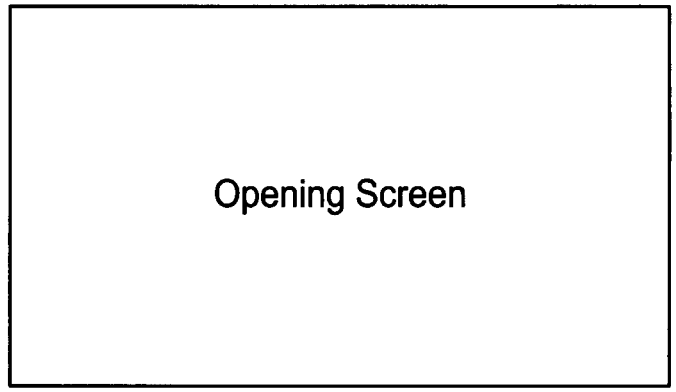
FIGS. 9A-9N are schematic diagrams showing the procedure and screen examples associated with situations where the navigation system is turned off before arriving at each and every selected scenic place.
Figure 9B:
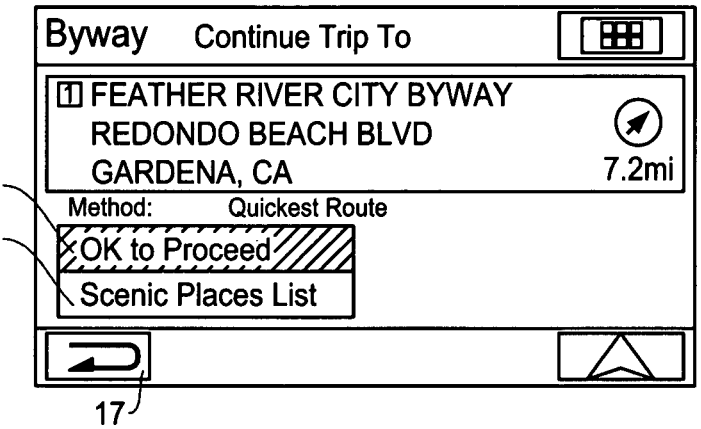
FIG. 9B is a "Continue Trip To" screen which shows the next scenic place.
Figure 9C:
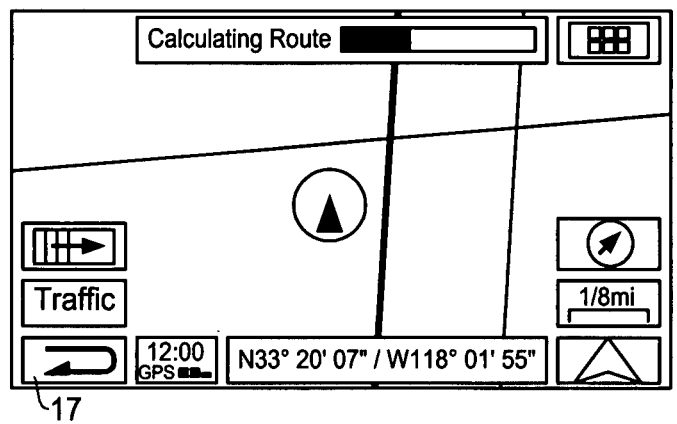
FIG. 9C shows a screen where the route calculation is in progress.
Figure 9D:
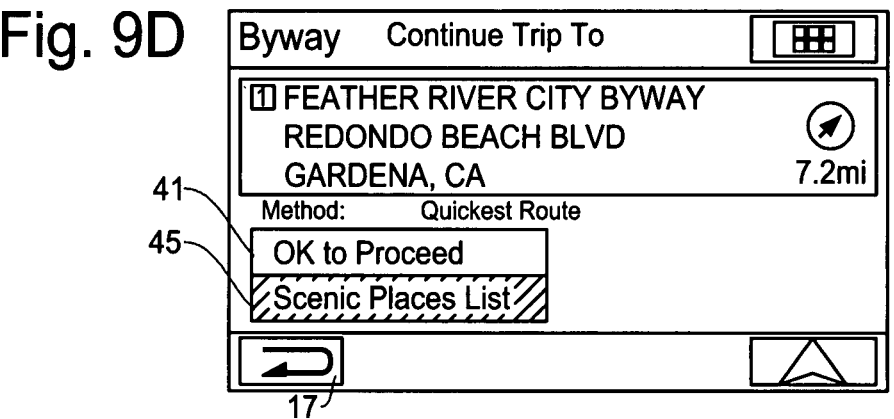
FIG. 9D shows a situation where the "Scenic Place List" key is pressed.
Figure 9E:
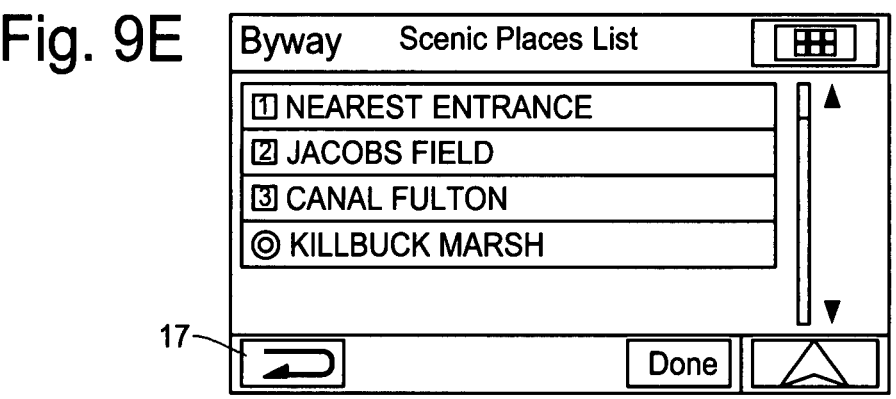
FIG. 9E shows a list of unfinished scenic places.
Figure 9F:
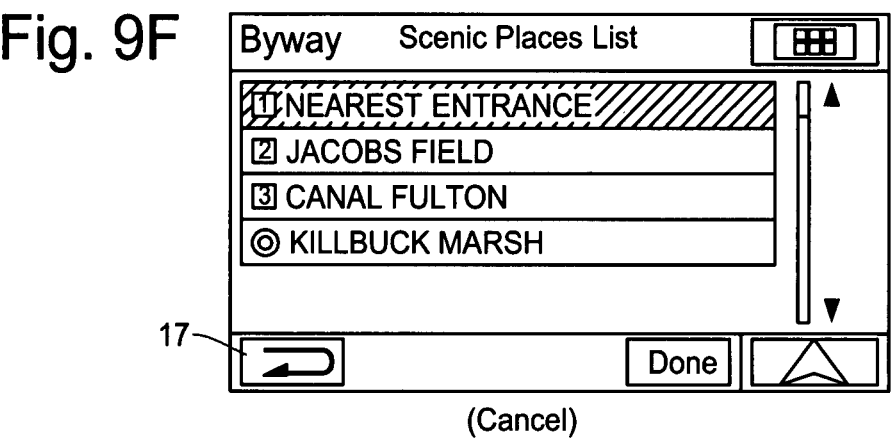
FIG. 9F shows a situation where one scenic place is selected from the list.
Figure 9G:
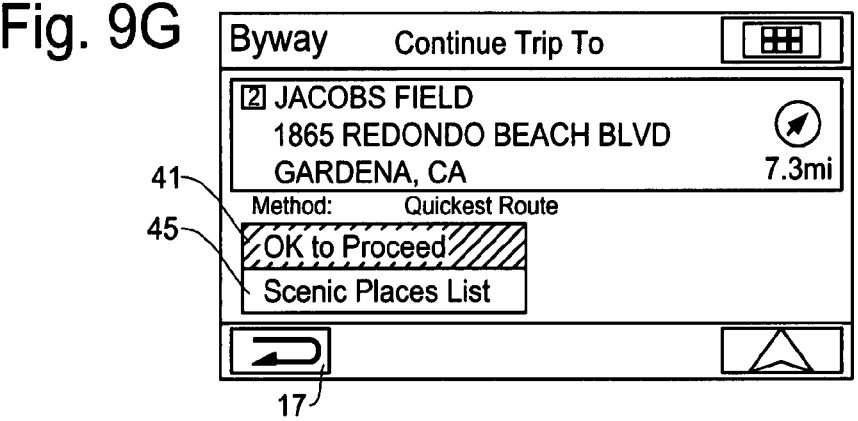
FIG. 9G shows a situation where the "OK to Proceed" key is pressed.
Figure 9H:
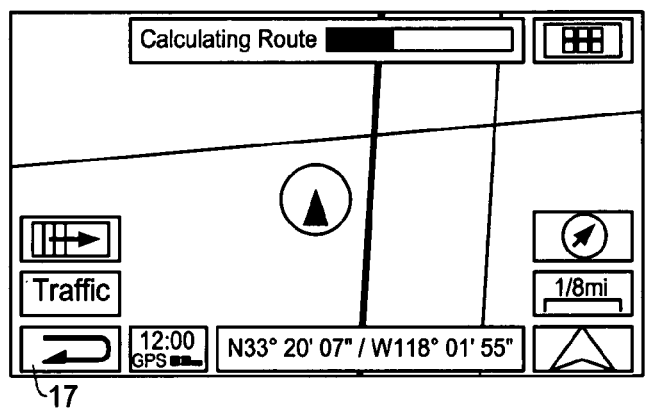
FIG. 9H shows a screen where the route calculation is in progress.
Figure 9I:
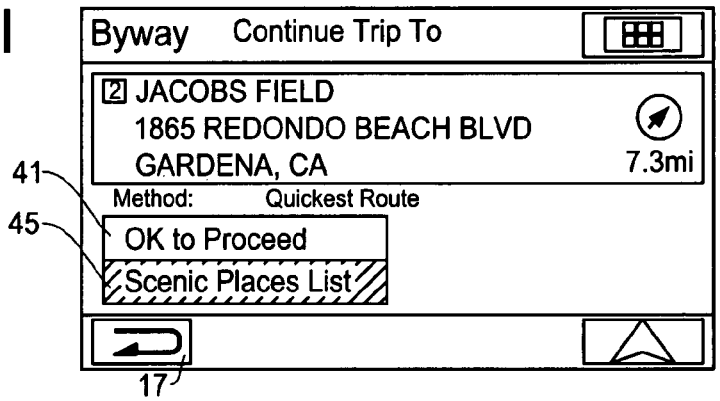
FIG. 9I shows a situation where the "Scenic Place List" key is pressed.
Figure 9J:
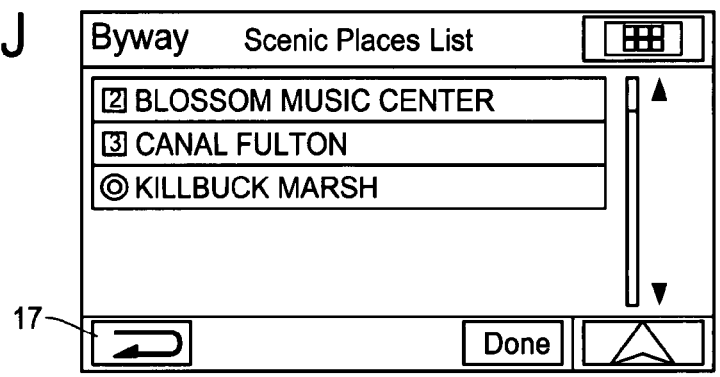
FIG. 9J shows a list of unfinished scenic places.
Figure 9K:
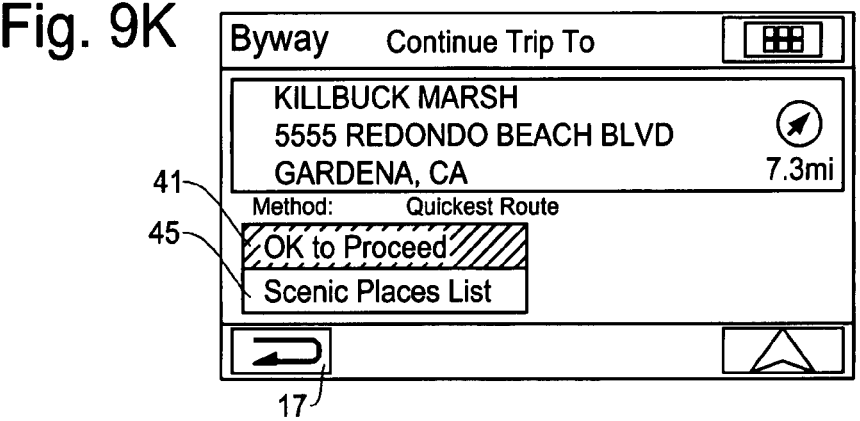
FIG. 9K shows a situation where the "OK to Proceed" key is pressed.
Figure 9L:
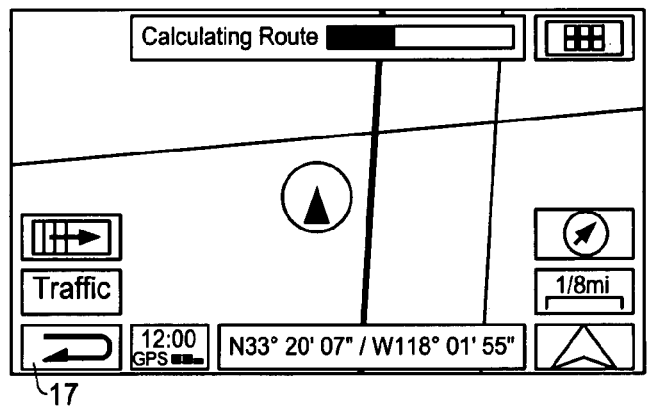
FIG. 9L shows a screen where the route calculation is in progress.
Figure 9M:
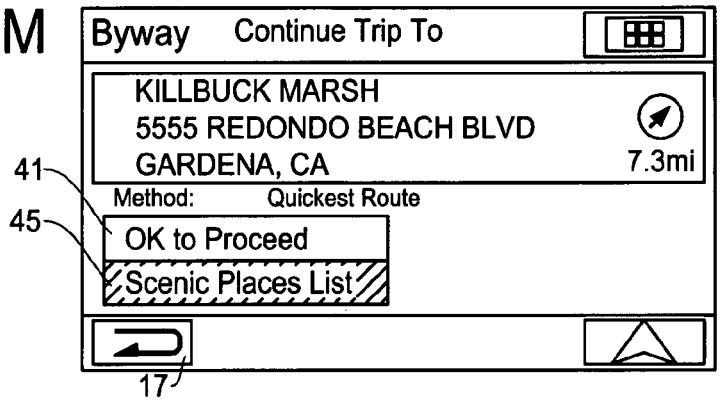
FIG. 9M shows a situation where the "Scenic Place List" key is pressed.
Figure 9N:
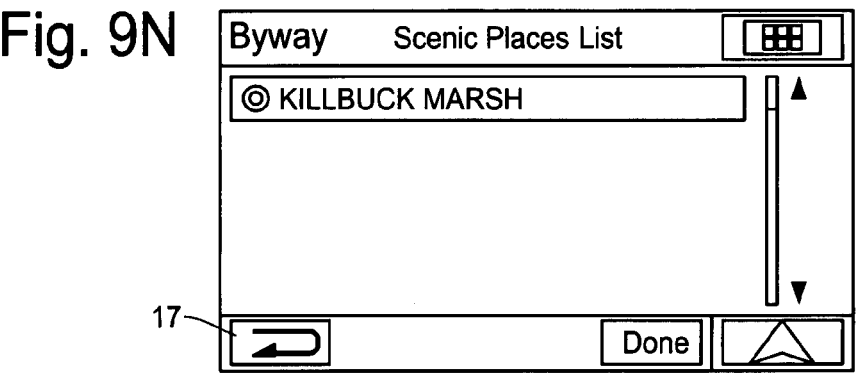

FIGS. 9A-9N are schematic diagrams showing the procedure and screen examples associated with the situations where the vehicle having the navigation system or other type of navigation system is turned off before arriving at each and every selected scenic place (destination). Since the scenic byway has a plurality of places that the user is likely to visit, the navigation system keeps track of data as to which locations have been visited. When the vehicle having the navigation system under the present invention is turned off because, for example, the user left the vehicle when he/she arrived at one of the scenic places (waypoints) or the user no longer wants to travel on that day, etc., the navigation system remembers the unfinished waypoints and destinations (scenic places) for the next trip.

Then, when the user turn on the navigation system is turned on again, by for example, starting the vehicle engine, the navigation system displays the next scenic places to visit automatically. FIGS. 9A-9N are associated with such situations for trips to the remaining scenic places. FIG. 9A is an opening screen of the navigation system when the vehicle is turned on which typically shows a logo of a manufacture and starts loading the program for the operation of the navigation system. Typically, at the start of operation, the navigation system displays a warning message to the effect that the navigation system is not to be used as a substitute for the driver's personal judgement, a copyright agreement, etc.

The navigation system will then show the next scenic place (waypoint, destination) to be visited on a "Continue Trip To" screen as shown in FIG. 9B which is similar to the confirmation screen of FIG. 8I. The "Continue Trip To" screen shows the name of the scenic byway "FEATHER RIVER CITY BYWAY" that the user has selected but not finished prior to turning off the vehicle engine or navigation system. The reference number "1" indicated at the start of the name of the byway also means the scenic place "NEAREST ENTRANCE" of the selected scenic byway in the scenic place list of FIGS. 5N and 9E. The screen of FIG. 9B further includes a "OK to Proceed" key 41 and a "Scenic Place List" key 45 to prompt the user to select one of them.

In the case where the user wants to continue the trip for visiting the remaining scenic places of the selected scenic byway, the user activates the "OK to Proceed" key as shown in FIG. 9B. Since the current position of the vehicle (navigation system) may not be consistent with the previously calculated route, it is usually necessary to produce a newly calculated route to the next scenic place. Thus, the navigation system starts the route calculation, as shown in FIG. 9C, from the current position to the next destination which is the scenic place "NEAREST BYWAY ENTRANCE". After establishing the calculated route, the navigation system starts the route guidance operation to the next scenic place.

FIG. 9D is a screen of the navigation system similar to that of FIG. 9B except that the user selects the "Scenic Place List" key 45. This process may be used to check the remaining scenic places of the selected scenic byway again to determine, for example, whether the user really wants to go all of the remaining scenic places. In response, the navigation system displays the "Scenic Place List" screen as shown in FIG. 9E in which the names of the scenic places selected by the user but not yet visited by this time are listed.

In the example of FIG. 9E, the each entry of the scenic place is provided with a number that shows an order of visiting there. This number may also be an indicator when the map image is displayed to show the location of the corresponding scenic place. As noted above, the double circle is a final destination, i.e., the last scenic place to visit based on the route previously calculated by the navigation system. Thus, the user is able to see the list of the previously selected scenic places, and if so desires, the user is able to select (highlight) a particular scenic place in the scenic place list and delete the scenic place by operating a cancel key (not shown) on the navigation system as shown in FIG. 9F.

In the case where the user has already visited the first scenic place before turning off the navigation system or vehicle engine, the navigation system shows the name of the next scenic place when it is started. Namely, when turning on the navigation system through the process of FIG. 9A, the navigation system shows the "Continue Trip To" screen as shown in FIG. 9G. The screen of FIG. 9G is similar to that of FIG. 9B, however, it shows the next scenic place "JACOB FIELD" in the selected scenic byway since the user has already visited the first scenic place "NEAREST ENTRANCE".

If the user wants to continue the trip for visiting the remaining scenic places of the selected scenic byway, the user activates the "OK to Proceed" key as shown in FIG. 9G. Then, the navigation system starts the route calculation, as shown in FIG. 9H, from the current position to the next destination which is the scenic place "JACOB FIELD" in this example. After establishing the calculated route, the navigation system starts the route guidance operation to the next scenic place.

FIG. 9I is a screen of the navigation system similar to that of FIG. 9G except that the user selects the "Scenic Place List" key 45. This process may be used to check the remaining scenic places of the selected scenic byway again. In response, the navigation system displays the "Scenic Place List" screen as shown in FIG. 9J in which the names of the scenic places selected by the user but not yet visited by this time are listed.

Similar to the example of FIG. 9E, the each entry of the scenic place in FIG. 9J is provided with a number that shows an order of visiting there. This number may also be an indicator when the map image is displayed to show the location of the corresponding scenic place on the map image. As noted above, the double circle is the final destination, for example, the last scenic place to visit. The order of the intermediate scenic places and final destination (last scenic place) is based on the route previously calculated by the navigation system, thus, it may be changed if a new route to these scenic places has to be established. Since the user has already visited or passed the first scenic place "NEAREST BYWAY ENTRANCE", the scenic place list does not show the first scenic place.

In the case where the user has already visited the three scenic places in the list of FIG. 9E before turning off the vehicle engine, the navigation system shows the name of the last scenic place when it is turned on. Namely, when turning on the navigation system through the process of FIG. 9A, the navigation system shows the "Continue Trip To" screen as shown in FIG. 9K. The screen of FIG. 9K is similar to that of FIGS. 9B and 9G, however, it shows only the last scenic place "KILLBUCK MARSH" in the selected scenic byway since the user has already visited or passed the three scenic places.

If the user wants to continue the trip for visiting the last scenic place of the selected scenic byway, the user activates the "OK to Proceed" key as shown in FIG. 9K. Then, the navigation system starts the route calculation, as shown in FIG. 9L, from the current position to the next destination which is the last scenic place "KILLBUCK MARSH". After establishing the calculated route, the navigation system starts the route guidance operation to the next (last) scenic place.

FIG. 9M is a screen of the navigation system similar to that of FIG. 9K except that the user selects the "Scenic Place List" key 45. This process may be used to check whether there are any other remaining scenic places of the selected scenic byway. In response, the navigation system displays the "Scenic Place List" screen as shown in FIG. 9N. In this example, only the name of the last scenic place selected by the user but not yet visited by this time is listed which is marked by the double circle indicating that it is a "final destination".

Figure 10A:
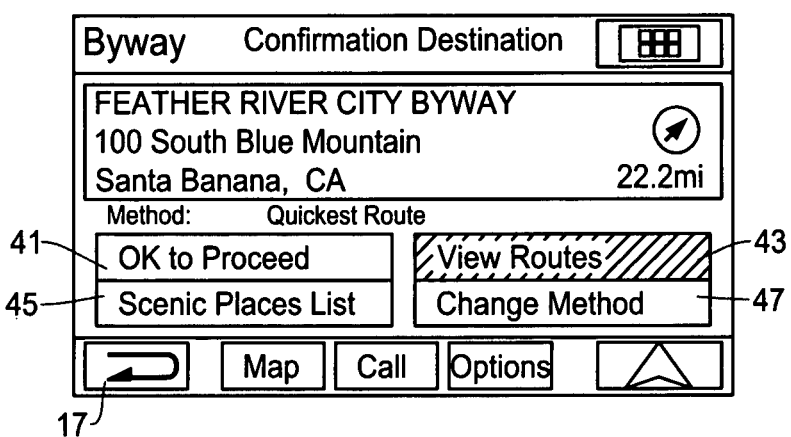
FIGS. 10A-10F show further examples of procedures and screen displays involved in the scenic byway mode in the navigation method and system of the present invention for the user to see the map image of the scenic byway.
Figure 10B:
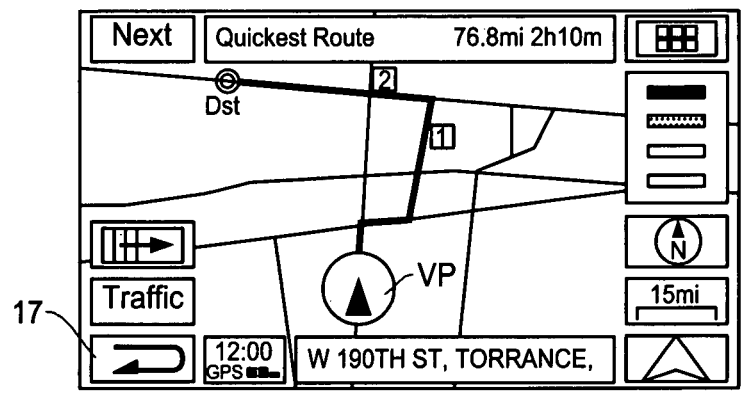

FIGS. 10A-10F show further examples of procedures and screen displays involved in the scenic byway mode in the navigation method and system of the present invention for the user to see the map image of the scenic byway. FIGS. 10A-10B show an example of process for obtaining the map image of the scenic byway through the "Confirmation Destination" screen. In this process, first, FIG. 10A shows the "Confirmation Destination" screen which is similar to that of FIG. 5A including several options which are "OK to Proceed" key 41, "View Routes" key 43, "Scenic Place List" key 45, and "Change Method" key 47.

In the example of FIG. 10A, the user activates the "View Routes" key 43 to see the map image of the remaining route to the selected scenic places. Then, in FIG. 10B, the navigation system displays a map image of the remaining scenic places. On the map image, the calculated route created by the selected route calculation method is highlighted, which will be further described with reference to FIGS. 12A-12F.

Figure 10C:
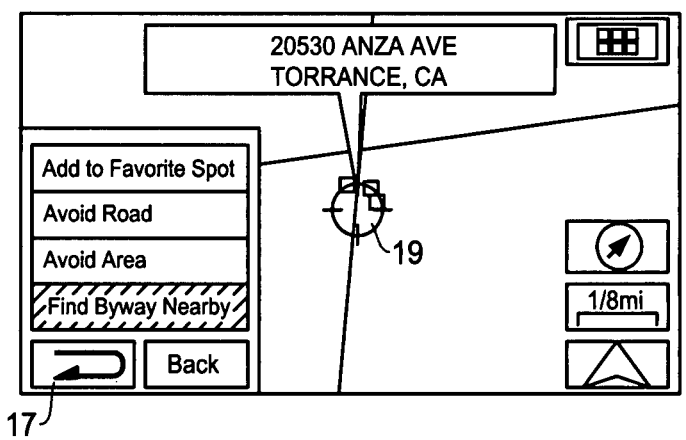
Figure 10D:
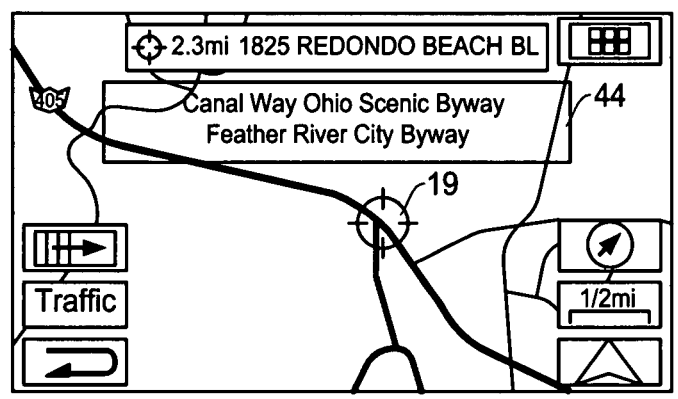

FIGS. 10C-10D show an example of process for obtaining the map image of the scenic byway through the screen showing the other map image. FIG. 10C shows a situation where the screen of the navigation system displays the map image and the user points a particular location on the map image by the cursor 19. When the user clicks the cursor 19 at the particular location on the map image, the navigation system will display various options or menus related to the particular location.

More specifically, in the example of FIG. 10C, the screen includes various options or menus associated with a particular location on the map image specified by the cursor 19. Such options include "Add to Favorite Spot", "Avoid Road", "Avoid Area", and "Find Byway Nearby" as have been described in the foregoing with reference to FIG. 8M. A balloon like message box shows an address of the location pointed by the cursor 19.

When the user has pressed the "Find Byway Nearby" menu in FIG. 10D, then, the navigation system proceeds to search the scenic byways close to the location specified by the cursor 19. The search may be performed to find scenic byways that are within a predetermined distance range such as 50 miles from the location specified by the cursor 19 to the midpoint or other predefined point of the scenic byways. If there is a scenic byway within the search distance range, the navigation system displays the screen of FIG. 10D which show the map image of two scenic byways within the predetermined distance. Names of the two scenic byways are described in the text box 44 on the screen.

Figure 10E:
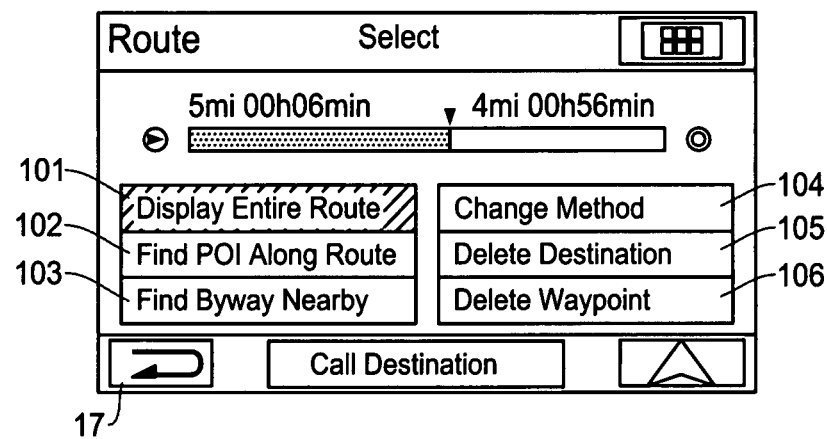
Figure 10F:
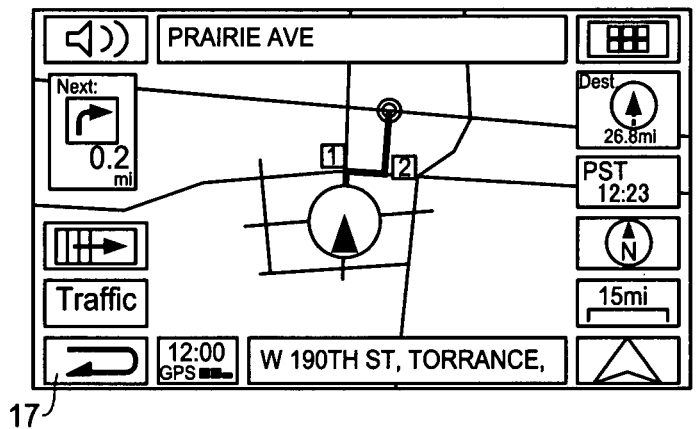

FIGS. 10E-10F show examples of process for obtaining the map image of scenic byway through the selection screen based on "Route" function of the navigation system shown in FIGS. 8A and 8B. The navigation system will display a screen such as shown in FIG. 10E which provides a set of functions or menu keys associated with the "Route" function of the navigation system. The screen of FIG. 10E is the same as that of FIG. 8B which is displayed when the "Route" key 6 in the main menu is activated.

As described with reference to FIG. 8B, the screen includes the "Display Entire Route" key 101, "Change Method" key 104, "Find POI Along Route" key 102, "Delete Destination" key 105, "Find Byway Nearby" key 103, and "Delete Waypoint" key 106. Thus, when the user activates the "Display Entire Route" key 101, the navigation system displays the screen showing the map image of the selected scenic byway as shown in FIG. 10F. The map image of FIG. 10F includes the selected scenic places that are indicated by reference numerals 1 and 2 (intermediate scenic places) and a double circle (last scenic place, i.e., final destination).

Figure 11A:
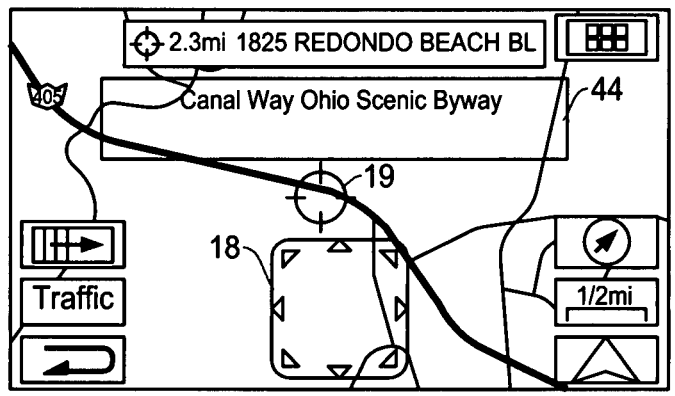
FIGS. 11A and 11B show further examples of screen display involved in the scenic byway mode in the navigation method and system of the present invention related to the map image of the scenic byway and associated text information thereon.
Figure 11B:
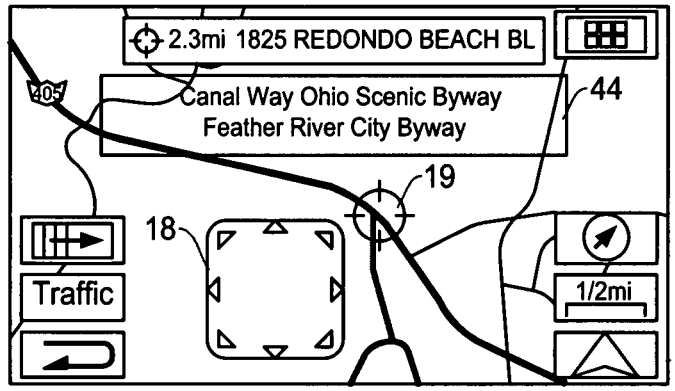

FIGS. 11A and 11B show a further example of screen displays involved in the scenic byway mode in the navigation method and system of the present invention related to the map image of the scenic byway and associated text information thereon. On the map image screens of FIGS. 11A and 11B, a text window 44 shows the name of the scenic byway pointed by the cursor 19. Thus, in FIG. 11A, the text window 44 indicates "CANAL WAY OHIO SCENIC BYWAY" which is pointed by the cursor 19 on the map image. In FIG. 11B, the text window 44 indicates both "CANAL WAY OHIO SCENIC BYWAY" and "FEATHER RIVER CITY BYWAY", since the cursor 19 points both of the scenic byways on the map image. Typically, this case arises where a part of the road segment is shared by two or more scenic byways.

FIGS. 12A-12F show further examples of screen display involved in the scenic byway mode implemented in the navigation method and system of the present invention. These examples are related to the "View Routes" key 43 and the "Change Method" key 47 in addition to the "OK to Proceed" key 41 and the "Scenic Place List" key 45, which are typically displayed on the confirmation screen of FIG. 5A. The "View Routes" key 43 is activated when the user wants to see the calculated route between the current position and the selected scenic places. The "Change Method" key 47 is activated when the user wants to change the method for calculating a route between the start point to the selected scenic places.

Figure 12A:
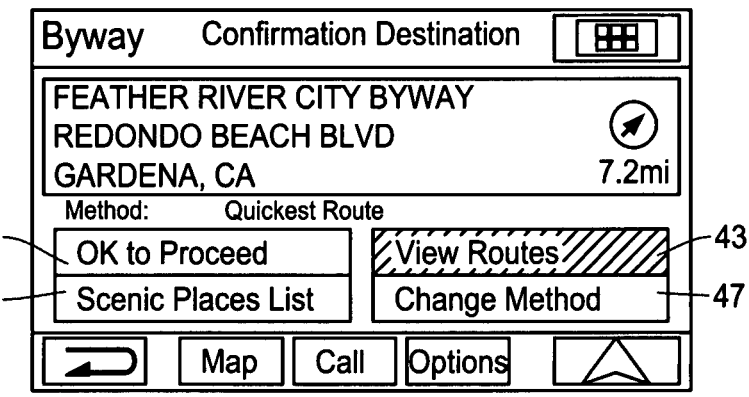
FIGS. 12A-12F show further examples of screen display involved in the scenic byway mode implemented in the navigation method and system of the present invention.
Figure 12B:
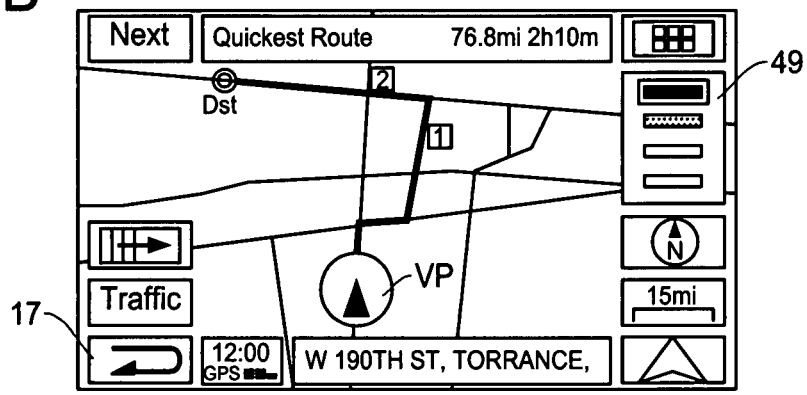

FIG. 12A shows the "Confirmation Destination" screen which is similar to that of FIG. 5A except that the user has selected the "View Routes" key 43. It is assumed that the route between the current vehicle position VP and the scenic places 1, 2 and final destination Dst is already calculated based on a "Quickest Route" method which is the most frequently used method of the navigation systems. Thus, in FIG. 12B, the navigation system displays a map image on which the calculated route created by the "Quickest Route" method is highlighted. A method indicator 49 on the screen also shows that the highlighted route is established based on the first (quickest route) method in a routing method list 48 shown in FIG. 12D.

Figure 12C:
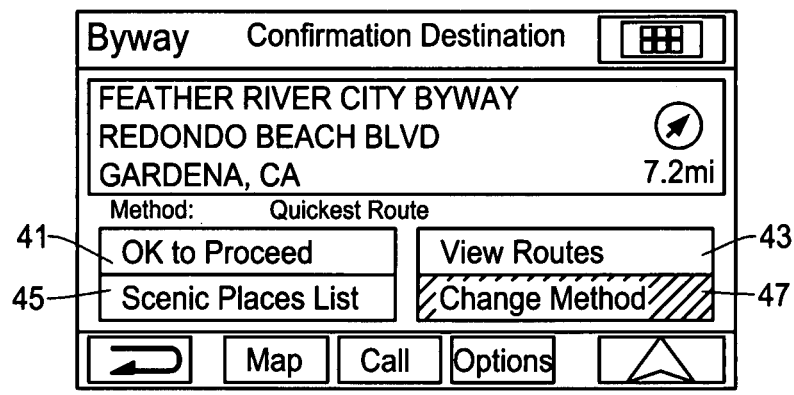

Suppose the user wants to enjoy more scenic beauties nearby rather than quickly visit only the selected scenic places, the user presses the cancel key 17 to return to the confirmation screen of FIG. 12C. Then, the user activates the "Change Method" key 47 to change the current routing method to another routing method for calculating the route.

Figure 12D:
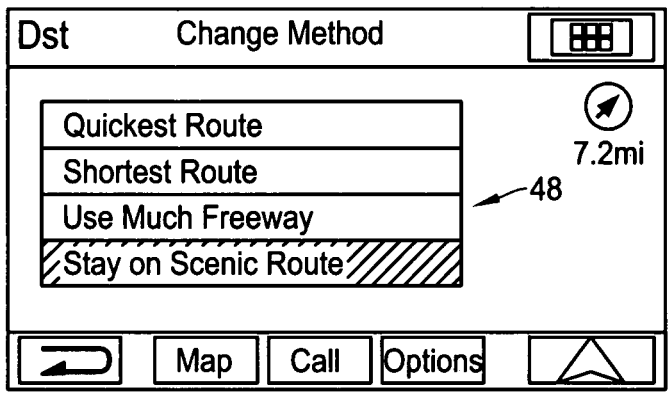

Then, the navigation system displays a routing method list 48 as shown in FIG. 12D which lists several methods for calculating a route.

In the example of FIG. 12D, the routing method list 48 includes a "Quickest Route" method, a "Shortest Route" method, a "Use Much Freeway" method, and a "Stay on Scenic Route" method. The "Stay on Scenic Byway" method is related to the scenic byway mode of the present invention in which the navigation system finds a route to the selected scenic places and final destination while staying on the selected scenic byway. In other words, in the "Stay on Scenic Byway" method, the navigation system creates a calculated route so that the user can enjoy the views of the selected scenic byway even though it takes a longer time to reach the selected scenic places than the route calculated by the "Quickest Route" method.

Since the user wants to enjoy more scenic beauties nearby rather than quickly visit only the selected scenic places as noted above, the user selects the "Stay on Scenic Route" method in the routing method list 48. Then, the navigation system calculates a route through the selected "Stay on Scenic Route" method. After finishing the route calculation, the navigation system displays the confirmation screen as shown in FIG. 12E.

Figure 12E:
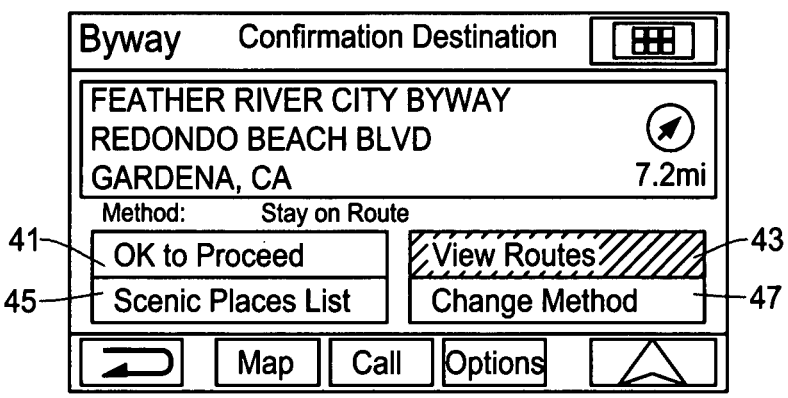
Figure 12F:
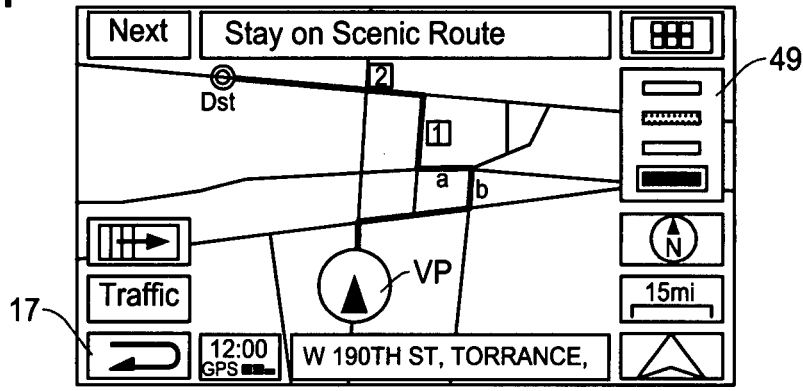

If the user wants to see the image of the calculated route, the user presses the "View Routes" key 43 on the confirmation screen of FIG. 12E. Then, in FIG. 12F, the navigation system displays a map image on which the calculated route created by the "Stay on Scenic Route" method is highlighted. The method indicator 49 on the screen also shows that the highlighted route is based on the fourth (stay on scenic route) method in the routing method list 48 shown in FIG. 12D. The newly calculated (highlighted) route of FIG. 12F runs on the scenic byway longer than the calculated route of FIG. 12B assuming that the road segments "a" and "b" on the calculated route belong to the selected or nearby scenic byway. Thus, the user can enjoy the scenery along the route while reasonably quickly traveling to the selected scenic places.

Figure 13A:
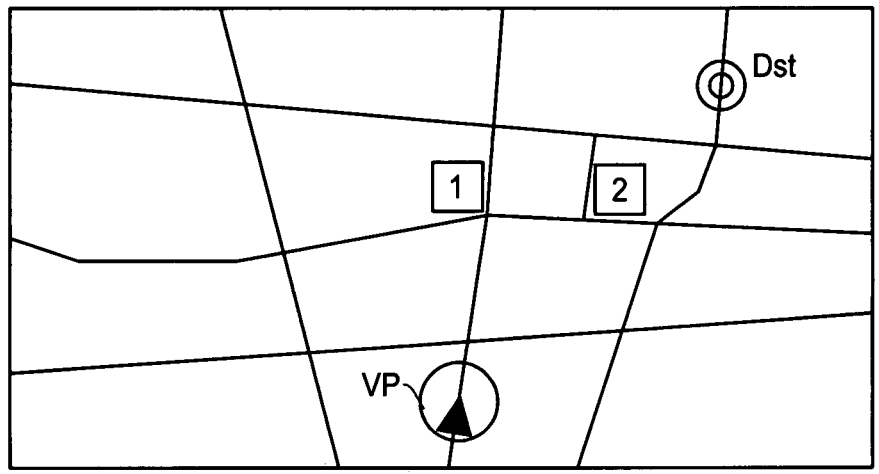
FIG. 13A and FIG. 13B are schematic views showing scenic places to visit and final destination in relation to calculating a route based on the scenic byway routing method under the present invention as well as the conventional routing method.
Figure 13B:
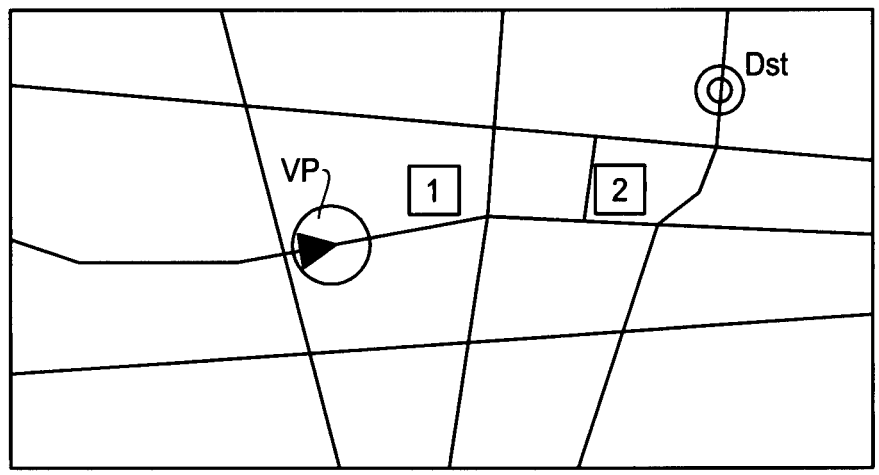

FIGS. 13A and 13B are schematic views showing scenic places to visit (byway points) and final destination in relation to calculating a route based on the scenic byway routing method under the present invention as well as the conventional routing method. In the map image of FIGS. 13A and 13B, the selected scenic places are indicated by the reference numbers "1" and "2" based on the order of visiting there. The final destination Dst is denoted by the double circle on the map image. The reference VP indicates the current vehicle position. It is assumed that, in the case of FIGS. 13A and 13B, the destination Dst is not a part of the selected scenic byway, i.e., there is no scenic significance or scenic vista between the scenic place "2" and the destination Dst.

Referring to FIG. 13A, a situation and routing method for the route guidance is explained involving the scenic byway routing method. In FIG. 13A, the vehicle is not on the scenic byway, thus, from the current vehicle position VP to the scenic place "1", the conventional routing method such as a "quickest route method" or a "shortest route method" is used for route calculation and guidance. Thus, the conventional routing method allows the navigation system to calculate the route to reach the scenic place "1" as soon as possible.

From the scenic place "1" to the next scenic place "2", the navigation system will use the scenic byway routing method and the conventional routing method. That is, the navigation system attempts to create the calculated route to stay on the scenic byway as much as possible or reasonably long enough while including the scenic place "2" as a waypoint on the calculated route. If there are two ways on the scenic byway to reach the scenic place "2", the navigation system selects the shorter or quicker route based on the conventional routing method. Assuming that the scenic place "2" is the last stop to visit before the final destination, the navigation system will calculate and guide the user to the destination Dst in the conventional routing method.

FIG. 13B is a schematic view similar to the view shown in FIG. 13A except that the vehicle is already on the scenic byway. Referring to FIG. 13B, from the current vehicle position VP to the scenic place "1", the navigation system will use both the scenic byway routing method and the conventional routing method. From the scenic place "1" to the scenic place "2", the navigation system will use the scenic byway routing method by guiding the user to stay on the scenic byway as much as possible. If there are two or more routes on the selected scenic byway to reach the scenic place "2", the navigation system may select the shorter route based on the conventional routing method. Assuming that the scenic place "2" is the last stop to visit before the final destination, the navigation system will calculate and guide the user to the destination Dst in the convention routing method.

Figure 14:
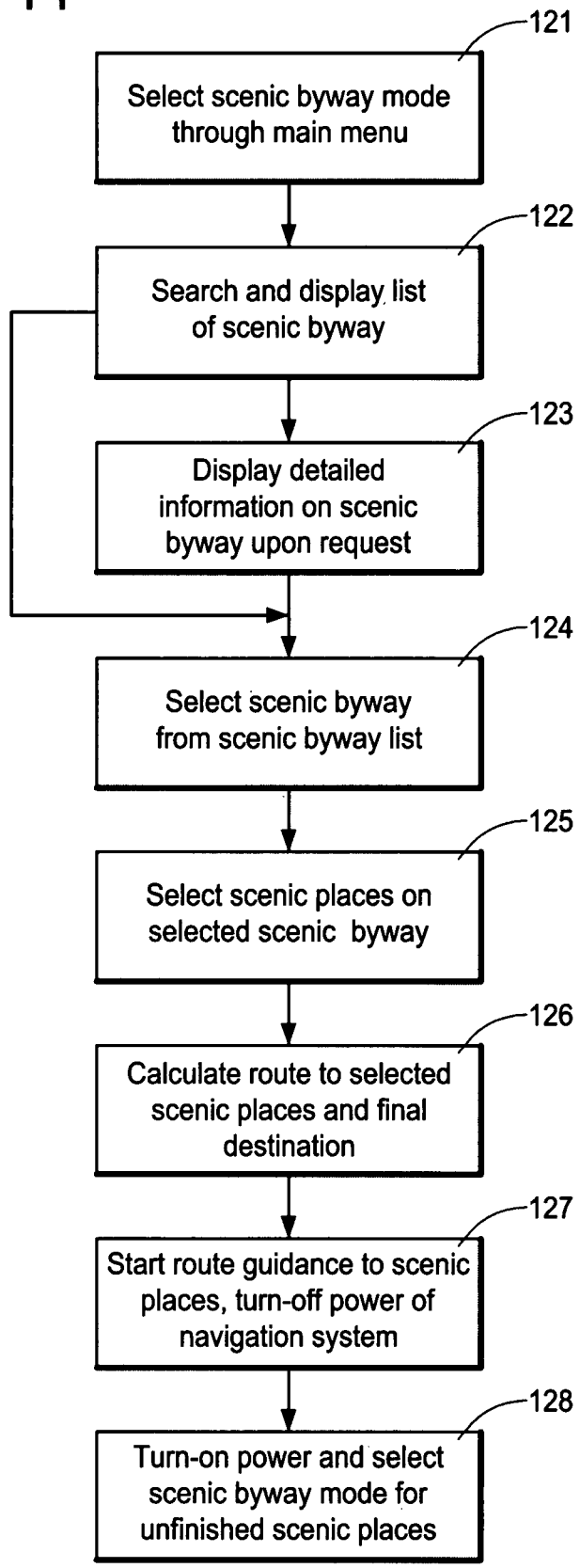
FIG. 14 is a flow chart showing an overall basic operational process of the navigation method and system implementing the scenic byway mode of the present invention for searching, selecting, routing and visiting the selected scenic byway and scenic places.

FIG. 14 is a flow chart showing an example of basic operational procedure of the navigation method system of the present invention for searching and selecting a scenic byway, selecting scenic places on the selected scenic byway, and visiting the selected scenic places, etc. As noted above, the navigation system stores data concerning the scenic byways in the map database of its own or retrieves such data from a remote data server (FIG. 19) through wireless or wired communication means. As also noted above, the scenic byways are roads selected by the government or public organization based on scenic, recreational, natural, historic, cultural and archaeological qualities. The data concerning the scenic byways stored in the map database include text data, video and audio data, map images, detailed information (FIGS. 6A-6P) on the scenic byways and scenic places, etc.

When the navigation system of the present invention is activated, after opening and warning screens, it shows a main menu screen such as shown in FIG. 3A. The main menu screen includes the "Scenic Byway" key 5 to go into the scenic byway mode of the present invention. Thus, in the step 121, to enjoy the scenic byway method of the present invention, the user selects the scenic byway mode by pressing the "Scenic Byway" key 5 on the main menu screen.

In response, in the step 122, the navigation system checks the map database to retrieve the data concerning scenic byways within a predetermined distance from the current position or other specified position and displays a scenic byway list 7. As in the example of FIG. 3C, in the scenic byway list 7, the names of the scenic byways are listed in the order of distance from the specified location, typically, the current vehicle position. Alternatively, as in the example of FIG. 3D, the names of the scenic byways are listed in the order of alphabet.

In response to the request by the user, the navigation system shows detailed information on the specified scenic byway in the step 123. Such detailed information on each of the scenic byway is stored in the map database of the navigation system or can be retrieved from the remote data server through wireless or wired communication. In the case where the user does not want detailed information on the scenic byway, the process moves to the step 124 to select a desired scenic byway from the scenic byway list 7.

In the examples of FIGS. 3C and 3D, each entry in the scenic byway list 7 is provided with the information key 9 so that the navigation system retrieves and displays the detailed information of the corresponding scenic byway when the user presses the information key 9 as shown in FIGS. 4E and 4F. The detailed information may be reproduced on the navigation system in the text and video form and/or voice sounds. Further, in the examples of FIGS. 4C and 4D, each entry of the scenic place list 27 is provided with the map image key 29 so that the navigation system retrieves and displays the map image covering the scenic place of the selected scenic byway when the user presses the map image key 29 as shown in FIGS. 4I and 4J.

In the step 124, when the user selects a scenic byway from the scenic byway list 7 as shown in FIG. 4A, the navigation system displays a scenic place (byway point) list 27 which lists the scenic places on the selected scenic byway as shown in FIG. 4B. As noted above, a scenic place (byway point) is a particular location on the selected scenic byway having a unique scenic beauty, etc. Thus, in the step 125, the user selects one or more scenic places in the scenic place list 27 as shown in FIGS. 4D-4G by, for example, entering a check mark in the check box 28 provided to each entry of the scenic place list 27.

Then, the navigation system displays a confirmation screen to confirm the selected scenic places on the selected scenic byway as shown in FIG. 5A. In the present invention, the navigation system incorporating the scenic byway mode can display several variations of confirmation screen with different function keys. One example of the confirmation screen is shown in FIGS. 5A, 5D, 10A, etc., and another example of the confirmation screen is shown in FIGS. 8I, 8K, etc.

Upon confirmation, in the step 126, the navigation system calculates routes to the selected scenic places and the final destination. As noted above, within the context of the present invention, the final destination can be one of the selected scenic places or other location such as a user's home, hotel, etc., that is not a part of the selected scenic byway. After establishing the route to the scenic places, the navigation system starts the route guidance operation in the step 127 as shown in FIG. 5C. If the navigation system is turned off before visiting all of the selected scenic places, the navigation system enters into the scenic byway mode when it is turned on in the step 128 to show the unfinished scenic places as described with reference to FIGS. 7A-7G.

Figure 15:
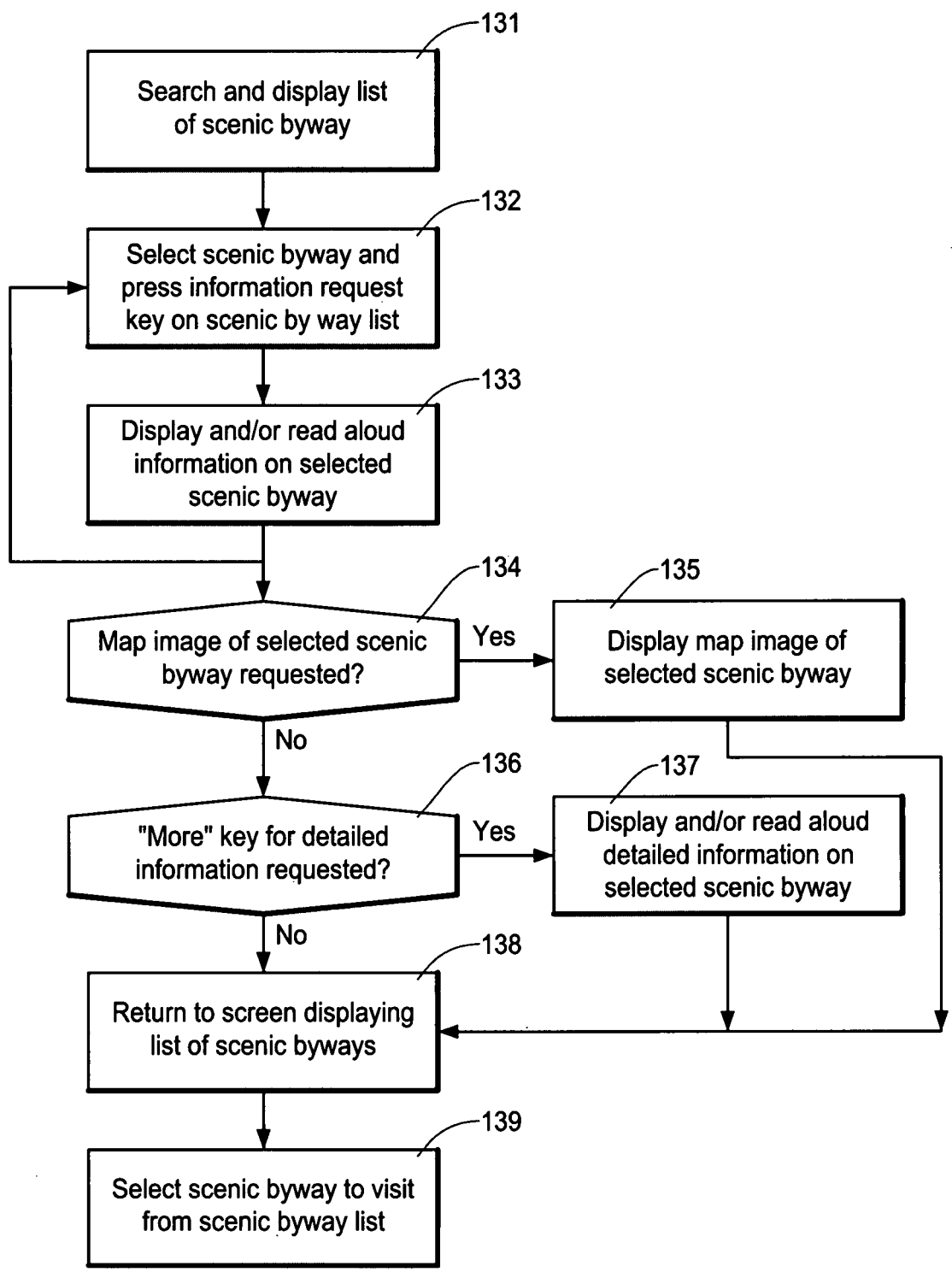
FIG. 15 is a flow chart showing an example of operational procedure of the navigation method and system of the present invention for retrieving and showing detailed information on the scenic byway and scenic places.

FIG. 15 is a flow chart showing an example of operational procedure of the navigation method and system of the present invention for retrieving and showing detailed information on the scenic byway and scenic places. In other words, the operational flow of FIG. 15 shows more detailed operational steps involved in the step 123 in the flow chart of FIG. 14 for retrieving and displaying the detailed information according to the scenic byway mode of the present invention. The process starts at the step 131 in which the navigation system searches and displays the list of scenic byways within the predetermined distance from the current position or other specified position.

In the step 132, through the scenic byway list 7, the user selects a desired scenic byway and activates the information key as shown in FIG. 4E. In response to the request by the user, the navigation system retrieves and produces the detailed information on the specified scenic byway in the step 133 as shown in FIGS. 4F and 6A-6B. In the example of FIGS. 4F and 6A, the detailed information is reproduced in the text form on the navigation screen while in the example of FIG. 6B, the detailed information is also reproduced by the speech sounds. The steps 132 and 133 can be repeated with respect to other scenic byways.

As noted above, in the examples of FIGS. 4C, 4D and 4M, each entry of the scenic place list 27 or scenic byway list 7 is provided with the map image key 29 so that the navigation system retrieves and displays the map image covering the specified scenic byway or the scenic place of the selected scenic byway. Thus, in the step 134, the navigation system determines whether the user presses the map image key 29. If the map image is requested by the user through the map image key 29, the navigation system displays the map image of the selected scenic byway or scenic place in the step 135.

If the map image is not requested by the user, the process moves to the step 136 in which the navigation system determines whether the "More" key 35 shown in FIGS. 6A and 6C are activated by the user. As noted above, the "More" key 35 is provided on the information screen for obtaining additional information regarding the selected scenic byway. If the "More" key 35 is pressed by the user as shown in FIG. 6C, the navigation system displays the screen of FIG. 6D which lists further options for retrieving the additional information on the selected scenic byway. Such options and resultant information are described in detail in the above with reference to FIGS. 6A-6P. Thus, in the step 137, the navigation system retrieves and reproduces the detailed information in the text form on the navigation screen and also by the speech sounds.

In the step 138, to select a scenic byway based on the detailed information, the user instructs the navigation system to display the screen showing the scenic byway list 7 by, for example, pressing the return key 17. The user selects the desired scenic byway to visit in the step 139 and then further selects the scenic places on the selected scenic byway in the step 125 of FIG. 14. The navigation system calculates the routes to the selected scenic places and starts the route guidance operation.

Figure 16:
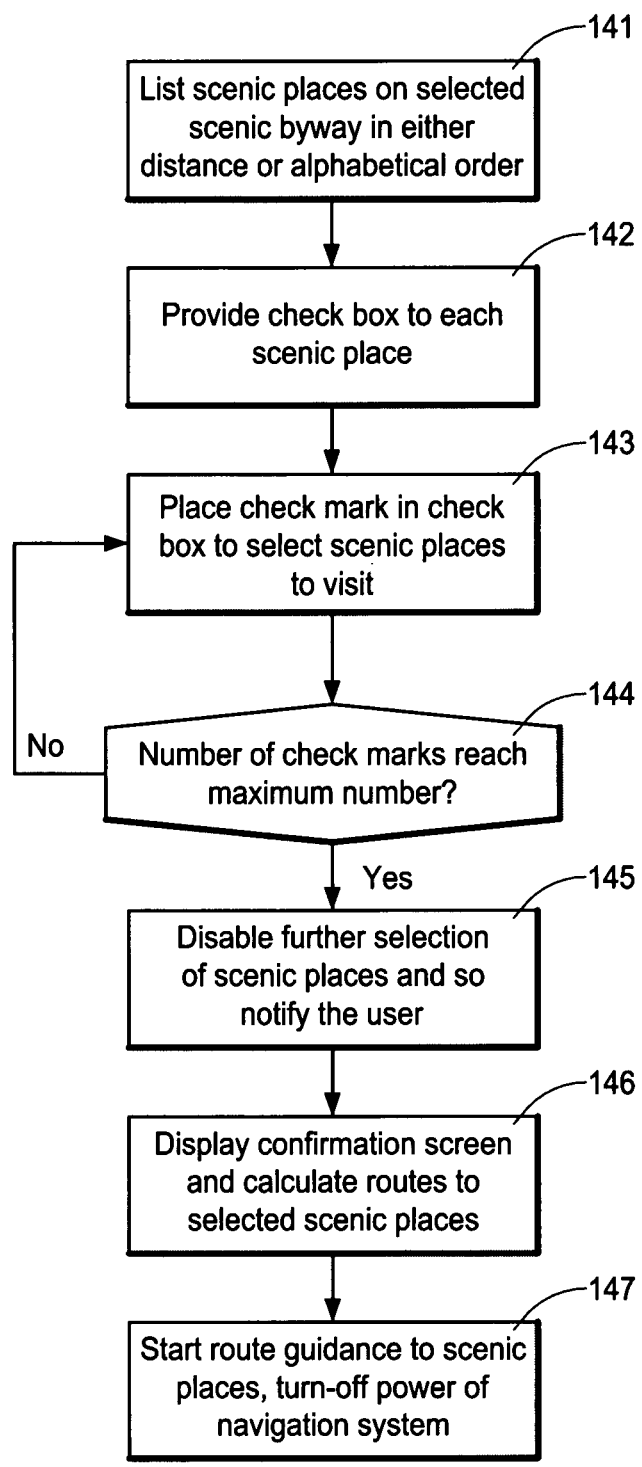
FIG. 16 is a flow chart showing an example of operation procedure of the navigation method and system of the present invention for selecting scenic places on the selected scenic byway.

FIG. 16 is a flow chart showing an example of operational procedure of the navigation method and system of the present invention for selecting scenic places on a selected scenic byway. In other words, the operational flow of FIG. 16 shows more detailed operational steps involved in the step 125 in the flow chart of FIG. 14 for displaying and selecting the scenic places to visit. The process starts at the step 141 in which the navigation system searches and displays the list 27 of scenic places on the selected scenic byway as shown in FIGS. 4B-4D.

In the step 142, in the scenic place list 27, the navigation system provides a check box 28 for each name of the scenic place. Thus, in the step 143, through the scenic place list 27, the user selects a desired scenic place by placing a check mark in the check box 28 as shown in FIGS. 4D, 4G-4I and 4K-4L. In the case where there is a numerical limit of the scenic places to visit, the navigation system determines whether the number of selected scenic places reaches the predetermined limit in the step 144.

If the number of selected scenic places has not reached the predetermined limit (maximum number), the steps 143 and 144 noted above will be repeated. If the number of selected scenic places has reached the predetermined limit, the process moves to the step 145 to disable further selection of the scenic place by the user. Typically, the navigation system notifies the user that the number of the selected scenic places has reached the limit by shading the remaining the scenic places and the corresponding check boxes 28 in the scenic place list 27 as shown in FIG. 4L.

Then, in the step 146, the navigation system displays a confirmation screen to confirm the selected scenic places on the selected scenic byway as shown in FIG. 5A. In the present invention, as noted above, the navigation system incorporating the scenic byway mode can display several variations of confirmation screen with different function keys. Upon confirmation, the navigation system calculates the routes to the selected scenic places and the final destination. After establishing the route to the scenic places, the navigation system starts the route guidance operation in the step 147 as shown in FIG. 5C. The user may turn off the power of the navigation system by stopping the vehicle engine at the scenic place.

Figure 17:
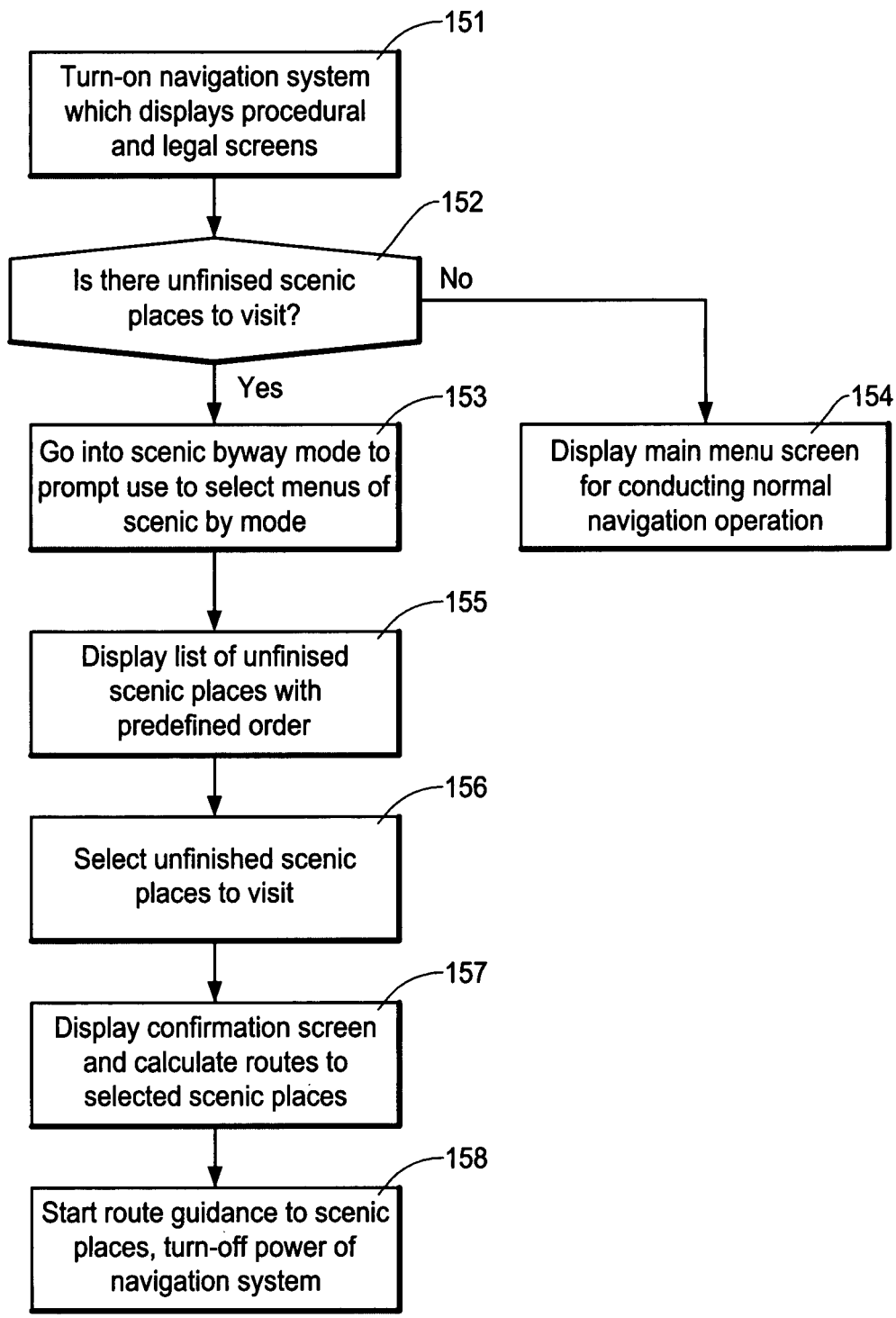
FIG. 17 is a flow chart showing an example of operation procedure of the navigation system of the present invention for continuing a trip to visit the unfinished scenic places on the selected scenic byway.

FIG. 17 is a flow chart showing an example of operational procedure of the navigation method and system of the present invention for continuing a trip to visiting the unfinished scenic places on the selected scenic byway. In other words, the operational flow of FIG. 17 shows more detailed operational steps involved in the step 128 in the flow chart of FIG. 14 for displaying and selecting the scenic places that have not been visited before previously turning off the navigation system. The process starts at the step 151 in which the user turns on the navigation system so that the navigation system displays the procedural screen (ex. opening screen showing a company logo, warning, etc.) as described with reference to FIG. 9A.

In the step 152, the navigation system checks whether there is a scenic place that has been selected but not yet visited before turning off the navigation system. If there is such an unfinished scenic place, the navigation system directly enters into the scenic byway mode in the step 153 as shown in FIG. 9B. The confirmation (continue trip) screen of FIG. 9B shows the next selected scenic place to prompt the user to decide whether the user wants to visit the next scenic place. In the step 152 above, in the case where there is no unfinished scenic place, the process moves to the step 154 to display a main menu screen to conduct the normal navigation operations.

In the confirmation screen of FIGS. 9B and 9D, the navigation system provide the "Scenic Place List" key 45 so that the user can check the remaining scenic places. Suppose the user presses the "Scenic Place List" key 45 as shown in FIG. 9D, the navigation system displays the list of unfinished scenic places in the step 155. Typically, the scenic place list includes the reference number for each scenic place to show the order of visiting there as well as the final destination mark as shown in FIG. 9E.

In the step 156, through the scenic place list, the user selects a desired scenic place by highlighting the name of the scenic place as shown in FIG. 9F. Then, in the step 157, the navigation system displays a confirmation screen to confirm the selected scenic places on the selected scenic byway as shown in FIG. 9G. Upon confirmation, the navigation system calculates routes to the selected scenic places and the final destination as shown in FIG. 9H. After establishing the route to the scenic places, the navigation system starts the route guidance operation in the step 158 as shown in FIG. 5C.

Figure 18:
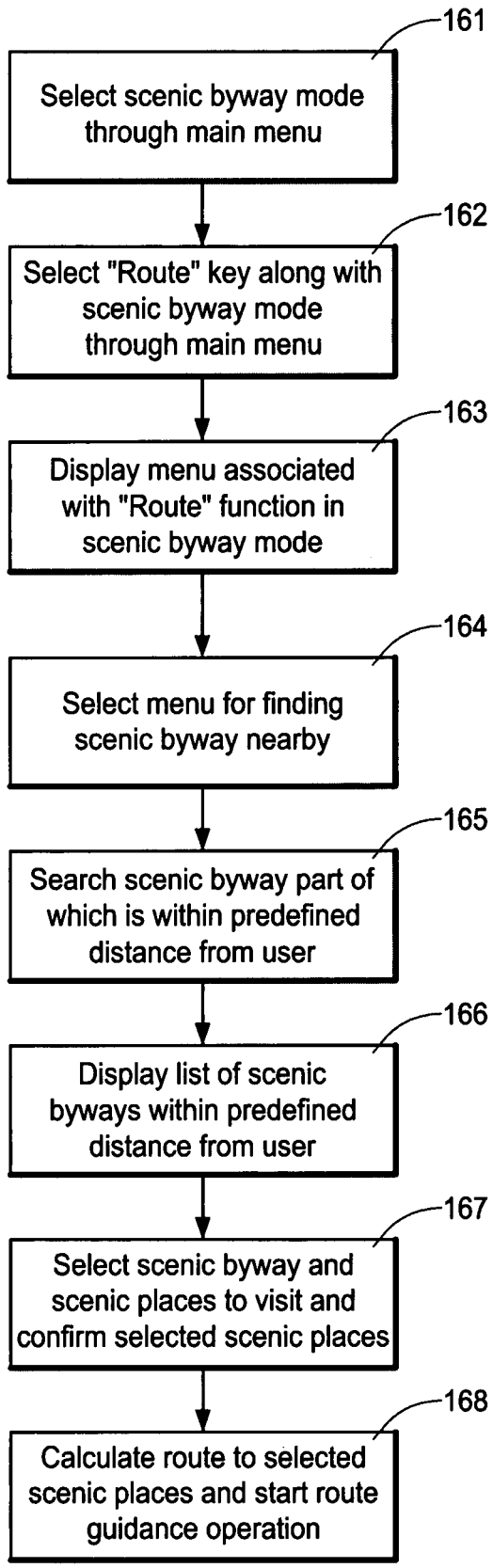
FIG. 18 is a flow chart showing an example of operation procedure of the navigation system for incorporating a "Route" function in combination with the scenic byway mode of the present invention.

FIG. 18 is a flow chart showing an example of operational procedure of the navigation method and system for incorporating a "Route" function in combination with the scenic byway mode of the present invention. Namely, in the step 161, the process starts at the main menu screen of the navigation system shown in FIG. 8A in which the user selects the "Scenic Byway" key 5. In the step 162, the user also selects the "Route" key 6 on the main menu screen of the navigation system shown in FIG. 8A.

Then, in the step 163, the navigation system will display a screen such as shown in FIG. 8B that provides a set of functions or menu keys associated with the function directed to the "Route" key 6. The menu keys of FIG. 8B, includes the "Find Byway Nearby" key 103 which is directly related to the present invention for selecting and visiting the scenic byway. In the step 164, the user presses the "Find Byway Nearby" key 103 on the screen of FIG. 8B to see the nearby scenic byways. The navigation system will search a scenic byway part of which is located within a predetermined distance range from the current position or a specified position in the step 165.

Then, in the step 166, the navigation system retrieves and displays a list of scenic byways within the predefined distance range from the current position as shown in FIG. 8E. In the step 167, through the scenic place list 27, the user selects a desired scenic place and the navigation system displays a confirmation screen to confirm the selected scenic places. Upon confirmation, in the step 168, the navigation system calculates routes to the selected scenic places and the final destination starts the route guidance operation.

FIG. 19 shows an example of the structure of a vehicle navigation system for implementing the present invention. While the vehicle navigation system is explained for an illustration purpose, the present invention can also be applied to other types of navigation system, such as a portable navigation device, electronic devices having a navigation function such as a PDA (personal digital assistant) device, a wireless telephone, a palm computer, and a notebook computer.

In the block diagram, the navigation system includes a data storage medium 231 such as a hard disc, CD-ROM, DVD or other storage means for storing the map data including the data of points of interest (POI). In addition, the data storage medium 231 stores the data concerning the scenic byways for retrieving the general and detailed information on the scenic byways for implementing the present invention. The navigation system includes a control unit 232 for controlling an operation for reading the information from the data storage medium 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving GPS signals from satellites, and etc.

The block diagram of FIG. 19 further includes a map information memory 234 for storing the map information which is read from the data storage medium 231, a database memory 235 for storing database information such as point of interest (POI) information which is read out from the data storage medium 231, a remote controller 237 for executing a menu selection operation, an enlarge/reduce operation, a destination input operation, etc. and a remote controller interface 238. Although a remote controller is a typical example for selecting menus, executing selected functions and etc., the navigation system includes various other input methods to achieve the same and similar operations done through the remote controller.

In FIG. 19, the navigation system further includes a bus 236 for interfacing the above units in the system, a processor (CPU) 239 for controlling an overall operation of the navigation system, a ROM (read only memory) 240 for storing various control programs such as a route search program and a map matching program necessary for navigation control, a RAM (random access memory) 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, and a synthesizing unit 246.

The block diagram of FIG. 19 further includes a wireless transceiver 249 for wireless communication to retrieve data such as detailed information concerning the scenic byways from a remote data server 251, a buffer memory 248 for temporally storing data for ease of data processing such as listing the retrieved information on the scenic byways and scenic places and scrolling such information, and a monitor (display) 250. Typically, the map image such as the one for entire scenic byway or each scenic place to be displayed is stored in VRAM 244. A program that performs the operation of the present invention concerning the scenic byway mode as described with reference to the drawings, in particular, to the flow charts of FIGS. 14-18, is stored in the ROM 240 or the data storage medium 231 and is executed by CPU 239.

As has been described above, according to the present invention, the navigation method and system is designed to efficiently retrieve the information on the scenic byways and to visit such scenic byways through calculated routes. The navigation method and system allows the user to efficiently search the information regarding scenic byways and scenic places and selects the scenic byway and scenic places to visit. The navigation method and system stores the information on the scenic byways in the map database and facilitates retrieval of the information on the scenic byways in response to the request by the user. Alternatively, the navigation method and system searches and retrieves the information on the scenic byways and scenic places from the remote data server through wireless communication. The navigation method and system is designed to perform the scenic byway mode in which operations and screen displays are specially designed for efficiently retrieving and selecting a desired scenic byway and scenic places to visit.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for selecting and visiting scenic places on a selected scenic byway, comprising the following steps of:

storing data concerning scenic byways throughout a country in a map database of a navigation system or a map database of a remote data server;

displaying a menu screen which includes a scenic byway menu;

selecting the scenic byway menu thereby setting an operation of the navigation system to a scenic byway mode;

checking the map database, by using a processor, to retrieve the data concerning scenic byways within a predetermined distance range from a current position or other specified position;

displaying a scenic byway list which lists scenic byways within the predetermined distance range;

selecting a scenic byway from the scenic byway list;

displaying a first scenic place list which lists scenic places on the selected scenic byway;

selecting one or more scenic places from the first scenic place list;

disabling further selection of the scenic place when a number of scenic places already selected has reached to a predetermined maximum number;

calculating a route to the selected scenic places and guiding a user to the selected scenic places through the calculated route; and issuing a warning on a display if a waypoint, which is one of the selected scenic places on the route before arriving at a final selected scenic place, is located in an area where turn by turn guidance cannot be provided;

wherein after turning on the navigation system again, the method further includes a step of checking whether there exists an unfinished selected scenic place at which a user has not yet arrived, and a step of directly starting the scenic byway mode when there exists the unfinished selected scenic place, a step of displaying a second scenic place list which lists the unfinished scenic places, and a step of allowing a user to select a desired scenic place by highlighting the name in the second scenic place list; and wherein said step of calculating the route to the selected scenic places includes a step of using a combination of a conventional routing method for determining a quickest route to the scenic place and a scenic byway routing method for determining a route to stay on the scenic byway as long as possible or reasonably long enough.

2. A navigation method for selecting and visiting scenic places as defined in claim 1, further comprising a step of retrieving information on a scenic byway selected from the scenic byway list and reproducing the retrieved information.

3. A navigation method for selecting and visiting scenic places as defined in claim 2, wherein said step of reproducing the retrieved information includes a step of displaying the retrieved information on a screen of the navigation system as well as reproducing the retrieved information by speech sounds.

4. A navigation method for selecting and visiting scenic places as defined in claim 1, wherein said step of displaying the scenic byway list includes a step of providing an information key to each entry in the scenic byway list to obtain information regarding the scenic byway.

5. A navigation method for selecting and visiting scenic places as defined in claim 1, wherein said step of displaying the first or second scenic place list includes a step of providing a map image key to each entry in the first or second scenic place list, and a step of displaying a map image of the scenic place when the map image key is activated.

6. A navigation method for selecting and visiting scenic places as defined in claim 1, wherein said step of displaying the first or second scenic place list includes a step of providing a check box to each entry in the first or second scenic place list to select one or more scenic places.

7. A navigation method for selecting and visiting scenic places as defined in claim 1, wherein said step of displaying the scenic byway list includes a step of listing the retrieved scenic byways in either an order of distance or an order of alphabet.

8. A navigation method for selecting and visiting scenic places as defined in claim 3, said step of displaying the retrieved information on the screen of the navigation system includes a step of displaying a key on the screen so that the user is able to request further information on the selected scenic byway.

9. A navigation method for selecting and visiting scenic places as defined in claim 3, said step of displaying the retrieved information on the screen of the navigation system includes a step of displaying a key on the screen so that the user is able to request for reproducing the retrieved information by speech sounds.

10. A navigation method for selecting and visiting scenic places as defined in claim 5, wherein said step of displaying the map image of the scenic place includes a step of allowing the user to use a scroll key and a cursor on the map image thereby scrolling the map image and changing the size of the map image.

11. A navigation method for selecting and visiting scenic places as defined in claim 10, wherein said step of allowing the user to use the scroll key on the map image includes a step of displaying a key on the screen so that the user is able to request further search for scenic byways within a predetermined distance range from a location specified by the cursor on the map image.

12. A navigation method for selecting and visiting scenic places as defined in claim 1, after the step of calculating the route to the selected scenic places, further comprising a step of displaying the first or second scenic place list which lists the selected scenic places where each entry in the first or second scenic place list is provided with a reference number or a last destination mark for indicating an order of visiting there.

13. A navigation method for selecting and visiting scenic places as defined in claim 12, further comprising a step of displaying a map image of the selected scenic byway on a screen of the navigation system where each of the selected scenic places on the map image is accompanied by the reference number or the last destination mark that corresponds to that in the first or second scenic place list.

14. A navigation method for selecting and visiting scenic places as defined in claim 1, further comprising a step of providing an entry of a nearest byway entrance which is selectable by the user.

15. A navigation method for selecting and visiting scenic places as defined in claim 1, wherein said conventional routing method is mainly used for determining a route between a starting point which is not on the selected scenic byway and any of the selected scenic place, and wherein said scenic byway routing method is mainly used for determining a route between one selected scenic place and another selected scenic place.

16. A navigation system for selecting and visiting scenic places on a selected scenic byway, comprising:

means for storing data concerning scenic byways throughout a country in a map database of the navigation system or a map database of a remote data server;

means for displaying a menu screen which includes a scenic byway menu;

means for selecting the scenic byway menu thereby setting an operation of the navigation system to a scenic byway mode;

means for checking the map database to retrieve the data concerning scenic byways within a predetermined distance range from a current position or other specified position;

means for displaying a scenic byway list which lists scenic byways within the predetermined distance range;

means for selecting a scenic byway from the scenic byway list;

means for displaying a first scenic place list which lists scenic places on the selected scenic byway;

means for selecting one or more scenic places from the first scenic place list;

means for disabling further selection of the scenic place when a number of scenic places already selected has reached to a predetermined maximum number;

means for calculating a route to the selected scenic places and guiding a user to the selected scenic places through the calculated route; and means for issuing a warning on a display if a waypoint, which is one of the selected scenic places on the route before arriving at a final selected scenic place, is located in an area where turn by turn guidance cannot be provided;

wherein, after being turned on again, the navigation system checks whether there exists an unfinished selected scenic place at which a user has not yet arrived, directly starts the scenic byway mode when there exists the unfinished selected scenic place, displays a second scenic place list which lists the unfinished scenic places, and allows a user to select a desired scenic place by highlighting the name in the second scenic place list; and wherein said means for calculating the route to the selected scenic places includes, means for using a combination of a conventional routing method for determining a quickest route to the scenic place and a scenic byway routing method for determining a route to stay on the scenic byway as long as possible or reasonably long enough.

17. A navigation system for selecting and visiting scenic places as defined in claim 16, further comprising means for retrieving information on a scenic byway selected from the scenic byway list and reproducing the retrieved information.

18. A navigation system for selecting and visiting scenic places as defined in claim 17, wherein said means for reproducing the retrieved information includes means for displaying the retrieved information on a screen of the navigation system as well as reproducing the retrieved information by speech sounds.

19. A navigation system for selecting and visiting scenic places as defined in claim 16, wherein said means for displaying the scenic byway list includes means for providing an information key to each entry in the scenic byway list to obtain information regarding the scenic byway.

20. A navigation system for selecting and visiting scenic places as defined in claim 16, wherein said means for displaying the first or second scenic place list includes means for providing a map image key to each entry in the first or second scenic place list, and means for displaying a map image of the scenic place when the map image key is activated.

21. A navigation system for selecting and visiting scenic places as defined in claim 16, wherein said means for displaying the first or second scenic place list includes means for providing a check box to each entry in the scenic place list to select one or more scenic places.

22. A navigation system for selecting and visiting scenic places as defined in claim 16, wherein said means for displaying the first or second scenic byway list includes means for listing the retrieved scenic byways in either an order of distance or an order of alphabet.

23. A navigation system for selecting and visiting scenic places as defined in claim 18, said means for displaying the retrieved information on the screen of the navigation system includes means for displaying a key on the screen so that the user is able to request further information on the selected scenic byway.

24. A navigation system for selecting and visiting scenic places as defined in claim 18, said means for displaying the retrieved information on the screen of the navigation system includes means for displaying a key on the screen so that the user is able to request for reproducing the retrieved information by speech sounds.

25. A navigation system for selecting and visiting scenic places as defined in claim 20, wherein said means for displaying the map image of the scenic place includes means for allowing the user to use a scroll key and a cursor on the map image thereby scrolling the map image and changing the size of the map image.

26. A navigation system for selecting and visiting scenic places as defined in claim 25, wherein said means for allowing the user to use the scroll key on the map image includes means for displaying a key on the screen so that the user is able to request further search for scenic byways within a predetermined distance range from a location specified by the cursor on the map image.

27. A navigation system for selecting and visiting scenic places as defined in claim 16, after calculating the route to the selected scenic places, further comprising means for displaying the first or second scenic place list which lists the selected scenic places where each entry in the first or second scenic place list is provided with a reference number or a last destination mark for indicating an order of visiting there.

28. A navigation system for selecting and visiting scenic places as defined in claim 27, further comprising means for displaying a map image of the selected scenic byway on a screen of the navigation system where each of the selected scenic places on the map image is accompanied by the reference number or the last destination mark that corresponds to that in the first or second scenic place list.

29. A navigation system for selecting and visiting scenic places as defined in claim 16, further comprising means for providing an entry of a nearest byway entrance which is selectable by the user.

30. A navigation system for selecting and visiting scenic places as defined in claim 16, wherein said conventional routing method is mainly used for determining a route between a starting point which is not on the selected scenic byway and any of the selected scenic place, and wherein said scenic byway routing method is mainly used for determining a route between one selected scenic place and another selected scenic place.

* * * * *